United States Patent [19]
Cohen et al.

[11] Patent Number: 6,028,955
[45] Date of Patent: Feb. 22, 2000

[54] DETERMINING A VANTAGE POINT OF AN IMAGE

[75] Inventors: Michael F. Cohen, Seattle, Wash.; Radek Grzeszczuk, Mountain View, Calif.

[73] Assignee: Microsoft Corporation, Redmond, Wash.

[21] Appl. No.: 09/106,812

[22] Filed: Jun. 29, 1998

Related U.S. Application Data

[62] Division of application No. 08/620,830, Mar. 20, 1996
[60] Provisional application No. 60/025,200, Feb. 16, 1996.

[51] Int. Cl.[7] ........................................................ G06K 9/00
[52] U.S. Cl. ............................ 382/154; 382/164; 382/293
[58] Field of Search ..................................... 382/151, 154, 382/162–164, 287, 291, 293, 312; 348/20, 50, 94, 95, 137, 140, 587; 356/142, 143, 375, 248; 250/589.1, 559.29; 396/333; 901/47

[56] References Cited

U.S. PATENT DOCUMENTS

| | | | |
|---|---|---|---|
| 4,202,008 | 5/1980 | King ............................................. | 358/22 |
| 4,238,828 | 12/1980 | Hay et al. ................................... | 364/559 |
| 4,672,564 | 6/1987 | Egli et al. ................................... | 364/559 |
| 4,678,329 | 7/1987 | Lukowski, Jr. et al. ................. | 356/152 |
| 4,753,569 | 6/1988 | Pryor ........................................... | 414/730 |
| 4,834,531 | 5/1989 | Ward ............................................ | 356/5 |
| 4,933,864 | 6/1990 | Evans, Jr. et al. ......................... | 364/449 |
| 4,988,202 | 1/1991 | Nayar et al. ............................... | 356/394 |
| 5,283,560 | 2/1994 | Bartlett ....................................... | 345/113 |
| 5,422,987 | 6/1995 | Yamada ....................................... | 395/127 |
| 5,467,404 | 11/1995 | Vuylsteke et al. ........................ | 382/274 |

(List continued on next page.)

OTHER PUBLICATIONS

Mihran Tuceryan et al., Calibration Requirements and Procedures for a Monitor–Based Augmented Reality System, IEEE Transactions on Visualization and Computer Graphics, vol. 1, No. 3, pp. 255–273, Sep. 1995.

Ashdown, "Near–Field Photometry: A New Approach," *Journal of the Illuminating Engineering Society* 22(I):163–180, 1993.

Chen, "Quicktime VR—An Image–Based Approach to Virtual Environment Navigation," *Computer Graphics, Annual Conference Series*:29–38, 1995.

Chen and Williams, "View Interpolation for Image Synthesis," *Computer Graphics, Annual Conference Series*:279–288, 1993.

Halle, "Holographic Stereograms as Discrete Imaging Systems," *Practical Holography VIII (SPIE)* 2176:73–84, 1994.

Levoy and Hanrahan, "Light–Field Rendering," *Computer Graphics, Annual Conference Series*:31–42, 1996.

(List continued on next page.)

*Primary Examiner*—Leo H. Boudreau
*Assistant Examiner*—Brian P. Werner
*Attorney, Agent, or Firm*—Seed and Berry LLP

[57] ABSTRACT

A computer-based method and system for digital 3-dimensional imaging of an object which allows for viewing images of the object from arbitrary vantage points. The system, referred to as the Lumigraph system, collects a complete appearance of either a synthetic or real object (or a scene), stores a representation of the appearance, and uses the representation to render images of the object from any vantage point. The appearance of an object is a collection of light rays that emanate from the object in all directions. The system stores the representation of the appearance as a set of coefficients of a 4-dimensional function, referred to as the Lumigraph function. From the Lumigraph function with these coefficients, the Lumigraph system can generate 2-dimensional images of the object from any vantage point. The Lumigraph system generates an image by evaluating the Lumigraph function to identify the intensity values of light rays that would emanate from the object to form the image. The Lumigraph system then combines these intensity values to form the image.

69 Claims, 38 Drawing Sheets

U.S. PATENT DOCUMENTS

| | | | |
|---|---|---|---|
| 5,502,482 | 3/1996 | Graham | 348/140 |
| 5,515,447 | 5/1996 | Zheng et al. | 382/100 |
| 5,550,758 | 8/1996 | Corby, Jr. et al. | 364/571.03 |
| 5,613,048 | 3/1997 | Chen et al. | 395/119 |
| 5,675,377 | 10/1997 | Gibas | 348/47 |
| 5,717,782 | 2/1998 | Denneau, Jr. | 382/154 |
| 5,724,743 | 3/1998 | Jackson | 33/228 |
| 5,727,078 | 3/1998 | Chupeau | 382/154 |
| 5,731,902 | 3/1998 | Williams et al. | 359/630 |
| 5,748,505 | 5/1998 | Greer | 364/571.02 |
| 5,751,843 | 5/1998 | Maggioni et al. | 328/154 |
| 5,768,443 | 6/1998 | Michael et al. | 382/294 |
| 5,825,483 | 10/1998 | Michael et al. | 356/243 |
| 5,825,666 | 10/1998 | Freifeld | 364/560 |
| 5,831,735 | 11/1998 | Corby, Jr. | 356/375 |
| 5,832,139 | 11/1998 | Batterman et al. | 382/291 |
| 5,850,469 | 12/1998 | Martin et al. | 382/154 |
| 5,854,880 | 12/1998 | Pryor | 395/94 |
| 5,856,844 | 1/1999 | Batterman et al. | 348/207 |

OTHER PUBLICATIONS

Lewis and Fournier, "Light–Driven Global Illumination with a Wavelet Representation of Light Transport," *UBC CS Technical Reports*, University of British Columbia, pp. 1–15, 1995.

McMillan and Bishop, "Plenoptic Modeling: An Image–Based Rendering System," *Computer Graphics, Annual Conference Series*:39–46, 1995.

Szeliski, "Rapid Octree Construction from Image Sequences," *CVGIP: Image Understand* 58(1):23–32, 1993.

Adelson and Wang, "Single Lens Stereo With a Plenoptic Camera," *IEEE Transactions on Pattern Analysis and Machine Intelligence* 14(2):99–106, 1992.

Gortler et al., "The Lumigraph," *Computer Graphics, Annual Conference Series SIGGRAPH* 96:43–54, 1996.

Adelson and Bergen, "The Plenoptic Function and the Elements of Early Vision," in *Computational Models of Visual Processing*, MIT Press, Cambridge, MA, 1991, pp 3–20.

Akeley, Kurt, "RealityEngine Graphics," *Computer Graphics Proceedings*, Annual Conference Series, 1993, pp. 109–116.

Bacchelli–Montefusco, Laura et al., "Using Interactive Graphics for Fitting Surfaces to Scattered Data," *IEEE Computer Graphics and Applications*, vol. 4, No. 7, Jul. 1984, pp. 43–45.

Foley, James D. et al., *Computer Graphics Principles and Practice*, Addison–Wesley Publishing Company, Inc., Reading Massachusetts, 1990, Table of Contents, pp. 550–555.

Franke, Richard, "Scattered Data Interpolation: Tests of Some Methods," *Mathematics of Computation*, American Mathematical Society, U.S.A., 1982, Table of Contents and pp. 181–200.

Franke, Richard et al., "Smooth Interpolation of Large Sets of Scattered Data," *International Journal for Numerical Methods in Engineering*, 1980, Table of Contents and 1691–1704.

Nielson, Gregory M., "Scattered Data Modeling," *IEEE Computer Graphics & Applications*, Jan. 1993, pp. 60–70.

Sei–ichiro Kamata et al., A Camera Calibration Using 4 Point–Targets, IEEE publication, p.p. 550–553, 1992.

Reimar K. Lenz et al., Calibrating a Cartesian Robot with Eye–on–Hand Configuration Independent of Eye–to–Hand Relationship, IEE Transactions on Pattern Analysis and Machine Intelligence, vol. 11, No. 9, p.p. 916–928, Sep. 1989.

G.A. Thomas et al., A Versatile Camera Position Measurement System for Virtual Reality TV Production, International Broadcasting Convention, Sep. 12–16, 1997, Conference Publication No. 447.

Pulling Phase 1001

| Level = | 0 | | 1 | | 2 | | 3 | | 4 | |
|---|---|---|---|---|---|---|---|---|---|---|
| | C.L. | I.V. | C.L. | I.V. | C.L. | I.V. | C.L. | I.V. | C.L. | I.V. |
| | 1.00 | 255 | | | | | | | | |
| | 0.00 | 0 | 0.50 | 255 | | | | | | |
| | 0.00 | 0 | | | | | | | | |
| | 0.00 | 0 | 0.00 | 0 | 0.25 | 255 | | | | |
| | 0.00 | 0 | | | | | | | | |
| | 0.00 | 0 | 0.00 | 0 | | | | | | |
| | 0.00 | 0 | | | | | | | | |
| 1003 | 0.00 | 0 | 0.00 | 0 | 0.00 | 0 | 0.13 | 255 | | |
| | 0.00 | 0 | | | | | | | | |
| | 0.00 | 0 | 0.00 | 0 | | | | | | |
| | 0.00 | 0 | | | | | | | | |
| | 0.00 | 0 | 0.00 | 0 | 0.00 | 0 | | | | |
| | 0.00 | 0 | | | | | | | | |
| | 0.00 | 0 | 0.00 | 0 | | | | | | |
| | 0.00 | 0 | | | | | | | | |
| | 0.00 | 0 | 0.00 | 0 | 0.00 | 0 | 0.00 | 0 | 0.06 | 255 |

Pushing Phase 1002

| Level = | 0 | | 1 | | 2 | | 3 | | 4 | |
|---|---|---|---|---|---|---|---|---|---|---|
| | C.L. | I.V. | C.L. | I.V. | C.L. | I.V. | C.L. | I.V. | C.L. | I.V. |
| | 1.00 | 255 | | | | | | | | |
| | 0.58 | 255 | 0.58 | 255 | | | | | | |
| | 0.44 | 255 | | | | | | | | |
| | 0.31 | 255 | 0.31 | 255 | 0.31 | 255 | | | | |
| | 0.27 | 255 | | | | | | | | |
| | 0.23 | 255 | 0.23 | 255 | | | | | | |
| | 0.19 | 255 | | | | | | | | |
| | 0.15 | 255 | 0.15 | 255 | 0.15 | 255 | 0.15 | 255 | | |
| | 0.14 | 255 | | | | | | | | |
| | 0.13 | 255 | 0.13 | 255 | | | | | | |
| | 0.12 | 255 | | | | | | | | |
| | 0.11 | 255 | 0.11 | 255 | 0.11 | 255 | | | | |
| | 0.10 | 255 | | | | | | | | |
| | 0.08 | 255 | 0.08 | 255 | | | | | | |
| | 0.07 | 255 | | | | | | | | |
| | 0.06 | 255 | 0.06 | 255 | 0.06 | 255 | 0.06 | 255 | 0.06 | 255 |

*Fig. 10*

Pulling Phase

| Level = | 0 | | 1 | | 2 | | 3 | | 4 | |
|---|---|---|---|---|---|---|---|---|---|---|
| | C.L. | I.V. | C.L. | I.V. | C.L. | I.V. | C.L. | I.V. | C.L. | I.V. |
| | 1.00 | 255 | | | | | | | | |
| | 0.00 | 0 | 0.50 | 255 | | | | | | |
| | 0.00 | 0 | | | | | | | | |
| | 0.00 | 0 | 0.00 | 0 | 0.25 | 255 | | | | |
| | 0.00 | 0 | | | | | | | | |
| | 0.00 | 0 | 0.00 | 0 | | | | | | |
| | 0.00 | 0 | | | | | | | | |
| | 0.00 | 0 | 0.00 | 0 | 0.00 | 0 | 0.13 | 255 | | |
| | 0.00 | 0 | | | | | | | | |
| | 0.00 | 0 | 0.00 | 0 | | | | | | |
| | 0.00 | 0 | | | | | | | | |
| | 0.00 | 0 | 0.00 | 0 | 0.00 | 0 | | | | |
| | 0.00 | 0 | | | | | | | | |
| | 0.00 | 0 | 0.00 | 0 | | | | | | |
| | 0.00 | 0 | | | | | | | | |
| | 1.00 | 0 | 1.00 | 0 | 1.00 | 0 | 1.00 | 0 | 1.06 | 15 |

Pushing Phase

| Level = | 0 | | 1 | | 2 | | 3 | | 4 | |
|---|---|---|---|---|---|---|---|---|---|---|
| | C.L. | I.V. | C.L. | I.V. | C.L. | I.V. | C.L. | I.V. | C.L. | I.V. |
| | 1.00 | 255 | | | | | | | | |
| | 0.62 | 176 | 0.62 | 176 | | | | | | |
| | 0.54 | 143 | | | | | | | | |
| | 0.46 | 98 | 0.46 | 98 | 0.46 | 98 | | | | |
| | 0.49 | 82 | | | | | | | | |
| | 0.51 | 69 | 0.51 | 69 | | | | | | |
| | 0.54 | 56 | | | | | | | | |
| | 0.56 | 45 | 0.56 | 45 | 0.56 | 45 | 0.56 | 45 | | |
| | 0.62 | 36 | | | | | | | | |
| | 0.67 | 28 | 0.67 | 28 | | | | | | |
| | 0.73 | 22 | | | | | | | | |
| | 0.78 | 16 | 0.78 | 16 | 0.78 | 16 | | | | |
| | 0.84 | 11 | | | | | | | | |
| | 0.89 | 7 | 0.89 | 7 | | | | | | |
| | 0.95 | 3 | | | | | | | | |
| | 1.00 | 0 | 1.00 | 0 | 1.00 | 0 | 1.00 | 0 | 1.06 | 15 |

*Fig. 11*

Pulling Phase

| Level = | 0 | | 1 | | 2 | | 3 | | 4 | |
|---|---|---|---|---|---|---|---|---|---|---|
| | C.L. | I.V. | C.L. | I.V. | C.L. | I.V. | C.L. | I.V. | C.L. | I.V. |
| | 1.00 | 255 | | | | | | | | |
| | 0.00 | 0 | 0.50 | 255 | | | | | | |
| | 0.00 | 0 | | | | | | | | |
| | 0.00 | 0 | 0.00 | 0 | 0.25 | 255 | | | | |
| | 0.00 | 0 | | | | | | | | |
| | 0.00 | 0 | 0.00 | 0 | | | | | | |
| | 0.00 | 0 | | | | | | | | |
| | 0.00 | 0 | 0.25 | 0 | 0.38 | 0 | 0.56 | 57 | | |
| | 0.50 | 0 | | | | | | | | |
| | 0.00 | 0 | 0.25 | 0 | | | | | | |
| | 0.00 | 0 | | | | | | | | |
| | 0.00 | 0 | 0.00 | 0 | 0.13 | 0 | | | | |
| | 0.00 | 0 | | | | | | | | |
| | 0.00 | 0 | 0.00 | 0 | | | | | | |
| | 0.00 | 0 | | | | | | | | |
| | 0.50 | 255 | 0.50 | 255 | 0.50 | 255 | 0.56 | 227 | 0.84 | 170 |

Pushing Phase

| Level = | 0 | | 1 | | 2 | | 3 | | 4 | |
|---|---|---|---|---|---|---|---|---|---|---|
| | C.L. | I.V. | C.L. | I.V. | C.L. | I.V. | C.L. | I.V. | C.L. | I.V. |
| | 1.00 | 255 | | | | | | | | |
| | 0.63 | 199 | 0.63 | 199 | | | | | | |
| | 0.58 | 174 | | | | | | | | |
| | 0.53 | 143 | 0.53 | 143 | 0.53 | 143 | | | | |
| | 0.61 | 117 | | | | | | | | |
| | 0.69 | 96 | 0.69 | 96 | | | | | | |
| | 0.78 | 70 | | | | | | | | |
| | 0.88 | 50 | 0.88 | 50 | 0.84 | 66 | 0.75 | 106 | | |
| | 0.94 | 32 | | | | | | | | |
| | 0.89 | 77 | 0.89 | 77 | | | | | | |
| | 0.87 | 108 | | | | | | | | |
| | 0.86 | 139 | 0.86 | 139 | 0.86 | 139 | | | | |
| | 0.89 | 164 | | | | | | | | |
| | 0.91 | 187 | 0.91 | 187 | | | | | | |
| | 0.95 | 215 | | | | | | | | |
| | 0.99 | 248 | 0.98 | 242 | 0.97 | 228 | 0.93 | 202 | 0.84 | 170 |

*Fig. 12*

Fig. 29B d=10 mm
D=65 mm
B=4*D+5*d=310 mm odd circles are BLACK
even circles are WHITE

| #   | count | 1st | 2nd    | 3rd    |
|-----|-------|-----|--------|--------|
| 201 | 2     | 1.0 | 0.8333 |        |
| 202 | 2     | 1.0 | 0.6667 |        |
| 203 | 2     | 1.0 | 0.5    |        |
| 204 | 2     | 1.0 | 0.3333 |        |
| 205 | 2     | 1.0 | 0.1667 |        |
| 206 | 3     | 1.0 | 0.8333 | 0.6667 |
| 207 | 3     | 1.0 | 0.8333 | 0.5    |
| 208 | 3     | 1.0 | 0.8333 | 0.3333 |
| 209 | 3     | 1.0 | 0.8333 | 0.1667 |
| 210 | 3     | 1.0 | 0.6667 | 0.5    |
| 211 | 3     | 1.0 | 0.6667 | 0.3333 |
| 212 | 3     | 1.0 | 0.6667 | 0.1667 |
| 213 | 3     | 1.0 | 0.5    | 0.3333 |
| 214 | 3     | 1.0 | 0.5    | 0.1667 |
| 215 | 3     | 1.0 | 0.3333 | 0.1667 |

| #   | count | 1st | 2nd    | 3rd    | 4th    | 5th    |
|-----|-------|-----|--------|--------|--------|--------|
| 216 | 4     | 1.0 | 0.8333 | 0.6667 | 0.5    |        |
| 217 | 4     | 1.0 | 0.8333 | 0.6667 | 0.3333 |        |
| 218 | 4     | 1.0 | 0.8333 | 0.6667 | 0.1667 |        |
| 219 | 4     | 1.0 | 0.8333 | 0.5    | 0.3333 |        |
| 220 | 4     | 1.0 | 0.8333 | 0.5    | 0.1667 |        |
| 221 | 4     | 1.0 | 0.8333 | 0.3333 | 0.1667 |        |
| 222 | 4     | 1.0 | 0.6667 | 0.5    | 0.3333 |        |
| 223 | 4     | 1.0 | 0.6667 | 0.5    | 0.1667 |        |
| 224 | 4     | 1.0 | 0.6667 | 0.3333 | 0.1667 |        |
| 225 | 4     | 1.0 | 0.5    | 0.3333 | 0.1667 |        |
| 226 | 5     | 1.0 | 0.8333 | 0.6667 | 0.5    | 0.3333 |
| 227 | 5     | 1.0 | 0.8333 | 0.6667 | 0.5    | 0.1667 |
| 228 | 5     | 1.0 | 0.8333 | 0.6667 | 0.3333 | 0.1667 |
| 229 | 5     | 1.0 | 0.8333 | 0.5    | 0.3333 | 0.1667 |
| 230 | 5     | 1.0 | 0.6667 | 0.5    | 0.3333 | 0.1667 |

DETERMINING A VANTAGE POINT OF AN IMAGE

CROSS-REFERENCE TO RELATED APPLICATIONS

This application is a divisional of U.S. patent application Ser. No. 08/620,830, filed Mar. 20, 1996; which application claims the benefit of U.S. Provisional Application Ser. No. 60/025,200, filed Feb. 16, 1996.

TECHNICAL FIELD

The invention relates to a computer imaging system and, more particularly, to a method and system for representing a complete 3-dimensional image of an object.

BACKGROUND OF THE INVENTION

Current computer graphics systems create images of graphics objects by first modeling the geometric and surface attributes of the objects in a virtual environment along with any light sources. The graphics systems can render images of the object in the virtual environment from the vantage point of a virtual camera. Great effort has been expended to develop computer graphics systems that allow objects with complex geometries and material attributes to be modeled. Also, a great effort has been expended to produce graphics systems that simulate the propagation of light through virtual environments to create realistic images.

Such modeling of objects typically involves generating a 3-dimensional representation of the objects using, for example, a polygon mesh to represent the surface of the object. Each polygon in a polygon mesh has vertices in space that define the perimeter of that polygon. Each polygon, thus, corresponds to a small portion of the surface of the object being modeled. To increase the resolution of the modeling, the number of polygons can be increased to represent minute nuances in the shape of the object.

The rendering of an image from such a polygon mesh can be computationally intensive and may not accurately represent the image of the real object in a real environment. The rendering is computationally intensive because for each polygon that corresponds to a portion of the object that is visible in the image, the graphics system would first need to identify that polygon as visible, determine the effects of the light sources, and then apply those effects to the image. The processing at each step can be computationally intensive. Moreover, such graphics systems have had very little success in determining the effects of a light source on the object. A complex object can be made of many different materials and there has been little success in accurately modeling the reflective characteristics of various materials.

Therefore, it has remained difficult or impossible to recreate much is of the complex geometry and subtle lighting effects found in the real world. To bypass the modeling problem, recently there has been interest in capturing the geometry, material properties, and motion of objects directly from the real world. This approach typically involves some combination of cameras, structured light, range finders, and mechanical sensing devices such as 3-dimensional digitizers and associated software. When successful, the results can be fed into a rendering program to create images of real objects and scenes. Unfortunately, these systems are still unable to completely capture small details in geometry and material properties. Existing rendering methods also continue to be limited in their capability to faithfully reproduce real world illumination, even if given accurate geometric models.

In certain systems, the traditional modeling/rendering process has been skipped. Instead, these systems capture a series of environment images and allow a user to look around an object from fixed vantage points. Although these captured images accurately represent the object from the fixed vantage points, the usefulness of such systems are limited because the objects can only be viewed from fixed vantage points. Attempts to interpolate an image of the objects from other vantage points have generally proved unsuccessful. It would be desirable to have a system for efficiently representing the complete appearance of an object so that accurate images of an object can be rendered from arbitrary vantage points.

SUMMARY OF THE INVENTION

The present invention provides a method and system for 3-dimensional imaging of an object. The system collects images of the object from a plurality of vantage points. For each of a plurality of points on a surface surrounding the object, the system determines based on the collected images the intensity value and direction of light that emanates from the object and passes through the point for each of a plurality of directions. The system then stores each determined intensity value in a data structure indexed by the point on the surface and by the direction. From this 4-dimensional representation of the appearance of the object, the system can render images of the object from arbitrary vantage points. For each pixel of the image to be rendered, the system interpolates the intensity value of that pixel from the stored determined intensity values.

In another aspect, the system generates coefficients for a plenoptic function describing light that passes through each point on a closed surface. The system selects an overall direction of interest as inward or outward to indicate whether an object inside the surface or a scene outside the surface is to be imaged. The system then selects a plurality of points on the surface. For each selected point on the surface, the system estimates the intensity value of a light ray that passes through that point in the selected overall direction for each of a plurality of directions in the selected overall direction.

In yet another aspect, the invention comprises a computer-readable medium that contains a data structure for representing an appearance of an object. The data structure has for each of a plurality of points surrounding the object and for each of a plurality of directions, an intensity value representing light that emanates from the object in that direction and passes through the point.

In the following, term Lumigraph function refers to a 4-dimensional plenoptic function that represents the complete appearance of an object The term Lumigraph data structure refers to a data structure that contains the coefficients of the Lumigraph function. The term Lumigraph point refers to a lo pre-defined vantage point on a surface surrounding an object, and the term Lumigraph direction refers to a pre-defined direction from a Lumigraph point.

The file of this patent contains at least one drawings executed in color. Copies of this patent with the color drawings will be provided by the Patent and Trademark Office upon request and payment of the necessary fee.

BRIEF DESCRIPTION OF THE DRAWINGS

FIGS. 10–12 illustrate the scattered data approximation algorithm for 1-dimensional images.

DETAILED DESCRIPTION OF THE INVENTION

Overview

A preferred embodiment of the present invention provides a computer-based method and system for digital 3-dimensional imaging of an object which allows for viewing images of the object from arbitrary vantage points. The preferred system, referred to as the Lumigraph system, collects a complete appearance of either a synthetic or real object (or a scene), stores a representation of the appearance, and uses the representation to render images of the object from any vantage point. The appearance of an object is a collection of light rays that emanate from the object in all directions. The system stores the representation of the appearance as a set of coefficients of a 4-dimensional function, referred to as the Lumigraph function. From the Lumigraph function with these coefficients, the Lumigraph system can generate 2-dimensional images of the object from any vantage point. The Lumigraph system generates an image by evaluating the Lumigraph function to identify the intensity values of light rays that would emanate from the object to form the image. The Lumigraph system then combines these intensity values to form the image.

In a preferred embodiment, the Lumigraph function describes the light rays that emanate from the object and intersect a cube that surrounds the object. With this Lumigraph function, the Lumigraph system can generate an image from any vantage point inside or outside the cube so long as the point is outside the convex hull of the object. The convex hull is a minimum-shaped volume that surrounds the object such that any two points within the convex hull can be connected by a line that lies entirely within the convex hull. The Lumigraph system assumes the space outside the object is empty space. Therefore, each light ray leaving the convex hull of the object will continue in the same direction and with the same intensity. The Lumigraph function is represented as $$\tilde{L}(s, t, u, v).$$

where the variables s and t uniquely identify a position on the cube and the variables u and v uniquely identify the direction of a light ray that emanates from the object and intersects the point (s, t) on the cube.

Figure 1:
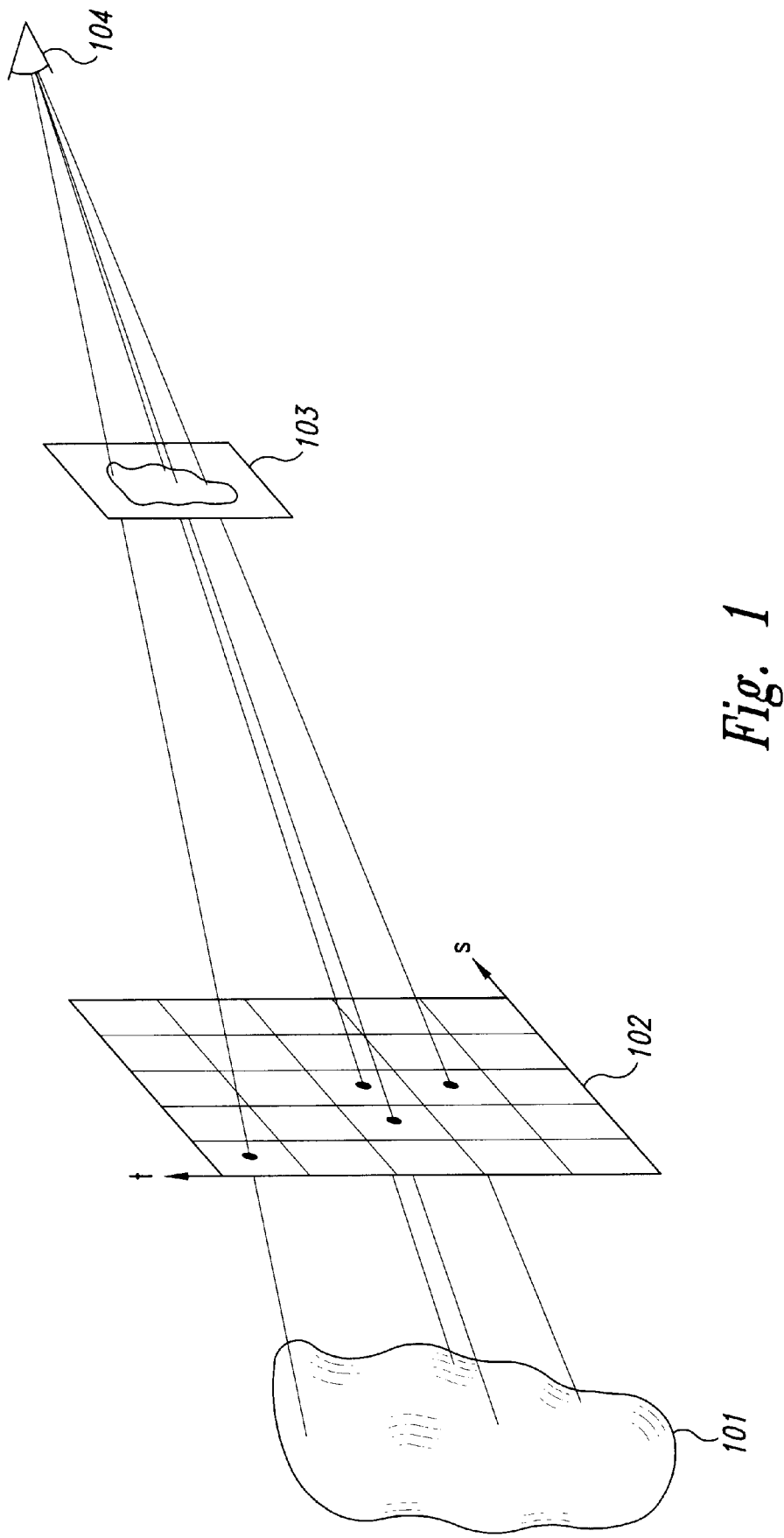
FIG. 1 illustrates the generating of an image using the Lumigraph function.

To generate an image using the Lumigraph function, the Lumigraph system determines for each pixel of the image which light ray (s, t, u, v) will form the intensity value of that pixel. FIG. 1 illustrates the generating of an image using the Lumigraph function. Certain light rays from the object 101 would pass through the face 102 of the cube and contribute to the image 103. Each light ray that forms a pixel of the image is in the direction of the center of projection 104 of the image. For each pixel, the Lumigraph system determines that (s, t) position on the face and that direction (u, v) of the light ray that forms the pixel. The Lumigraph system then evaluates the Lumigraph function at (s, t, u, v) to generate the intensity value for that pixel. Depending on the resolution of the image, more than one light ray may contribute to the formation of the pixel. The Lumigraph system in an alternate embodiment can instead set the pixel to a weighted average of the intensity values generated by the Lumigraph function for each of the contributing light rays.

Figure 2:
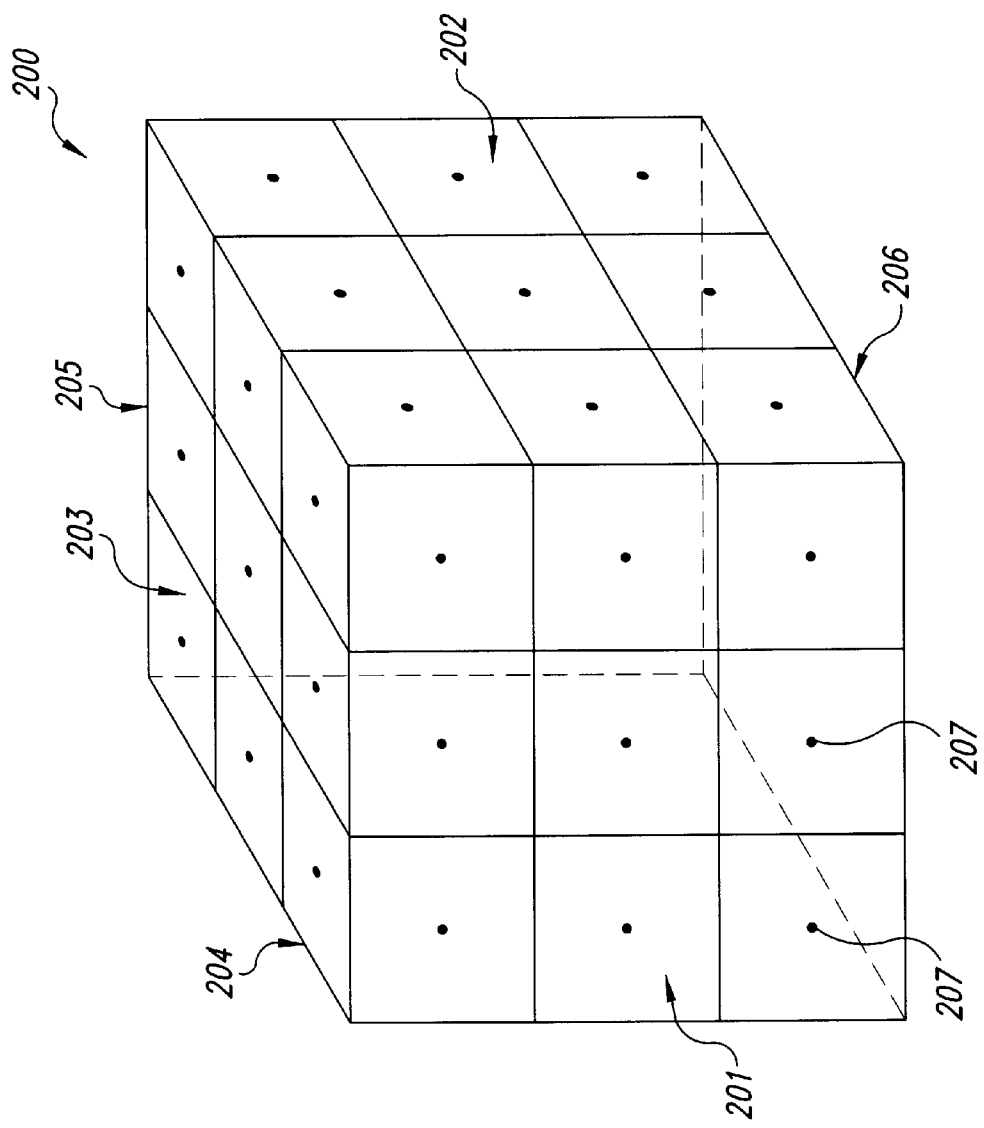
FIG. 2 is a block diagram illustrating a cube that surrounds an object.

To generate the coefficients for the Lumigraph function, the Lumigraph system first collects a series of pictures of the object from many different vantage points. The Lumigraph system digitizes the pictures and stores the re(, green, and blue intensity values for each pixel of each picture. From these intensity values, the Lumigraph system then estimates a weighted average of the intensity values of the light rays that emanate from the object and that would pass through the face of the cube in small pre-defined areas and in pre-defined directions. The centers of the pre-defined areas are referred to as Lumigraph points, and the pre-defined directions are referred to as Lumigraph directions. FIG. 2 is a block diagram illustrating a cube that surrounds an object. The Lumigraph points are arranged on the six faces 201–206 of the cube 200 that surrounds the object. The Lumigraph points 207 are evenly spaced throughout each face of the cube.

Figure 3:
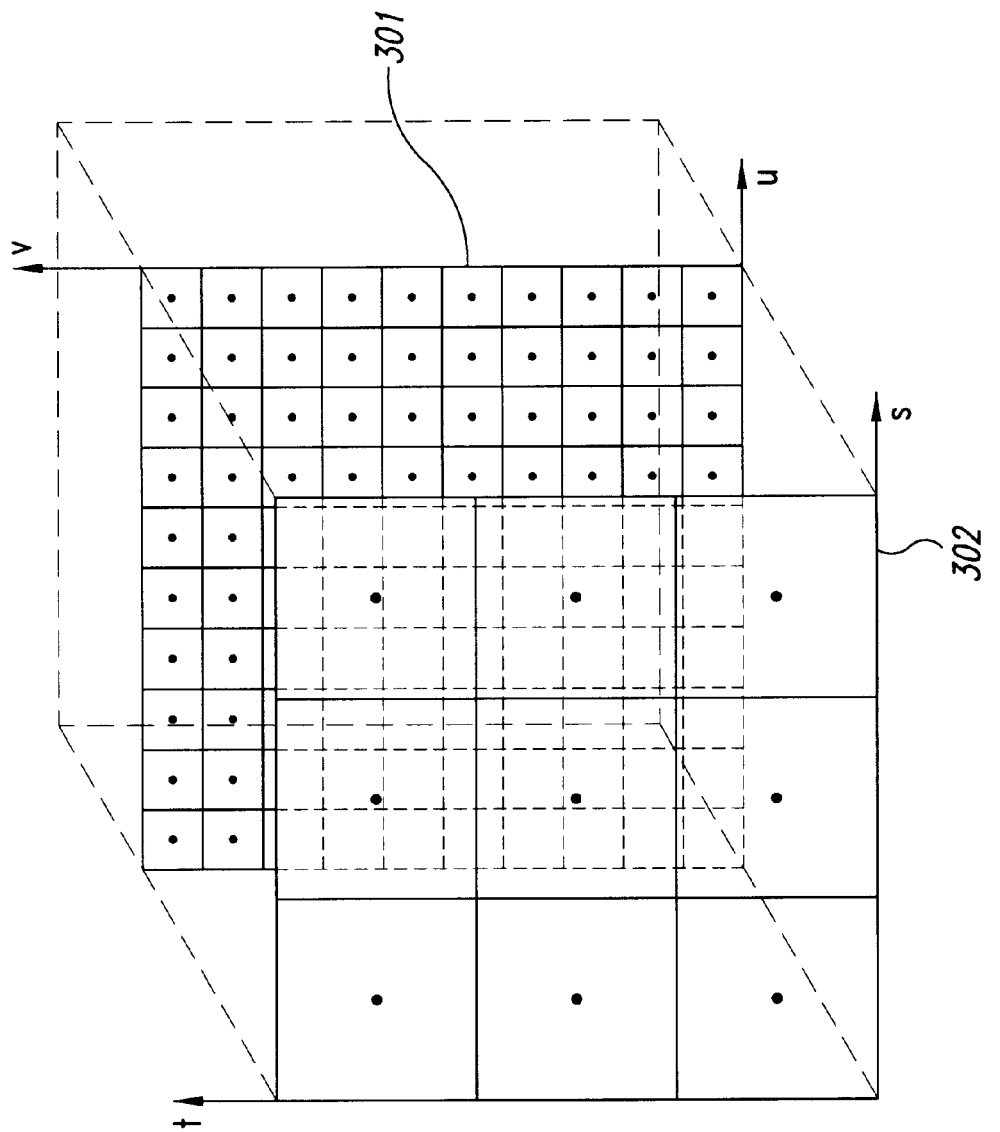
FIG. 3 illustrates a collection of intensity values, one for each Lumigraph direction, that is associated with a Lumigraph point.

FIG. 3 illustrates a collection of intensity values, one for each Lumigraph direction, that is associated with a Lumigraph point. The collection of these weighted average intensity values indexed by their Lumigraph point and their Lumigraph direction are the coefficients of the Lumigraph function and are stored as a Lumigraph data structure. The Lumigraph data structure represents a subset of the plenoptic function relevant to the object. These intensity values are illustrated as one 2-dimensional array, indexed by variables u and v, for every Lumigraph point. Thus, the Lumigraph data structure is a multi-dimensional array that contains intensity values indexed by an indication of a Lumigraph point and a Lumigraph direction. Each light ray (s, t, u, v) that passes through a Lumigraph point in one of the Lumigraph directions is referred to as a Lumigraph ray. The intensity value (coefficient) of a Lumigraph ray is the average of the intensity values in a pre-defined area. The Lumigraph rays for each face are considered to emanate from a plane 301 that is parallel to the face 302 of the cube and a unit distance from the face. Thus, each Lumigraph point has a different set of intensity values associated with it and stored in its 2-dimensional array.

In one embodiment, the Lumigraph system generates the output intensity value of the Lumigraph function by first identifying a light ray (s, t, u,, v) that forms a pixel of an image to be rendered. That is, the light ray that intersects point (s, t) on the face of the cube and that is in direction (u, v). Since the Lumigraph data structure contains intensity values for only the Lumigraph rays, the Lumigraph system identifies the Lumigraph ray that is nearest to the light ray (s, t, u, v) and uses its intensity value as the output of the Lumigraph function. The nearest Lumigraph ray is that light ray that passes through the Lumigraph point that is nearest to point (s, t) and in the Lumigraph direction that is nearest to the direction (u, v). Alternatively, the Lumigraph system may interpolate the output intensity value based on a collection of the Lumigraph rays that are near to light ray (s, t, u, v).

Figure 4:
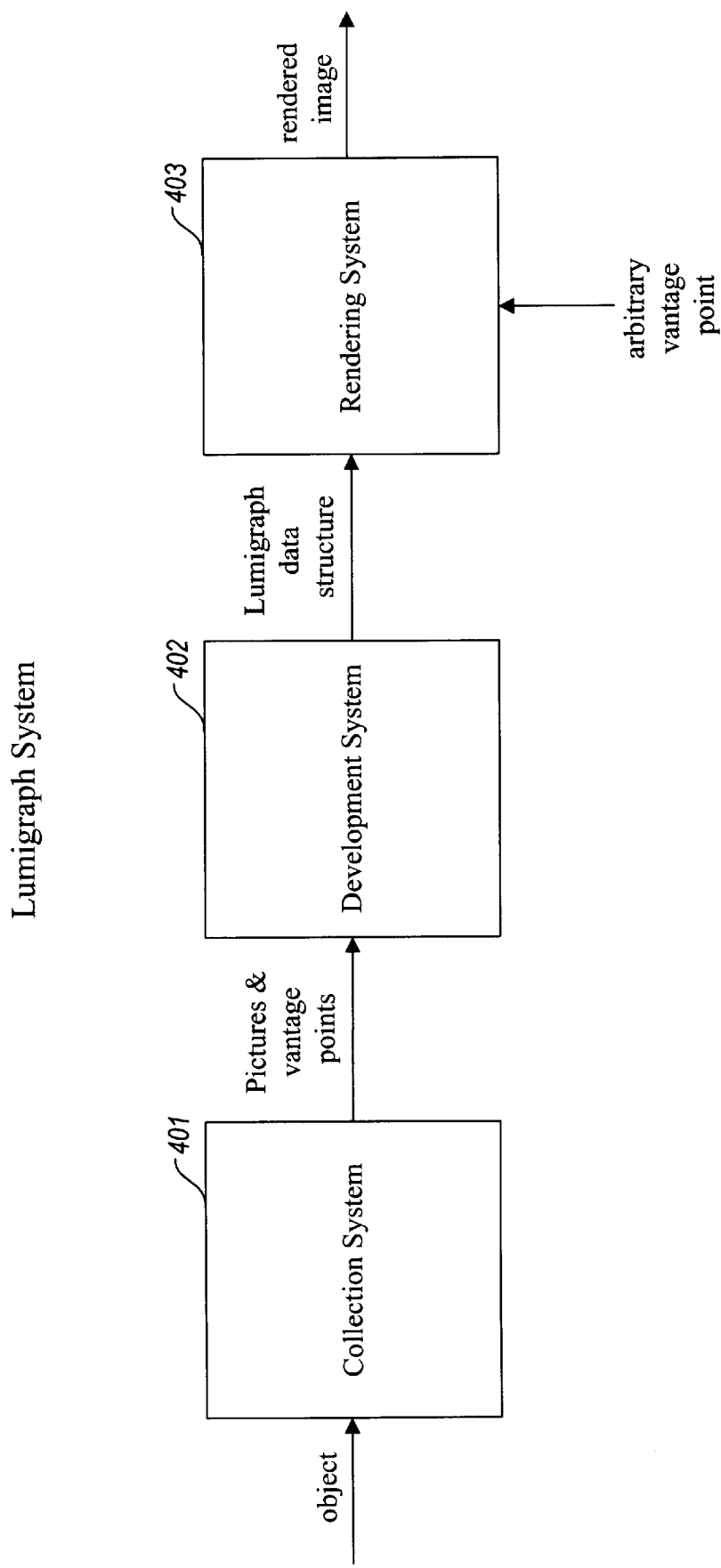
FIG. 4 is a block diagram illustrating the sub-systems of the Lumigraph system.

FIG. 4 is a block diagram illustrating the sub-systems of the Lumigraph system. The Lumigraph system comprises a collection system 401, a development system 402, and a rendering system 403. The collection system collects various pictures of the object, digitizes the pictures, and stores the digitized pictures along with their vantage points. The development system generates the weighted average intensity values of the Lumigraph rays from the intensity values of the collected pictures and stores those intensity values in the Lumigraph data structure. The rendering system then receives the Lumigraph data structure and an indication of an arbitrary vantage point and renders an image of the object from that vantage point.

Figure 5:
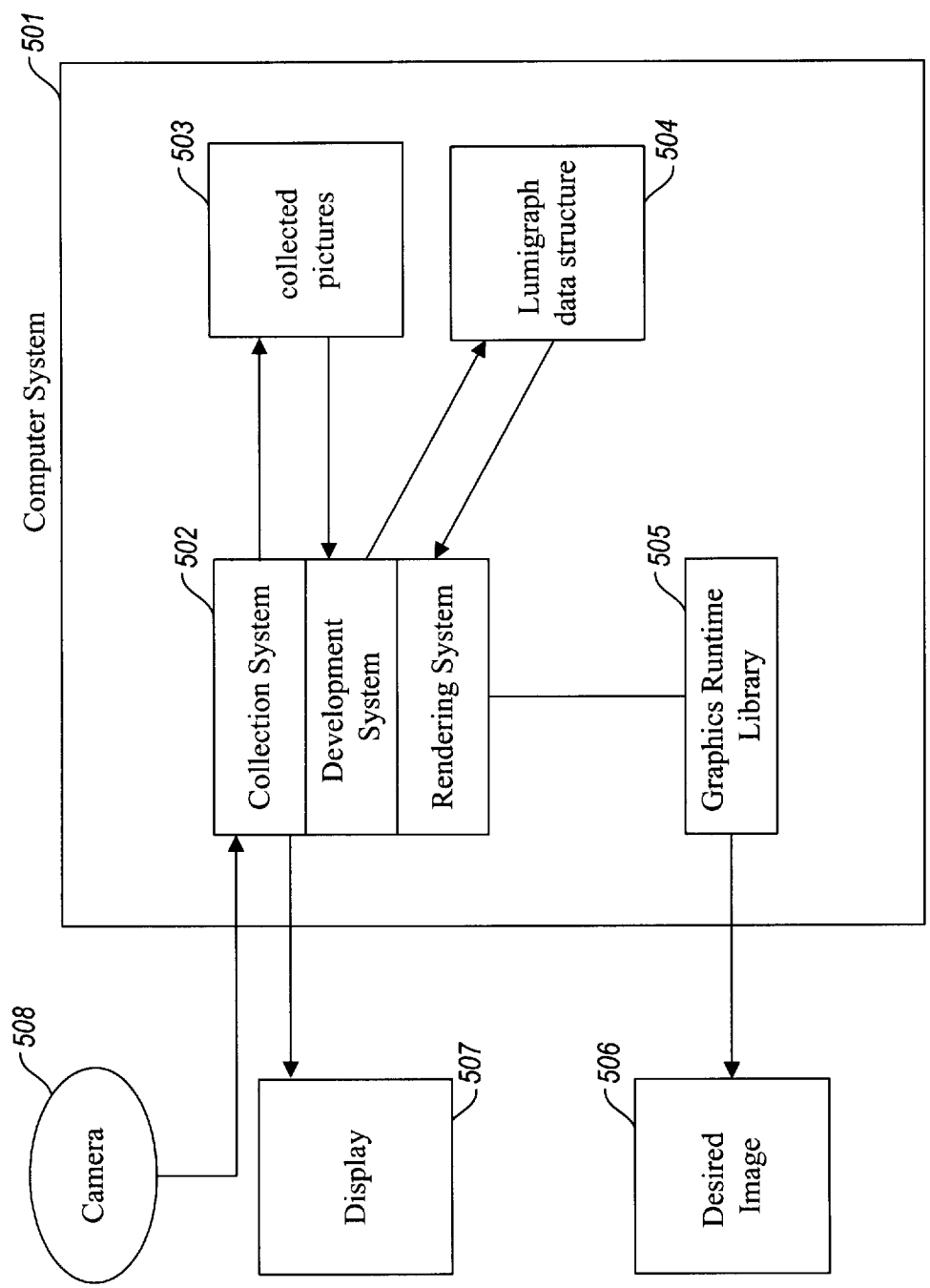
FIG. 5 is a block diagram illustrating a preferred computer system for digital plenoptic imaging.

FIG. 5 is a block diagram illustrating a preferred computer system for digital 3-dimensional imaging. In one embodiment, the computer system provides hardware support for graphics operations, such as provided by a Silicon Graphics workstation. Alternatively, the computer can be a standard personal computer without such hardware support. The computer system 501 contains a central processing unit, a memory, a storage device, and input/output devices. During operation, the sub-systems of the Lumigraph system 502 are loaded into and executed from the memory. The sub-system of the Lumigraph system are typically loaded into memory from a computer-readable memory device such as a disk. In addition, the collected pictures 503 and the Lumigraph data structure 504 are loaded from a storage device such as disk into memory for processing. The graphics run-time library 505 provides application programming is interface for graphics operations. The Lumigraph system uses the graphic run-time library to render the desired image 506. The camera 508 and display devices 507 are used to collect the pictures of the object.

In the following, a description of a preferred implementation of the invention is followed by an analysis describing the theoretical basis underlying the implementation. Also, several different aspects of the invention are described starting with aspects that are simpler to describe. Moreover, since the Lumigraph system performs the same computations relative to each face of the cube enclosing the object, reference is made in the following description to only a single face of the cube. Also, since the Lumigraph system performs the same computation for the red, green, and blue components of an "intensity" value, the following makes reference only to the term "intensity value." One skilled in the art would appreciate that the intensity values could also be represented by models other than the RGB model, such as gray scale, CMY, or YIQ models.

Collection System

Synthetic Objects

To generate a digital plenoptic image of a synthetic object (e.g., an object that is modeled with a polygon mesh), the Lumigraph system generates images of the object from vantage points corresponding to each Lumigraph point. The system then stores the intensity values for each image into the Lumigraph data structure. When each image has the same number of pixels as there are Lumigraph directions associated with a Lumigraph point, the system stores each intensity value directly into the corresponding position of the Lumigraph data structure. Conversely, if the number of pixels and Lumigraph directions differ, then the system may calculate average intensity values for storing in the Lumigraph data structure.

Gantry-Based System

In one embodiment, the collection system can collect a picture of the object at each of the Lumigraph points with an orientation that is normal to the face of the cube. The collection system then digitizes these pictures so that each pixel corresponds to one of the Lumigraph directions for that Lumigraph point. Alternatively, depending on the resolution of the pictures, the collection system may set each intensity value of a Lumigraph ray to the weighted intensity values of several pixels. The system then stores the intensity value of each pixel in the Lumigraph data structure indexed by the Lumigraph point and direction. Alternatively, the camera could be positioned on a robot ann and moved by the arm to each Lumigraph point, A disadvantage of such collection systems is the time and expense involved in setting up the gantry or robot arm and collecting the pictures.

Hand-Held Camera

In a preferred embodiment, the collection system quickly collects pictures taken from arbitrary vantage points and employs a development process to fill the Lumigraph data structure. The collection system receives pictures of the object placed on a specially-designed stage from various arbitrary vantage points. The collection system uses special markings on the stage to calculate the vantage point from which each picture was taken. Thus, the output of the collection system is a collection of digitized pictures along with the vantage point from which each picture was taken.

Figure 6:
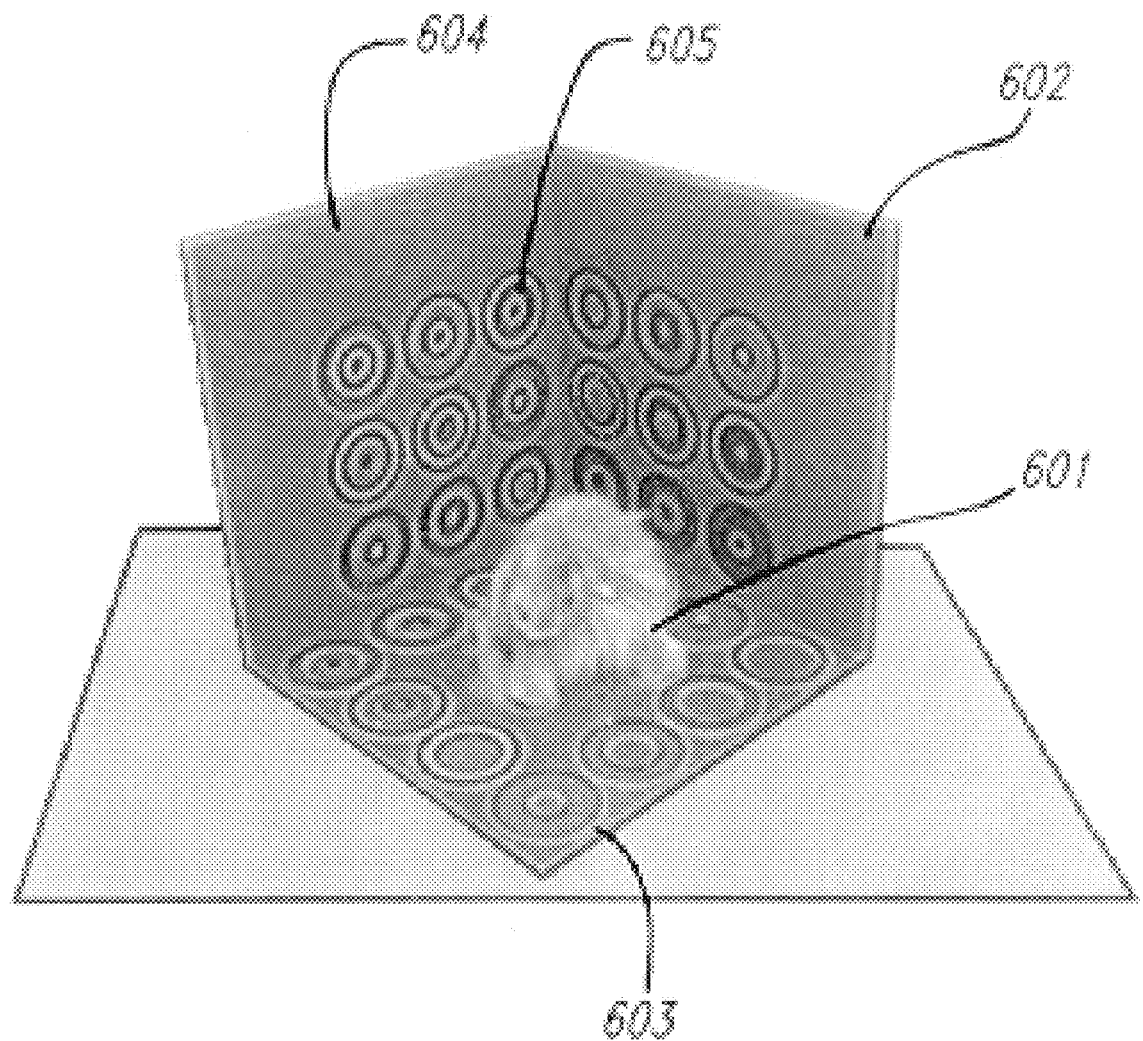
FIG. 6 illustrates the specially-designed stage for use in collecting the pictures.

FIG. 6 illustrates the specially-designed stage for use in collecting the pictures. The stage has two walls 604 and 602 fixed together at a right angle, both perpendicular to the base 603, which can be detached from the walls and rotated. The object 601 is placed at the center of the base. By rotating the base in 90° increments, a camera can be positioned to take pictures from any vantage point above the plane of the base. The stage is preferably painted cyan to allow the collection system to distinguish the object from the background. The walls and base of the stage are inscribed with markers 605 colored a darker shade of cyan. Each marker preferably comprises a set of concentric rings, and each marker is uniquely identifiable.

The stage is designed so that the collection system can determine the vantage point solely from the markers in a picture. The collection system automatically determines the vantage point of a picture by (1) identifying those markers not occluded by the object, (2) scanning the picture for connected components, (3) uniquely identifying each marker based on the ratios of the radii of the concentric rings comprising the marker, and (4) calculating the vantage point from the relative positions of identified markers within the picture.

The camera preferably has a fixed lens. Prior to collecting the pictures, the collection system determines the mapping between each possible light ray impinging on its lens and the points on its film plane where the impinging light ray will fall. This mapping is used by the collection system to calculate the camera position and orientation (i.e., vantage point) from the positions of the markers in a picture.

Figure 7:
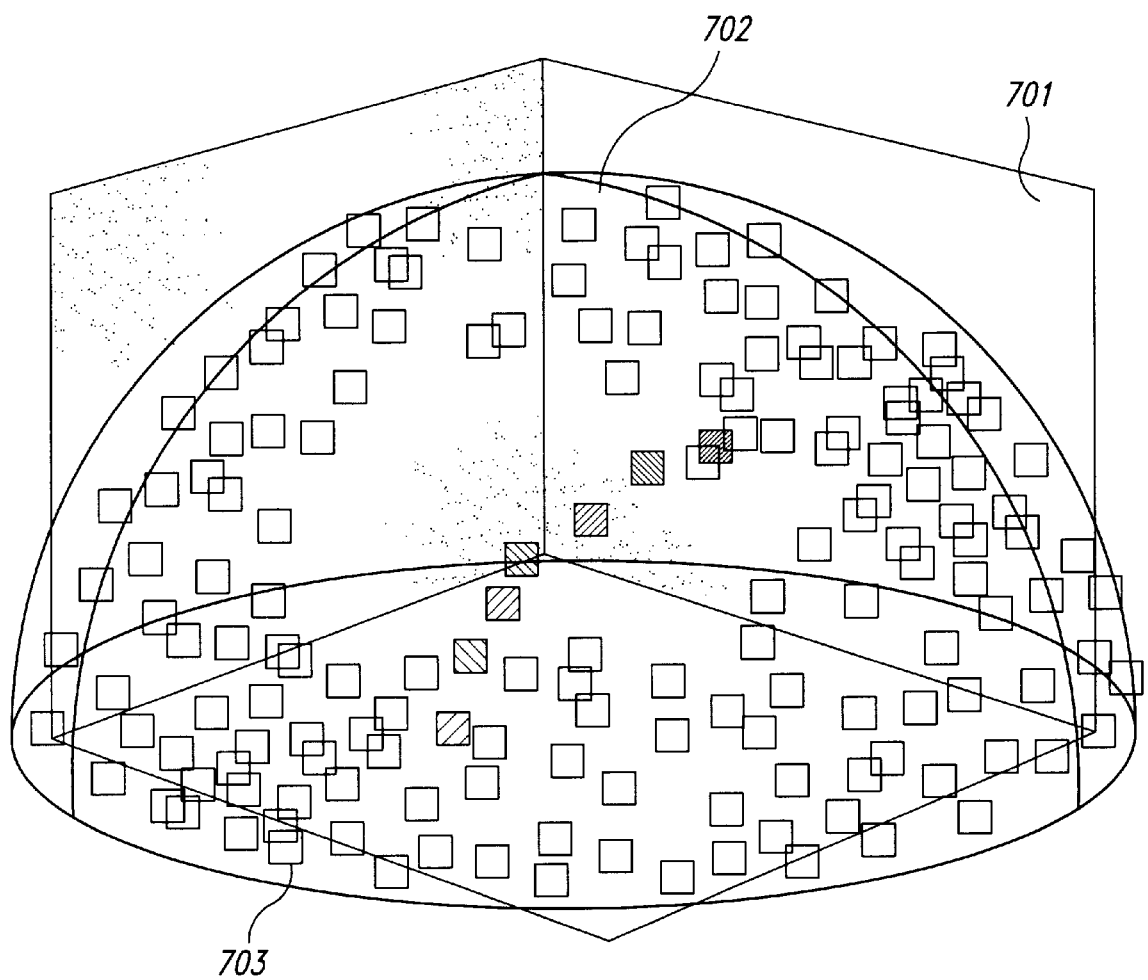
FIG. 7 illustrates the collection user interface.

While pictures are being taken by an operator using the hand-held camera, it is preferable that the operator obtains a reasonable sampling of all possible vantage points. To facilitate taking a reasonable sample, a collection system displays a collection user interface. FIG. 7 illustrates the collection user interface. The user interface displays a representation of the stage 701 with a translucent hemisphere 702 surrounding the object. The user interface displays an indication of the different orientations from which pictures have been taken on the surface of the hemisphere, as a trail of rectangular shapes 703. Alternatively, the pictures can be taken from various pre-defined vantage points. Taking the pictures from predefined vantage points would obviate the use of the special markers and calculating the vantage points for each picture, since the vantage points would be known in advance.

Development System

The development system for the gantry-based collection system is straightforward. Each pixel of the digitized picture corresponds to a weighted average intensity value of a Lumigraph ray. Thus, the development system stores the intensity value from the pixel into the Lumigraph data structure. The development system for the hand-held camera collection system, however, is not so straightforward. With the hand-held camera, the pictures are unlikely to be collected from the Lumigraph points and are likely to be unevenly spaced. Consequently, the development system needs to account for the arbitrary vantage points and uneven spacing.

The development system for the hand-held camera collection system is divided into three phases: splatting, pulling, and pushing. In the splatting phase, the development system initializes the intensity value for each Lumigraph ray to an intensity value based on the collected pictures and assigns a confidence level. The confidence level indicates the confidence that the development system has that the initial intensity value accurately represents the actual average intensity value corresponding to the Lumigraph ray. In the pulling phase, the development system calculates the average intensity values and average confidence levels for a series of lower resolution Lumigraph data structures. The resolution of a Lumigraph data structure is the number of Lumigraph rays represented in the data structure. In the pushing phase, the collection system adjusts the intensity levels of the Lumigraph rays with low confidence levels based on the average intensity levels calculated for the lower resolution Lumigraph data structures. The pulling and pushing phases combine to form a scattered data approximation algorithm.

In splatting phase, the development system establishes the initial intensity value along with a confidence level for each Lumigraph ray at the highest resolution. If the collection system collected one or more pictures with a pixel formed, in part, from a light ray that happens to be very near a Lumigraph ray, then the confidence level in the initial intensity value for that Lumigraph ray would be high. Conversely, if the collection system collected no light rays near a certain Lumigraph ray, then the confidence level in the initial intensity value of that Lumigraph ray would be low. The collection system calculates the initial intensity value of each Lumigraph ray by applying a constant or, preferably, a quadralinear averaging filter function. The filter functions indicate how the various intensity values of the collected pictures are to be combined to generate an initial intensity value. The development system calculates the coordinates (s, t, u, v) for each pixel of each picture based on the position of the pixel on the picture, the vantage point of the picture, and the characteristics of the camera or optionally uses the depth corrected coordinates (s, t, u', v') as described below.

With a constant basis function, the intensity values of the collected light rays that are nearest to each Lumigraph ray are averaged to give the initial intensity value for that Lumigraph ray. A collected light ray (s, t, u, v) is "nearest" a Lumigraph ray $(s_i, t_j, u_p, v_q)$ when the following condition is satisfied:

$$|s - s_i| < \frac{h_{st}}{2} \text{ and } |t - t_j| < \frac{h_{st}}{2} \text{ and } |u - u_p| < \frac{h_{uv}}{2} \text{ and}$$

$$|v - v_q| < \frac{h_{uv}}{2}$$

where $h_{st}$ is the distance between neighboring Lumigraph points and $h_{uv}$ is the distance between neighboring Lumigraph directions. The equation for the constant basis function is:

$$B_{i,j,p,q}(s, t, u, v) =$$

$$\begin{cases} 1 \text{ if collected light ray } (s,t,u,v) \text{ is nearest Lumigraph light ray} \\ \phantom{1 if} (s_i, t_j, u_p, v_q) \\ 0 \text{ otherwise} \end{cases}$$

The constant basis function can be considered to be a function that receives the (s, t, u, v) and $(s_i, t_j, u_p, v_q)$ coordinates and generates a 1 when the collected light ray (s, t, u, v) is nearer to the Lumigraph ray $(s_i, t_j, u_p, v_q)$ than any other Lumigraph ray. The equation for the initial intensity value $x_{i,j,p,q}$ for Lumigraph ray $(s_i, t_j, u_p, v_q)$ is:

$$x_{i,j,p,q} = \frac{1}{w_{i,j,p,q}} \sum_{\Re}^{R} B_{i,j,p,q}(s,t,u,v) * x_{s,t,u,v} \quad (1)$$

where $\Re$ is the collection of all collected light rays, where $x_{s,t,u,v}$ is the intensity value of collected light ray (s, t, u, v), and where $w_{i,j,p,q}$ is the confidence level represented by the following equation:

$$w_{i,j,p,q} = \sum^{R} B_{i,j,p,q}(s,t,u,v) \quad (2)$$

That is, for the constant basis function, $w_{i,j,p,q}$ is equal to the count of the number of collected light rays that are nearer Lumigraph ray $(s_i, t_j, u_p, v_q)$ than any other Lumigraph ray.

The development system preferably uses a quadralinear basis function to calculate weighted average intensity values of the collected light rays. With a quadralinear basis function, the intensity values of the collected light rays that are in between a certain Lumigraph ray and its neighboring Lumigraph rays are averaged with a weight based on distance of the collected light ray from the certain Lumigraph ray to give the initial intensity value. A collected light ray (s, t, u, v) is "near" Lumigraph ray $(s_i, t_j, u_p, v_q)$ when the following condition is satisfied:

$$|s-s_i|<h_{st} \text{ and } |t-t_j|<h_{st} \text{ and } |u-u_p|<h_{uv} \text{ and } |v-v_q|<h_{uv} \quad (3)$$

The equation for the quadralinear basis function is:

The value of the quadralinear basis function varies from 1 when the collected light ray (s, t, u, v) coincides with the Lumigraph ray $(s_i, t_j, u_p, v_q)$ to 0 when the collected light ray is not near the Lumigraph ray. Thus, the equations for the initial intensity value $x_{i,j,p,q}$ and the initial confidence level $w_{i,j,p,q}$ using the quadralinear basis function are the same as equations (1) and (2) with the quadralinear basis function used for function $B_{i,j,p,q}$. The confidence level, when the quadralinear basis function is used, is thus the sum of the results of the basis functions for each Lumigraph ray, that is, a weighted sum of the number of collected light rays that are near the Lumigraph ray. If the confidence level is 0, then no collected light ray are near that Lumigraph ray and the initial intensity level is undefined.

Figure 8:
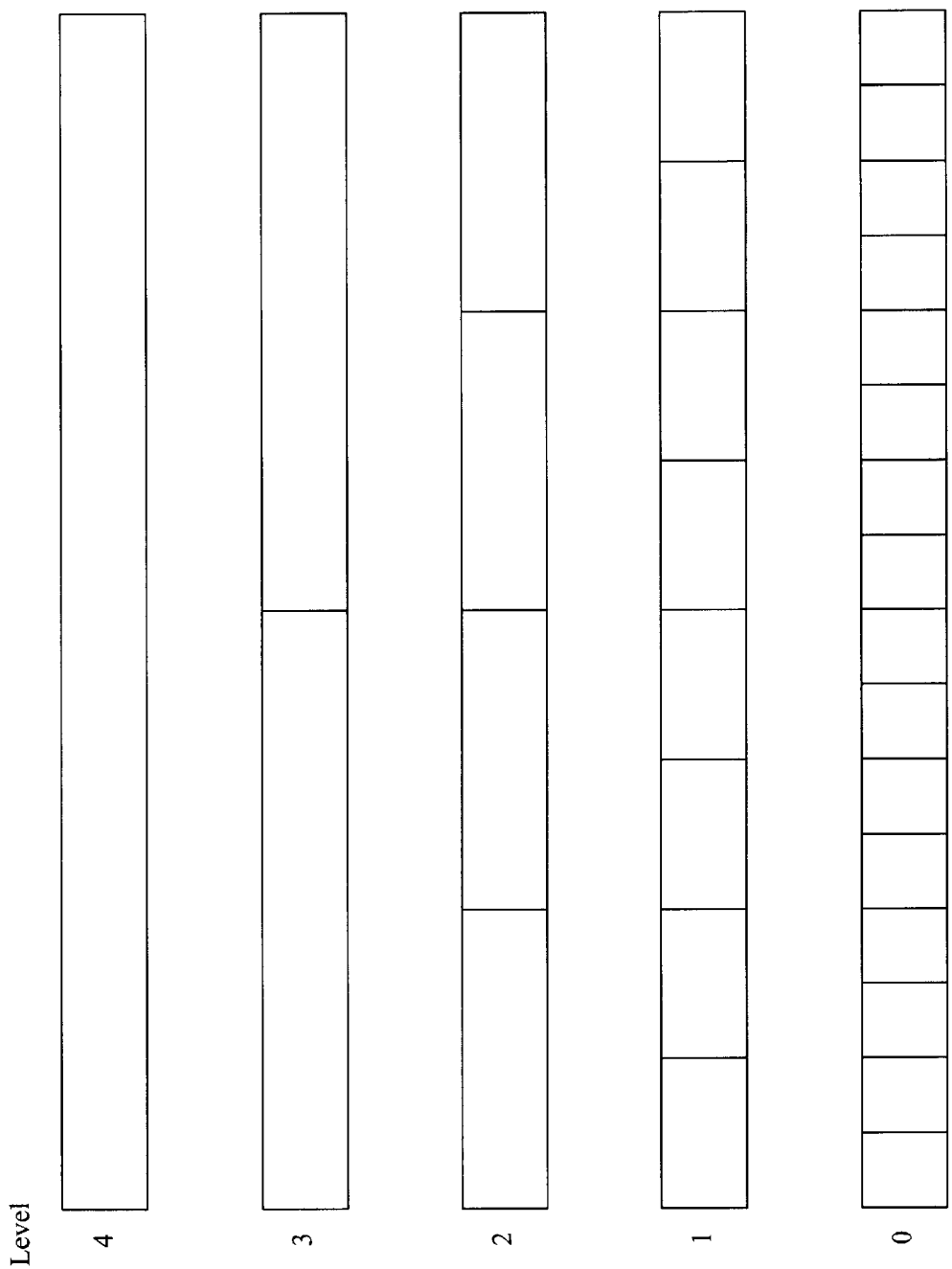
FIG. 8 illustrates the lower resolution Lumigraph data structures in one dimension.

In the pulling phase, the development system generates the intensity values for each light ray of increasingly lower resolution Lumigraph data structures. The intensity value and confidence level of a Lumigraph ray at one resolution are calculated from the next higher resolution. Each lower resolution Lumigraph data structure represents onesixteenth the number of Lumigraph rays as the next higher resolution Lumigraph data structure. For example, if the highest resolution Lumigraph data structure represented $2^{24}$ Lumigraph rays, then the next lower resolution would be $2^{20}$, followed by $2^{16}, 2^{12}, 2^8, 2^4,$ and $2^0$. FIG. 8 illustrates the lower resolution Lumigraph data structures in one dimension. Level 0 is the highest resolution and level 4 is the lowest resolution. Each level for one dimension contains half the number of Lumigraph rays as the next higher resolution level. The highest resolution Lumigraph data structure, that is, that Lumigraph data structure which is filled with initial intensity values in the splatting phase, is referred to as level 0 and its intensity values and confidence levels are $x_{i,j,p,q}^0$ and $w_{i,j,p,q}^0$. The intensity values and confidence levels for each lower resolution Lumigraph data structure are represented by the following equations.

$$w_{i,j,p,q}^{r+1} = \sum_k \tilde{h}_{k,ijpq} \min(w_k^r, 1)$$

$$x_{i,j,p,q}^{r+1} = \frac{1}{w_{i,j,p,q}^{r+1}} \sum_k \tilde{h}_{k,ijpq} \min(w_k^r, 1) * x_k^r$$

where the index k ranges over each i, j, p, and q at level r and where the filter sequence $\tilde{h}$ represents:

$$\tilde{h}_{k,ijpq} = \tilde{h}_{k,i} * \tilde{h}_{k,j} * \tilde{h}_{r,p} * \tilde{h}_{r,q}$$

and where the filter sequence $\tilde{h}_{k,i}$ represents:

$$\tilde{h}_{k,i} = \begin{cases} 1 & \text{if } k-2i=0 \\ 1/2 & \text{if } |k-2i|=1 \\ 0 & \text{otherwise} \end{cases}$$

The factor $\min(w_k^r, 1)$ ensures that intensity values with very high confidence levels do not dominate intensity values with lower confidence levels. A confidence level of 1 indicates full confidence. The sequence $\tilde{h}_k$ varies from 0 to 1 in increments of $\frac{1}{16}$ and indicates the contribution that each Lumigraph ray of the higher resolution data structure contributes to a Lumigraph ray at the next lower resolution data structure. For example, for intensity values $x_{10,10,10,10}^0$ and $x_{5,5,5,5}^1$, the result of the filter sequence $\tilde{h}_{k,ijpq}$ would equal 1. Consequently, intensity value $x_{10,10,10,10}^0$ would fully contribute to the weighted average intensity value $x_{5,5,5,5}^1$. However, intensity value $x_{9,11,9,11}^0$ would contribute only $\frac{1}{16}^{th}$ of its intensity value to the weighted average intensity value $x_{10,10,10,10}^1$ because the result of function $\tilde{h}_{k,ijpq}$ would equal $\frac{1}{16}^{th}$. Also, each of the 81 ($3^4$) nearest Lumigraph rays at level r contributes an amount $\tilde{h}_{k,ijpq}$ to an intensity value confidence level at level r+1. The Lumigraph rays at each level are is indexed starting at (0, 0, 0, 0). So, if the last Lumigraph ray at level 0 is indexed by (31, 31, 255, 255), then the last Lumigraph ray at level 1 would be indexed by (15, 15, 127, 127). One skilled in the art would appreciate that other filter sequences can be used for average intensity values over a wider range of light rays at the next lower level.

The pushing phase starts at the lowest resolution Lumigraph data structure, and adjusts the intensity values and confidence levels for each higher resolution data structure. For each level, the development system calculates the temporary confidence levels $tw_{i,j,p,q}^r$ and intensity levels $tx_{i,j,p,q}^r$ that are an interpolation of the current confidence levels $w_{i,j,p,q}^{r+1}$ and intensity levels $x_{i,j,p,q}^{r+1}$ at the next higher level. Conceptually, these temporary confidence levels and intensity values represent the maximum amount by which the confidence level $w_{i,j,p,q}^r$ and intensity value $x_{i,j,p,q}^r$ are adjusted during the pulling phase. The confidence levels and intensity values at a level are adjusted by an amount of the temporary amounts that is proportional to 1 minus the current confidence level at that level. That is, if the confidence level $w_{i,j,p,q}^r$ is 1, then the intensity value $x_{i,j,p,q}^r$ is not adjusted; if the confidence level is 0.5, then the intensity value is adjusted by one-half of the temporary intensity value; and if the current level is 0, then the intensity value is set equal to the temporary intensity value. The development system calculates the confidence levels in an analogous manner. Following are equations representing the temporary confidence levels and intensity values:

$$tw^r_{i,j,p,q} = \sum_k \tilde{h}_{k,ijpq} \min(w^{r+1}_k, 1)$$

$$tx^r_{i,j,p,q} = \frac{1}{tw^r_{i,j,p,q}} \sum_k \tilde{h}_{k,ijpq} \min(w^{r+1}_k, 1) * x^{r+1}_k$$

where k varies over each Lumigraph ray at level r+1 and i,j,p, and q vary at level r over each light ray. The adjusting of the intensity values and confidence levels are represented by the following equation:

$$x_{i,j,p,q}{}^r = tx_{i,j,p,q}{}^r(1-w_{i,j,p,q}{}^r) + w_{i,j,p,q}{}^r x_{i,j,p,q}{}^r$$

$$w_{i,j,p,q}{}^r = tw_{i,j,p,q}{}^r(1-w_{i,j,p,q}{}^r) + w_{i,j,p,q}{}^r$$

The factor $(1-w_{i,j,p,q}{}^r)$ represents the weighting of the temporary amounts. In the pushing phase, the development system uses the intensity values and confidence levels from the lower resolution Lumigraph data structure to fill the intensity values and confidence level of the higher resolution Lumigraph data structures. If a high resolution Lumigraph ray has a high confidence level, then its intensity value is left unchanged. However, if a Lumigraph ray has a low confidence level, then its intensity value may be changed to reflect the intensity values of nearby Lumigraph rays with higher confidence levels.

The depth correction described below may optionally be used to alter the filter sequence.

The combination of the pushing and pulling phase are a scattered data approximation algorithm. A scattered data approximation algorithm receives an input of scattered data and then fills in missing data by calculating an estimate of the values for the missing data. For example, if a 2-dimensional image is to be filled in and the scattered data represents 10% of the pixels of the image selected in a random manner, then the scatter data approximation would calculate values for the other 90% of the pixels. The preferred scattered data approximation algorithm preferably takes into consideration the confidence level in each of the input pixels.

Figure 9A:
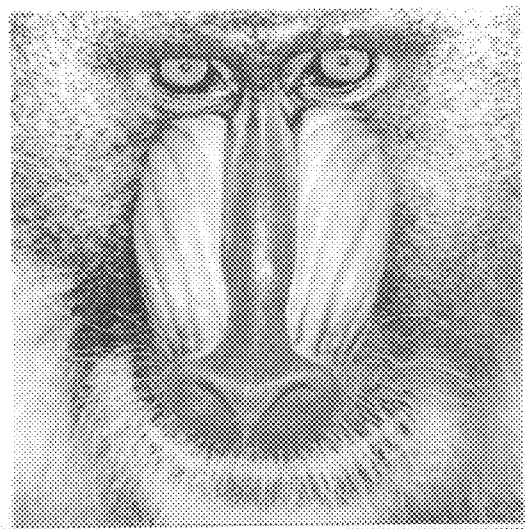
FIGS. 9A–E illustrate the preferred scattered data approximation algorithm applied to 2-dimensional data.
Figure 9B:
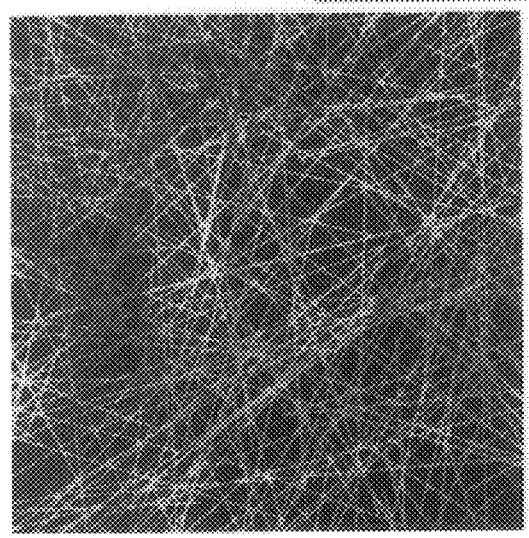
Figure 9D:
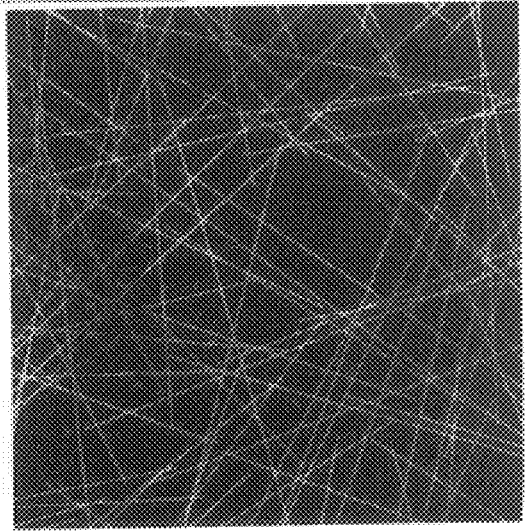
Figure 9C:
Figure 9E:

FIGS. 9A–E illustrate the preferred scattered data approximation algorithm applied to 2-dimensional data. FIG. 9A is a picture of a mandrill. FIG. 9B illustrates the picture sampled along 256 line segments, and FIG. 9C illustrates the image reconstructed using the scattered data reconstruction algorithm in two dimensions. FIG. 9D illustrates the picture sampled along 100 line segments, and FIG. 9E illustrates that image reconstructed.

FIGS. 10–12 illustrate the scattered data approximation algorithm for 1-dimensional images. A 1-dimensional image can be considered to be a line with a grey scale intensity that varies. FIG. 10 shows the initial confidence levels (C.L.) and intensity values (I.V.) at level 0 in the pulling phase 1001. The line is divided into 16 pixels as indicated by 16 entries at level 0. The data 1003 corresponds to one pixel at one end of the line with a confidence level of 1 and an intensity value of 255 and all other pixels with confidence levels and intensity values of 0. The confidence levels and intensity values for levels 1–4 are also shown. Each level has one-half the number of entries of the next lower level. FIG. 10 also shows the confidence levels and intensity values as adjusted in the pushing phase 1002. Level 0 contains the final approximated intensity values. In this case since only one intensity value was input initially, all the intensity values are set equal to that value. However, the final approximated confidence levels decrease based on distance from the end of the line with the confidence level of 1. FIG. 11 illustrates an approximation when the intensity values at each end of the line are known. In this case, one end of the line has an intensity value of 255 and the other end has an intensity value of 0, both with a confidence level of 1. As expected, the algorithm sets the final approximated intensity values range from 255 to 0 along the line. FIG. 12 illustrates an approximation when the intensity values of the pixel at each end of the line are known and in the center are known. In this case, the ends have an intensity value of 255 and the center has an intensity value of 0 and the confidence level at one end is 1.0, but only 0.5 at the center and the other end. The algorithm sets the final approximated intensity levels to vary from 255 to 32 to 248. Since the center pixel only had a confidence level of 0.5, the end point with the confidence level of 1.0 had an effect on the final approximated intensity value.

Rendering System

The rendering system receives a Lumigraph data structure and a desired vantage point and renders an image of the object from that desired vantage point. The rendering system can use one of several rendering techniques such as ray tracing or texture mapping. Either rendering technique can use a constant basis function or a quadralinear basis function.

Figure 13:
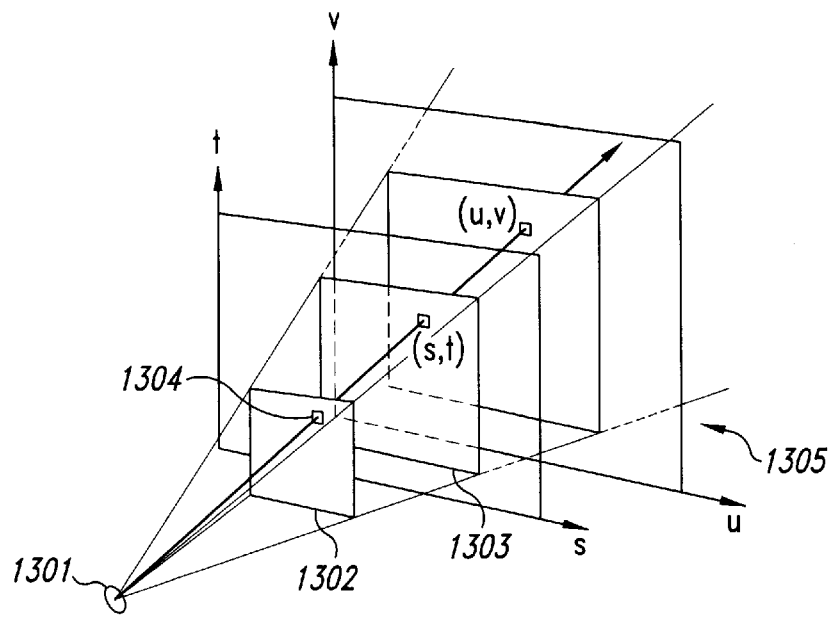
FIG. 13 is a diagram illustrating the rendering of an image using ray tracing.

FIG. 13 is a diagram illustrating the rendering of an image using ray tracing. The desired image 1302 has a center of projection of 1301. The st plane 1303 represents one face of the cube and contains the Lumigraph points, and the uv plane 1305 represents the Lumigraph directions corresponding to a Lumigraph point. A light ray can be considered to pass through the point (s, t) in the direction (u, v) and intersect pixel 1304 on the image and the center of projection 1301. To render the image, the rendering system selects each pixel of the desired image and calculates the (s, t, u, v) coordinates of the light ray that intersects the center of projection and the selected pixel. Generally, the (s, t, U, v) coordinates will not correspond exactly to a Lumigraph point or a Lumigraph direction.

The rendering system evaluates the Lumigraph function using the Lumigraph data structure generated by the development system. The rendering system generates a resultant intensity value using either a constant basis function or a quadralinear basis function. Below is the equation for the constant basis function.

$$B_{i,j,p,q}(s, t, u, v) = \begin{cases} 1 \text{ if collected light ray } (s,t,u,v) \text{ is nearest Lumigraph light ray} \\ \quad (s_i, t_j, u_p, v_q) \\ 0 \text{ otherwise} \end{cases}$$

That is, with the constant basis function, the rendering system selects the intensity value of the Lumigraph ray $(s_i, t_j, u_p, v_q)$ that is nearest the input light ray (s, t, u, v) as the resultant intensity value of the Lumigraph function. Below is the equation for the quadralinear basis function.

$$B_{i,j,p,q}(s, t, u, v) =$$

$$\begin{cases} \left(1 - \frac{|s-s_i|}{h_{st}}\right)\left(1 - \frac{|t-t_j|}{h_{st}}\right)\left(1 - \frac{|u-u_p|}{h_{uv}}\right)\left(1 - \frac{|v-v_q|}{h_{uv}}\right) \\ \quad \text{if calculated light ray } (s, t, u, v) \text{ is near Lumigraph} \\ \quad \text{light ray } (s_i, t_j, u_p, v_q) \\ 0 \quad \text{otherwise} \end{cases}$$

With the quadralinear basis function, the rendering system combines the intensity values of the 16 Lumigraph rays ($s_i$, $t_j$, $u_p$, $v_q$) that are near the input light ray (s, t, U, v) weighted by their distance from the input. Below is the equation of the Lumigraph function $\tilde{L}$.

$$\tilde{L}(s, t, u, v) = \sum_{i=0}^{M}\sum_{j=0}^{M}\sum_{p=0}^{N}\sum_{q=0}^{N} x_{i,j,p,q} B_{i,j,p,q}(s, t, u, v)$$

where the st plane contains M×M Lumigraph points and the uv plane contains N×N directions. The ray tracing of each pixel of the image can be computational expensive. However, the hardware-supported texture mapping of certain graphics workstations can be used to efficiently render the image.

Texture mapping that is supported by these graphic workstations refers to the process of designating a target polygon, designating source intensity values in a source polygon (texture), filling the target polygon with the intensity values from the source polygon, and rendering the target polygon to the image. If the source and target polygons do not have the same dimensions, then the texture mapping algorithm "adjusts" the source polygon so that the source polygon "fits" into the target polygon. Such adjustments typically involve "stretching" or "contracting" the texture. These graphics workstations support bilinear interpolation when texture mapping and alpha blending of the target polygon with the data already in the image.

Figure 14:
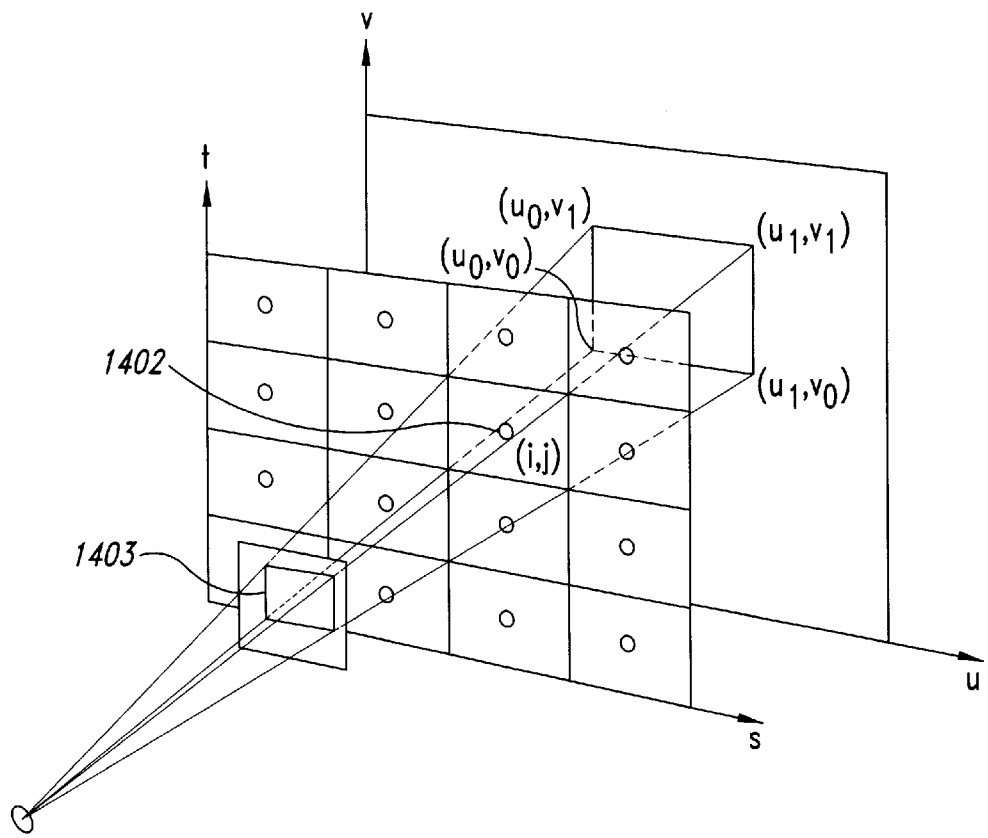
FIG. 14 illustrates the rendering of an image using texture mapping with a constant basis function.

FIG. 14 is a diagram illustrating the rendering of an image using texture mapping with a constant basis function. To take advantage of the hardware-supported texture mapping, the rendering system defines a graphics object corresponding to the cube and treats each 2-dimensional array of intensity values that corresponds to a Lumigraph point as a texture map. To render the desired image, the rendering system defines a square target polygon 1403 on a face of the graphics object for each Lumigraph point so that the Lumigraph point is at the center of the square. The rendering system then identifies from the light rays that pass through the corners of that square and intersect the center of projection of the desired image. The intersection of those four light rays with uv plane define a source polygon on the uv plane. The rendering system then texture maps the square target polygon with intensity values from the source polygon of the uv plane.

To texture map using a quadralinear function, the rendering system considers the quadralinear basis function to be a combination of two bilinear basis functions. Below are equations illustrating the quadralinear basis function is a combination of two bilinear basis functions.

$$B_{i,j,p,q}(s, t, u, v) = B_{i,j}(s, t) * B_{p,q}(u, v)$$

$$B_{p,q}(u, v) = \left(1 - \frac{|u-u_p|}{h_{uv}}\right)\left(1 - \frac{|v-v_q|}{h_{uv}}\right)$$

$$B_{i,j}(s, t) = \left(1 - \frac{|s-s_i|}{h_{st}}\right)\left(1 - \frac{|t-t_j|}{h_{st}}\right)$$

Typical hardware-supported texture mapping can automatically perform bilinear interpolation when texture mapping. Thus, although texture mapping with a quadralinear basis function is not supported, the rendering system does take advantage of the hardware support for texture mapping with bilinear interpolation. Thus, the rendering system uses texture mapping with a bilinear basis function to texture map from the uv plane to the graphics object.

The hardware support, however, does allow the target polygon to be alpha blended into the image during rendering. Alpha blending refers to a process by which the target polygon is combined with the image as it is rendered. To alpha blend, each vertex of the target polygon is assigned a weight. A weight is calculated for each pixel of the target polygon based on its distance from each of the vertices. The calculated weight is a linear combination of the weights of the vertices. When a pixel of the target polygon is rendered, the weighted intensity value of the pixel is added to the intensity value of the corresponding pixel of the image. For example, if the weight of a pixel is one, then its full intensity value is added to the image. However, if its weight is one-half, then only one-half of its intensity value is added to the image.

Figure 15A:
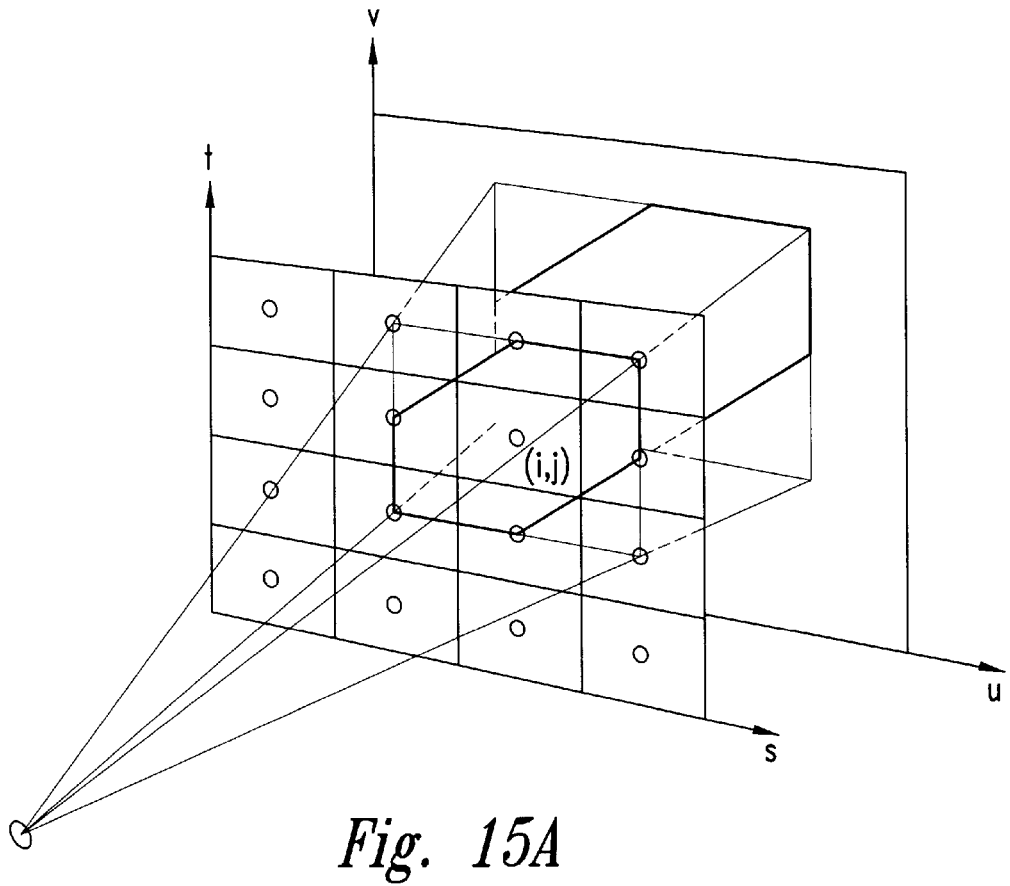
FIGS. 15A–C illustrate the texture mapping using an approximation of the quadralinear basis function.
Figure 15B:
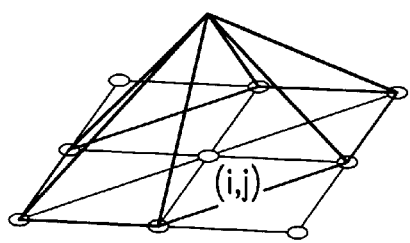
Figure 15C:
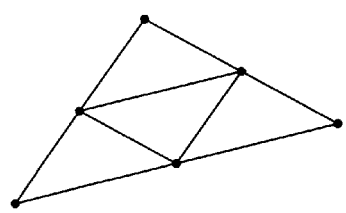

FIGS. 15A, 15B, and 15C illustrate the texture mapping using an approximation of the quadralinear basis function. In a preferred embodiment, for each Lumigraph point of the graphics object a hexagon is defined as shown in FIG. 15B. Each hexagon is sub-divided into 6 triangles. Each triangle is part of 3 different hexagons, one for each vertex. When texture mapping, the rendering system selects each Lumigraph point. Then, for each of the six triangles in the hexagon for that Lumigraph point, the rendering system identifies the three points on the uv plane that correspond to the vertices. The three points on the uv plane define the texture. The vertex of the target polygon corresponding to the center of the hexagon is assigned an alpha value (weight) of 1 and the other two vertices are assigned an alpha value of 0. When the target polygon is rendered, the texture is applied to the target polygon and the target polygon is alpha blended with the image. Thus, the rendering system approximates the quadralinear basis function with a combination of a bilinear is and linear basis functions.

In an alternative embodiment when using depth correction (described below), the resolution of the desired image can be further enhanced by subdividing each hexagon into more than 6 triangles. For example, each of the 6 triangles can be further divided into 4 sub-triangles. FIG. 15C shows a triangle divided into 4 sub-triangles. The mid-point of each side of the larger triangle is connected to form the 4 sub-triangles. When texture mapping a sub-triangle, the alpha values at the mid-points are set to 0.5 and the alpha values at the vertices of the triangle are set to 1 or 0 as discussed above.

The above rendering assumes that the desired image is from a vantage point that is outside the cube. However, if the vantage point is inside the cube, the processing is slightly different. In particular, the center of projection is inverted so that it lies nearer the center of the cube than the desired image. When using a graphics system that uses a virtual camera placement for rendering onto the graphics object, the virtual camera is flipped about the face of the cube and inverted.

Depth Correction

If the object represented by the Lumigraph data structure were flat, and the object were to lie in the uv plane, the basis functions described above would provide a good selection and weighting of Lumigraph rays from which to interpolate the intensity in a given (s,t,u,v) direction. However, most objects have 3-dimensional surfaces, parts of which protrude in front of the uv plane, and other parts of which extend behind the uv plane. For such objects, the above-described basis functions do not select and weight light rays to produce a Lumigraph data structure from which optimally focused images can be generated. This problem is analogous to the problem of focus in camera systems. If the objects that are being imaged do not lie at approximately the same distance from the camera, then they will not all appear to be focused in the resulting image. Objects that lie both in front of and behind the plane of focus will appear blurred in the image.

Figure 16:
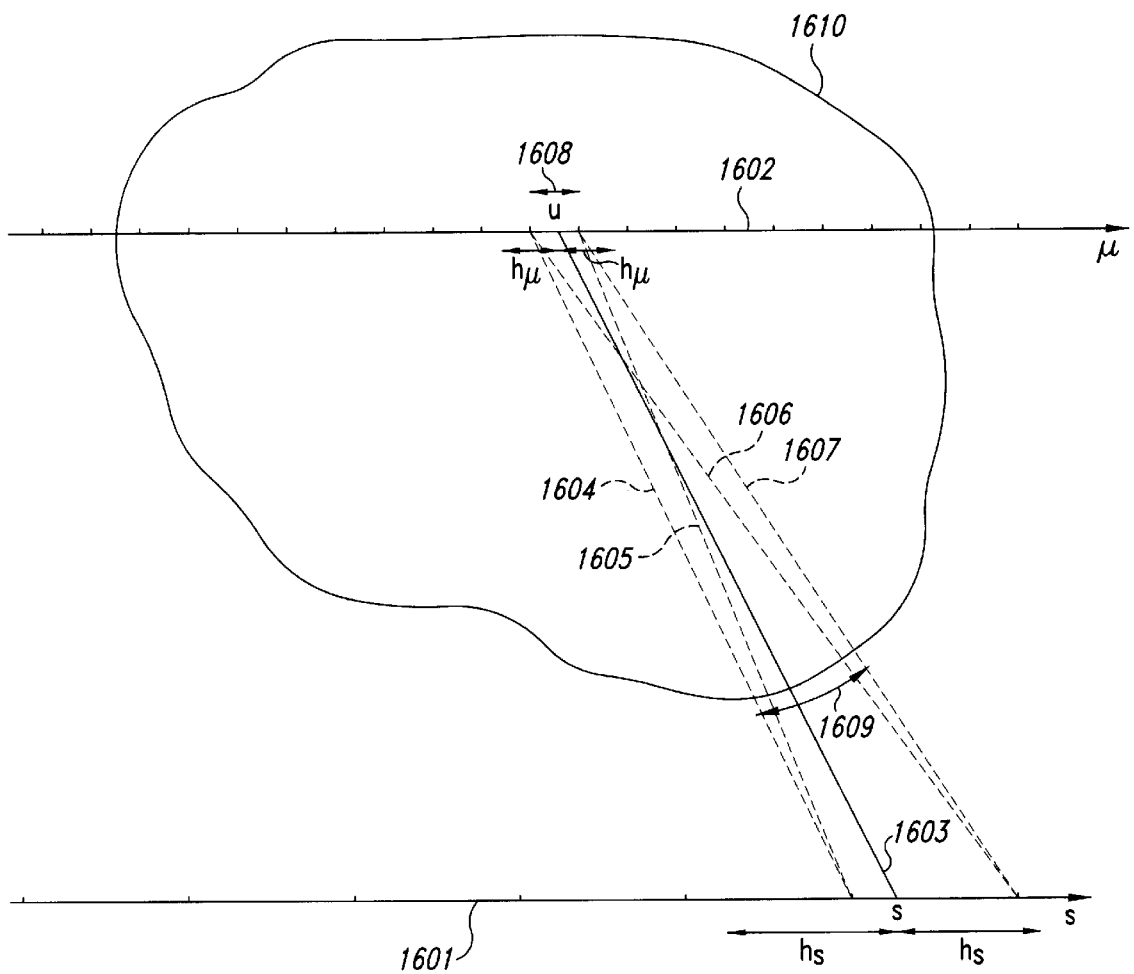
FIG. 16 provides a geometrical representation of the problem

A geometrical representation of the problem is provided in FIG. 16. FIG. 16 illustrates an object being imaged 1610 that is viewed down the t and v axes, presenting a 2-dimensional projection of (s, t, u, v) space into (s, u) space. The st plane is viewed on edge, projected into the s axis 1601, and the uv plane is viewed on edge, projected into the u axis 1602. The intensity value in the (s, u) direction, represented by light ray 1603 is to be interpolated from the set of Lumigraph rays selected and weighted by the 2-dimensional basis function $B_{i,p}$. That selected set of Lumigraph rays is the set of Lumigraph rays between points on the s axis within a distance of $h_s$ from the point s and the points on the u axis within a distance of $h_u$ from the point u, where $h_s$ is the distance between Lumigraph points and $h_u$ is the distance between Lumigraph directions. The set of light rays 1604–1607 represent those selected by the basis function $B_{i,p}$.

If the surface of the object contributing to the calculated intensity for light ray (s, u) were flush with the u axis, the Lumigraph rays selected by the basis function $B_{i,p}$ would intersect a region of length 1608 on the surface of the object. However, because the object is closer to the s axis, these Lumigraph rays intersect the larger region 1609. Therefore, each calculated intensity is spread out over a greater area of the surface of the object, resulting in a loss of clarity in the resulting image calculated from the Lumigraph function. Another way to look at the problem is to consider the area of the surface of the object that contributes information to the intensity value of the light ray (s, u). When the object protrudes in front of the uv plane, as in FIG. 16, a larger area of the surface of the object 1609 contributes to the calculated intensity value for the light ray (s, u) than the area of the uv plane that would contribute to the calculated intensity value for the light ray (s, u). This means that the calculated light ray represents more information in the unfocused, protruding object case than it would in the case where the object lies in the uv plane and properly focused light rays would therefore be selected by the basis function. The more object surface information contributing to a single calculated intensity, the less precisely that ray describes any particular portion of the object surface. This leads both to loss of resolution and to an overlap in the information contributing to the intensities of adjacent light rays, or blurring.

Figure 17:
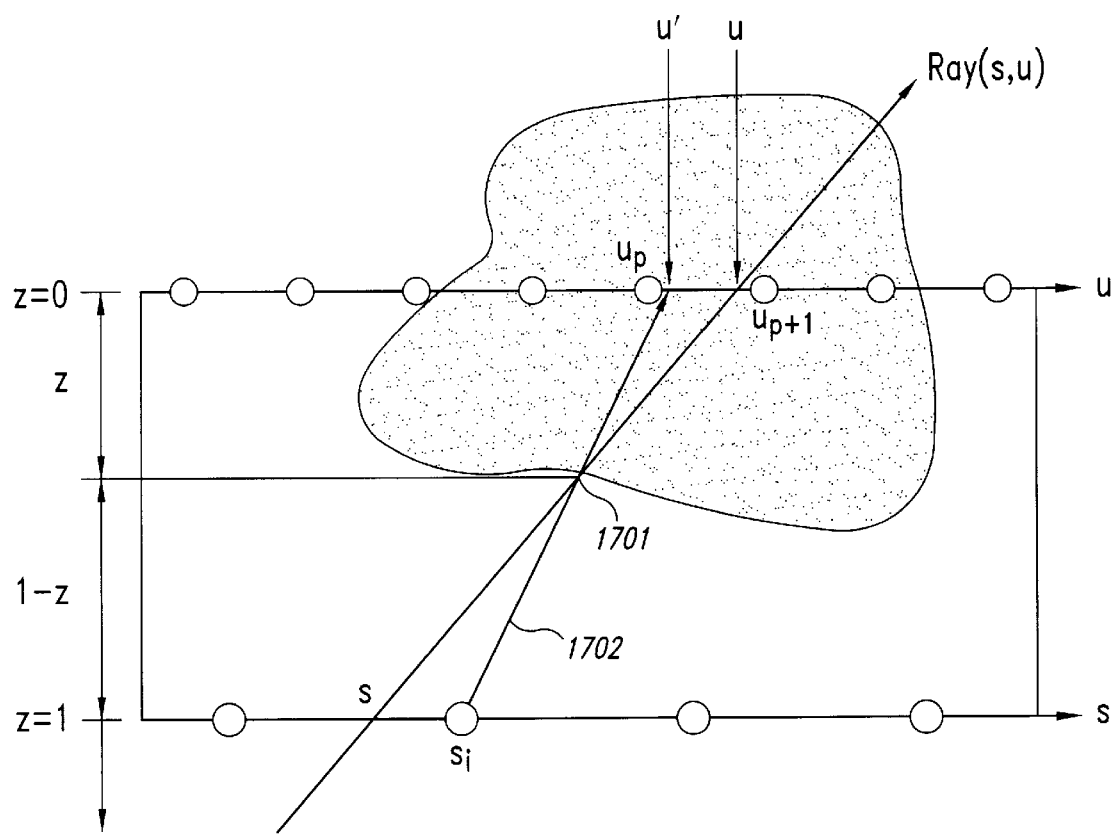
FIG. 17 shows the same 2-dimensional projection as shown in FIG. 16.

The rendering system overcomes this problem by using the approximate 3-dimensional surface of the object is obtained using the Octree method (described below) from the collected pictures. FIG. 17 shows the same 2-dimensional projection as shown in FIG. 16. Again, the intensity value of light ray (s,u) is calculated from a set of Lumigraph rays. The Lumigraph point $s_i$ which lies closest to s would be selected as the closest approximation for s. Because the distance z from the u axis to the point 1701 where the light ray (s,u) intersects the surface of the object can be determined from the approximate surface of the object, the light ray ($s_i$,u') 1702 can be used to define a focused selected set of light rays. Thus, without depth correction, the closest Lumigraph ray to (s, u) is ($s_i$, $u_{p+1}$), but with depth correction the closest Lumigraph ray to (s, u) is ($s_i$, $u_p$). Essentially, this method overcomes the focus problem by shifting the shape of area of the uv plane mapped to a particular Lumigraph point. In the unfocused case, directions lying on the uv plane within a square region around (u, v) are selected by the basis function for generating a set of discrete Lumigraph rays from which to calculate the intensity value for the light ray (s, t, u, v). In the focused case, directions lying on the uv plane within a generally differently shaped area around (u', v') are selected by the basis function for generating a set of discrete Lumigraph rays from which to calculate the intensity value for the ray (s, t, u, v). By similar triangles, u' can be calculated by the equation:

$$u' = u + (s - s_i)\frac{z}{1-z}$$

In 4-dimensions, a value v' can be analogously calculated. The depth corrected basis function B' can then be calculated from the equation:

$$B'_{i,j,p,q}(s,t,u,v) = B_{i,j,p,q}(s,t,u',v')$$

Figure 18A:
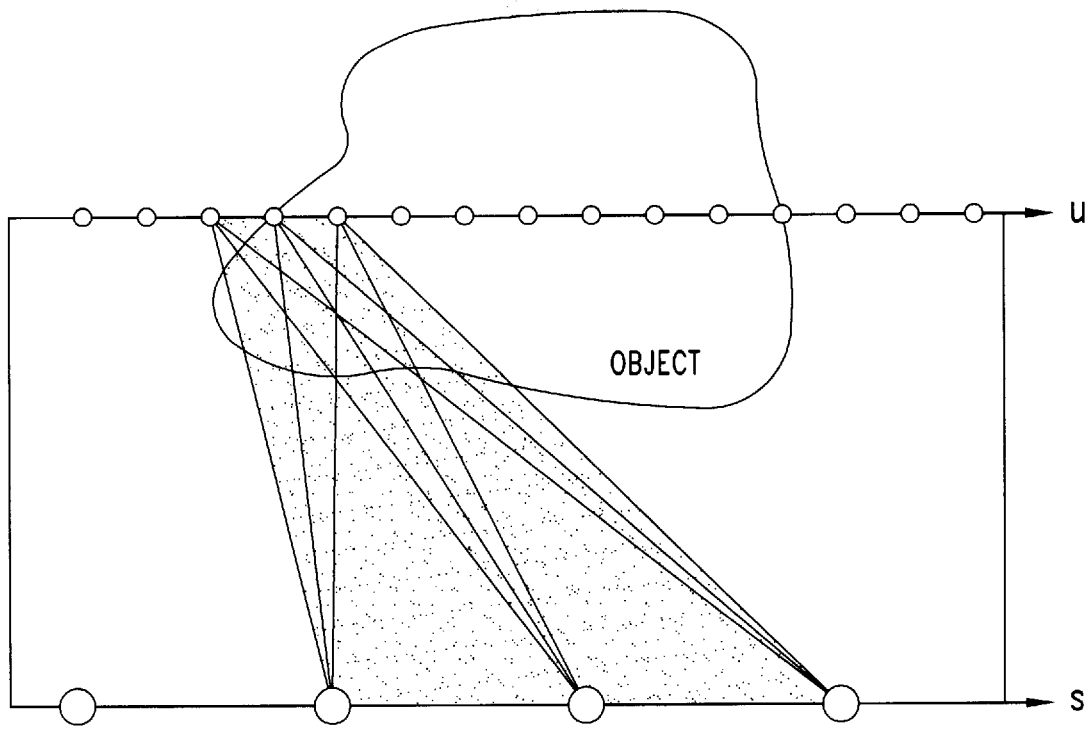
FIGS. 18A and 18B further illustrate depth correction.
Figure 18B:
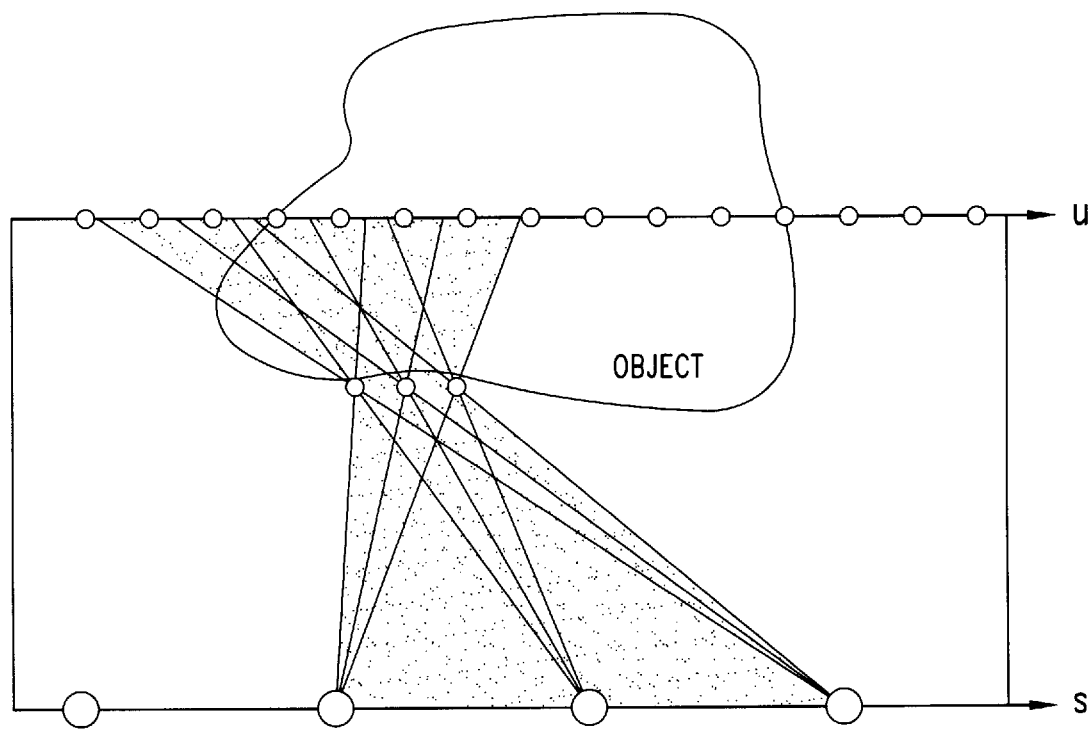
Figure 19A:
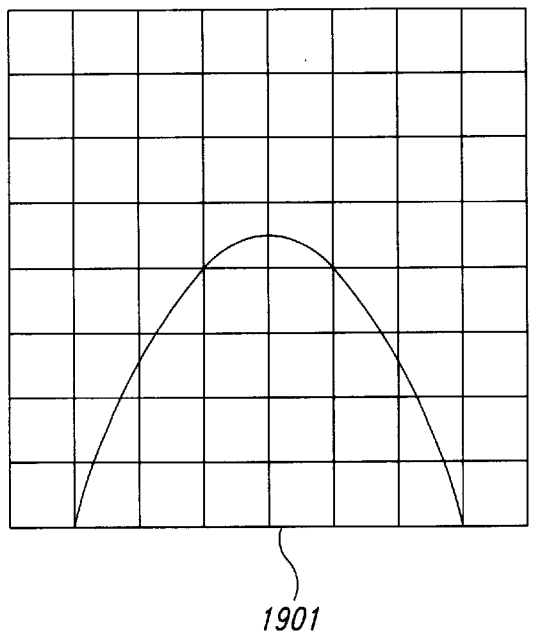
FIG. 19 illustrates, in two dimensions, the Octree method.
Figure 19B:
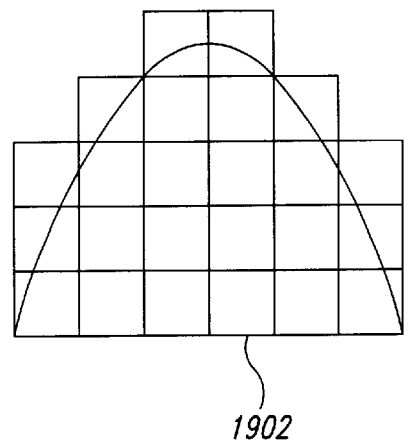
Figure 19C:
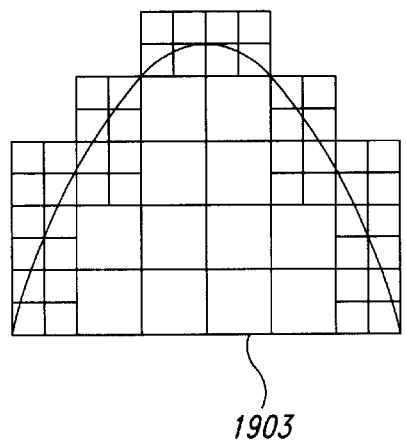
Figure 19D:
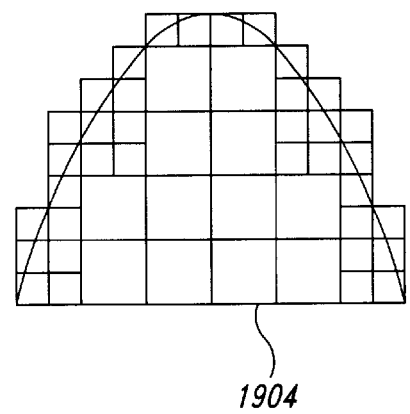

FIGS. 18A and 18B further illustrate depth correction. The set of Lumigraph rays selected by the uncorrected 2-dimensional basis function for a particular intensity calculation is illustrated in FIG. 18A. The set of Lumigraph rays selected by the depth corrected basis function for the same intensity calculation is shown in FIG. 18B. The depth corrected basis function selects Lumigraph rays intersecting the surface of the object over a more narrow, focused region on the object's surface.

3-Dimensional Outline of Object

The Lumigraph system optionally depends on a 3-dimensional representation of the object being imaged to improve rendering. The 3-dimensional representation of the object can be used for depth correction as explained above. The cyan coloring of the stage enables the development system to generate an approximate 3-dimensional description of the surface of the object to be imaged. The Lumigraph system employs an octree construction algorithm to generate the surface description. The Lumigraph system first segments each picture taken by the hand-held camera into a binary object/background image by making use of the cyan color of the walls and base of the stage to distinguish the stage from the object. Initially, the Lumigraph system represents the surface of the object by a cube, comprising a number of smaller cubes, that completely encloses the object These smaller cubes are projected mathematically onto a binary object/background image, essentially a silhouette of the object from the vantage points from which the picture was taken. The Lumigraph system removes those smaller cubes for which the projection falls outside of the silhouette of the object. The Lumigraph system marks those smaller cubes for which the projection falls on the edge of the shadow with an indication that they lie on the surface. After a small number of pictures are processed, the Lumigraph system further subdivides the marked cubes into eight smaller cubes. The Lumigraph system continues to process the image in this fashion, leading to a 3-dimensional representation of the object.

FIG. 19 illustrates, in two dimensions, the Octree method. The large square 1901 is first drawn around the curve representing an object standing on the base. The smaller squares containing portions of the object are preserved in 1902. The squares containing the boundary of the object are further subdivided 1903, and those smaller squares not containing portions of the object are discarded 1904.

The surface modeling process is analogous to having the object being imaged mounted on a turntable, with a bright light shining on the object and casting a shadow of the object onto a screen. A lump of modeling clay is mounted on a second turntable. A sculptor looks at the shadow cast by the object mounted on the first turntable, and cuts the clay to match the silhouette of the object, keeping the knife aligned in the same orientation toward the clay as the light beam is aligned toward the object. Then, the sculptor rotates the two turntables by the same number of degrees in the same direction, and cuts the clay again. After the turntables have been rotated through a full 360 degrees, the light beam is repositioned, and the process repeated. The first time through this process, the sculptor cuts with broad strokes. As the clay begins to more closely resemble the object on the other turntable, the sculptor use smaller, more careful and more precise strokes. After the sculptor repeats the process a number of times, the surface of the clay will closely approximate the surface of the object.

The octree data structure represents the 3-dimensional shape of the object. When depth correcting a light ray (s, t, u, v), it would be very time consuming to search the octree data structure. Consequently, in a preferred embodiment, a 2-dimensional array is generated that contains the depths of the object for each face of the cube. Thus, the depth can be retrieved from this array. Also, certain graphics systems provide hardware support for rendering of an object represented in an octree data structure. With such graphics systems, the intensity of a color of each cube vertex of the octree can be set in proportion to its position. For example, if the z-position is 0.5, then the blue component of the RGB value is set to 127 when using an intensity value scale of 0–255. After setting the intensity values, an image of the object corresponding to a face of the cube is rendered into a 2-dimensional array with the intensity values of the color blue corresponding to the z-position of the object. Thus, this hardware support can be used to efficiently generate a 2-dimensional array of z-position values that can be accessed when depth correcting.

Compression

In a preferred embodiment, the Lumigraph data structure is compressed to reduce storage requirements. The uncompress storage requirements for the Lumigraph data structure can be quite large. For example, if a face of the cube surrounding the object has 32×32 Lumigraph points, and each Lumigraph point has a 256×256 2-dimensional array of intensity values, and each intensity value if represented by 3 bytes, then the uncompressed storage requirement is $32^2 * 256^2 * 3 * 6 = 1.125$ giga-bytes of storage. In one embodiment, each 2-dimensional array is considered a frame and a Joint Photographic Experts Group (JPEG) compression scheme is used for intra-frame compression. Such compression typically results in a compression of 20:1. Also, a Moving Pictures Experts Group (MPEG) scheme can be used for inter-frame compression. Each frame can be considered to be part of 2-dimensional moving picture with each is frame corresponding to a Lumigraph point. The frames in each row or column can be considered a moving picture.

3-Dimensional Imaging of a Scene

An embodiment of the present invention can be used to generate digital 3-dimensional images of scenes. In this embodiment, a camera for taking pictures is moved about a scene (e.g., between the Washington and Lincoln memorials). Pictures at many different positions and orientations can be taken from the scene. Since markers would not typically be available in a picture to determine its vantage point, a sensor mounted on the camera could automatically provide the position and orientation of the vantage point. A Lumigraph data structure representing the scene can be created from the pictures. The cube can be considered to surround the empty region of the scene and the Lumigraph points can be on the faces in a manner that is analogous to the 3-dimensional imaging of an object. The development and rendering systems also operate in an analogous manner. Mechanisms to determine orientation and position include global positioning devices.

Implementation

Figure 20:
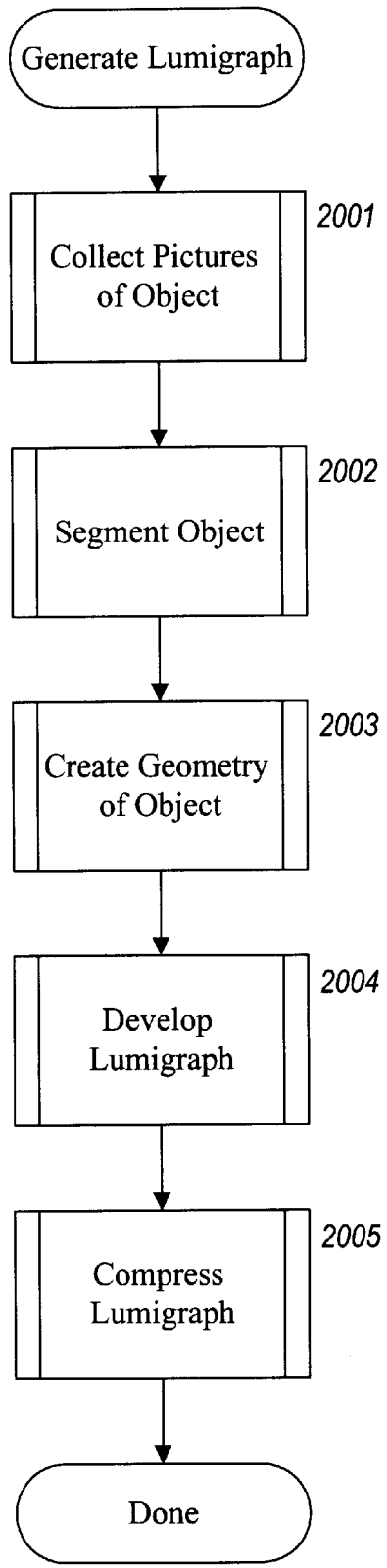
FIG. 20 is a flow diagram of the Generate_Lumigraph procedure.

FIG. 20 is a flow diagram of the Generate_Lumigraph procedure. The procedure Generate_Lumigraph controls the collecting of pictures of an object and then developing of the Lumigraph data structure for that object. In step 2001, the procedure invokes a procedure Collect_Pictures_of_Object. Each picture is stored together with an associated vantage point. In step 2002, the procedure invokes the Segment_Object procedure. The Segment_Object procedure identifies whether each pixel of each picture represents the object or background information (see blue screening described below). In step 2003, the procedure invokes the Create_Geometry_of_Object procedure. The Create_Geometry_of_Object procedure creates a 3-dimensional outline of the object from the pictures of the object and the segment information. In step 2004, the procedure invokes the Develop_Lumigraph procedure. The Develop_Lumigraph procedure uses the collected pictures and vantage points to develop the Lumigraph data structure. In step 2005, the procedure invokes the Compress_Lumigraph procedure. The procedure is then done.

Figure 21:
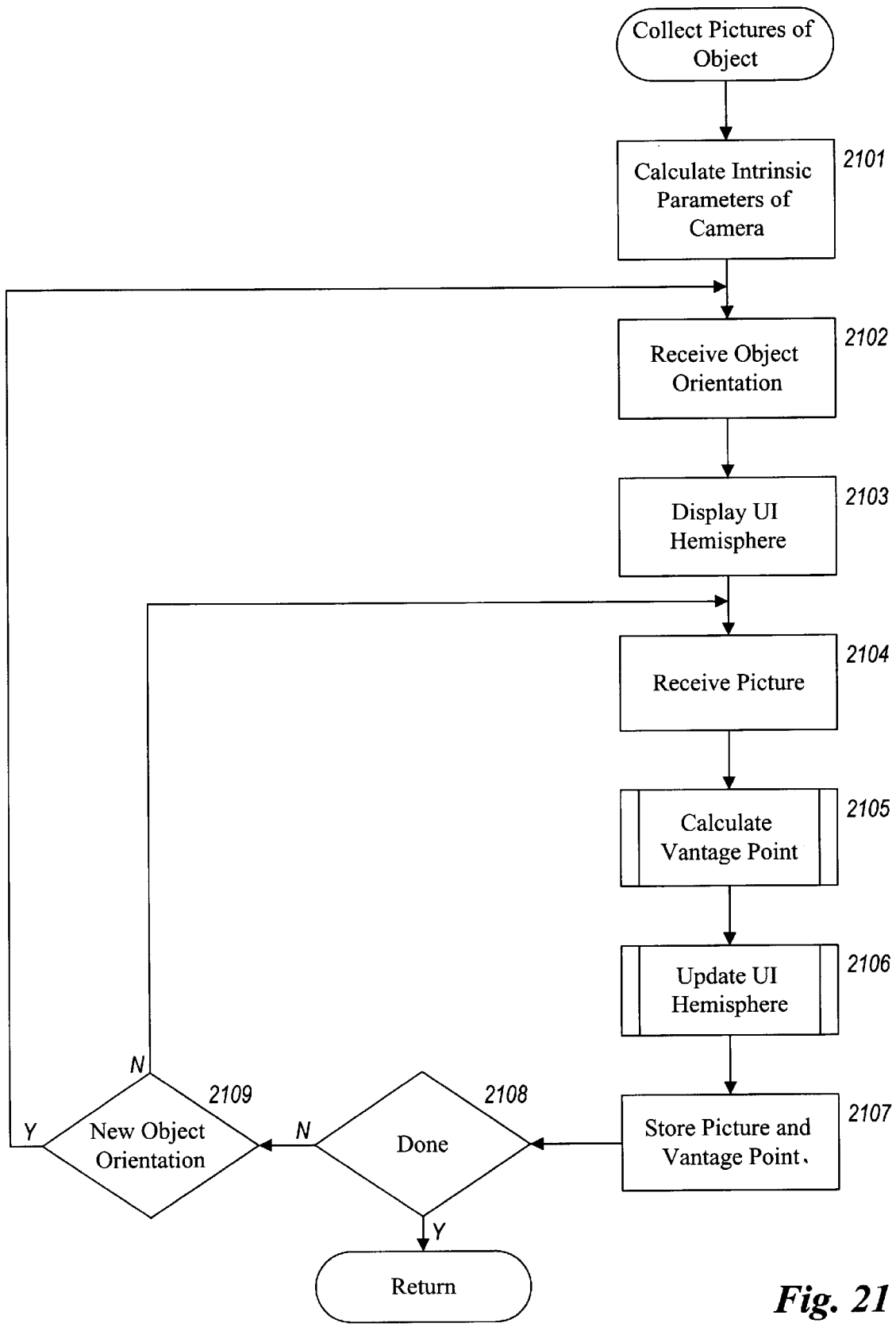
FIG. 21 is a flow diagram of the Collect_Pictures_of_Object procedure.

FIG. 21 is a flow diagram of the Collect_Pictures_of_Object procedure. The Collect_Pictures_of_Object procedure controls the inputting of the pictures that are taken of the object and the determination of vantage points. The pictures are taken with a hand-held camera. In step 2101, the procedure calculates intrinsic parameters of a camera (described below). In steps 2102–2109, the procedure loops collecting pictures taken when the object is in a given orientation. In step 2102, the procedure receives an indication of the object orientation from a user. Since the base of the stage is rotatable in 90° increments, the procedure needs an indication of the current orientation of the object on the stage. In step 2103, the procedure displays the user interface for the hemisphere. In step 2104–2109, the procedure loops and collects in a series of pictures for the current orientation from arbitrary vantage points. In step 2104, the procedure receives a digitized picture. In step 2105, the procedure calculates the vantage point from the picture (described below). In step 2106, the procedure updates the user interface of the hemisphere to indicate that a picture was taken at the calculated vantage point. In step 2107, the procedure stores the picture and the vantage point. In step 2109, if the user indicates that the collecting is complete, then the procedure returns, else the procedure continues at step 2109.

In step 2109, if the user indicates that a new orientation is to be selected for the object, then the procedure loops to step 2102, else the procedure loops to step 2104.

Figure 22:
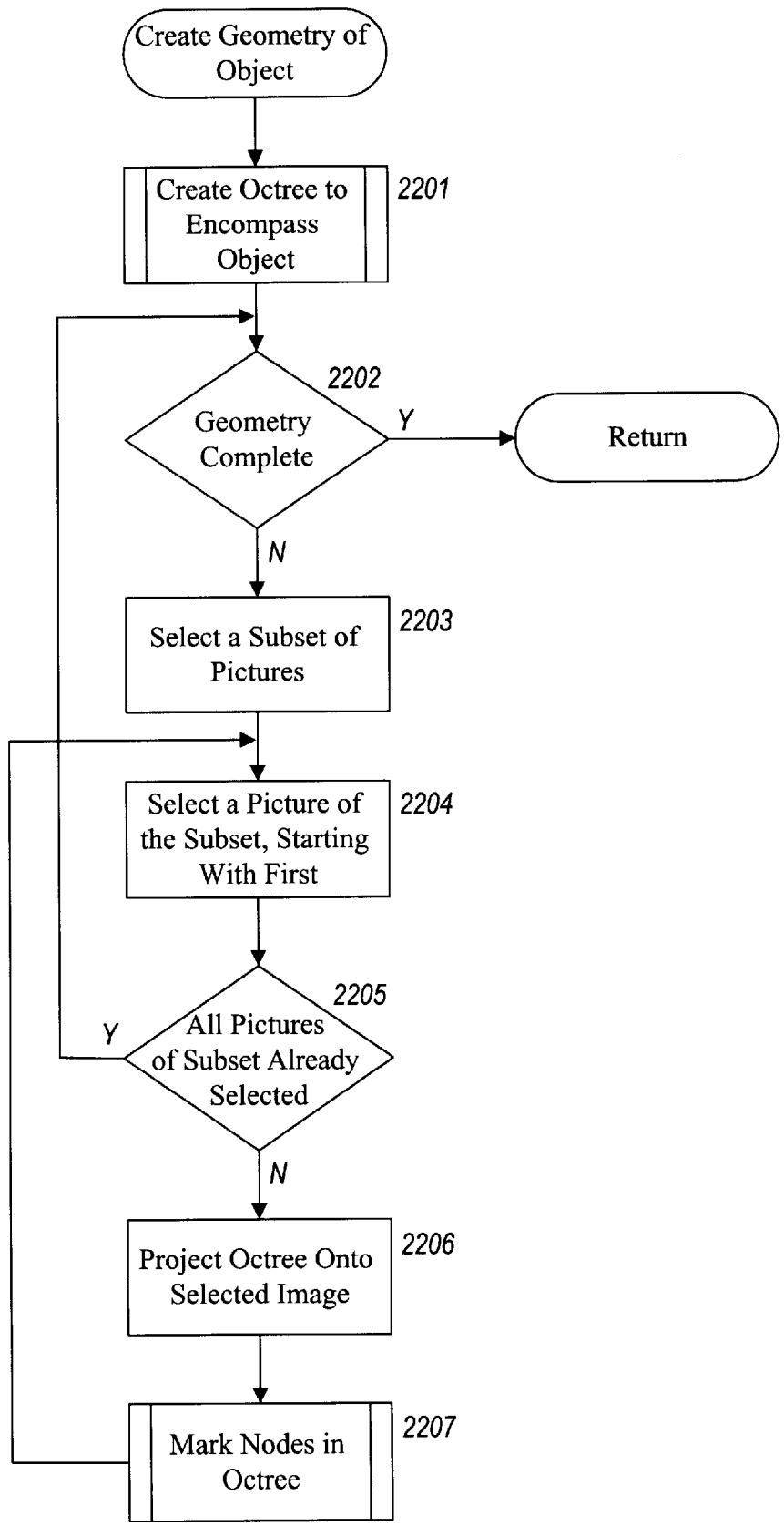
FIG. 22 is a flow diagram of the Create_Geometry_of Object procedure.

FIG. 22 is a flow diagram of the Create_Geometry_of_Object procedure. The Create_Geometry_of_Object procedure uses an octree data structure to determine the 3-dimensional outline of the object. In step 2201, the is procedure creates an octree data structure to encompass the object. In steps 2202–2207, the procedure loops projecting the collected pictures onto the octree data structure. As described above, the outline of the object is projected. The procedure marks the cubes and subcubes of the octree as either full, partially full, or empty. Each partially full cube is subdivided into eight cubes. In a preferred embodiment, this process continues for four levels of cube subdivision. In addition, at each level of subdivision, an increasing number of pictures are selected for use in the projections. In step 2202, if the object geometry is complete, then the procedure returns, else the procedure continues at step 2203. In step 2203 the procedure selects a subset of pictures that are appropriate to the current subdivision level of the octree. In steps 2204–2207, the procedure loops selecting each of the pictures in the subset and marking the nodes of the octree. In step 2204, the procedure selects the next picture of the subset starting with the first. In step 2205, if all the pictures of the selected subset have already been selected, then the procedure returns to step 2202, else the procedure continues at step 2206. In step 2206, the procedure projects the selected image onto the Octree as described above. In step 407, the procedure marks the nodes in the octree and loops to step 2204 to select the next picture of the selected subset.

Figure 23:
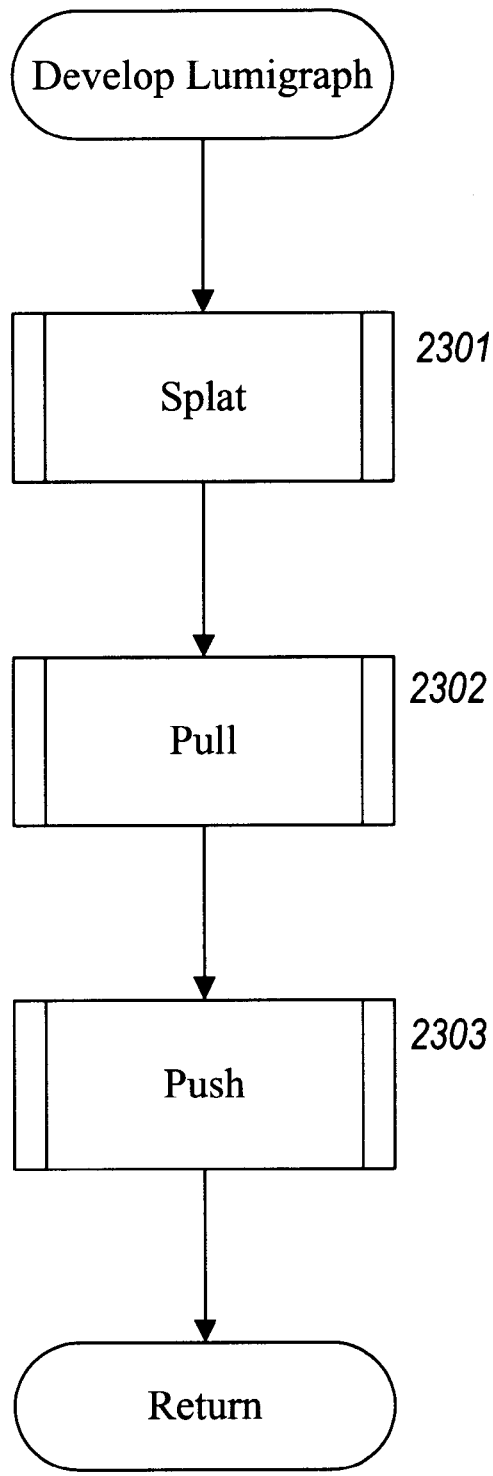
FIG. 23 is a flow diagram of the Develop_Lumigraph procedure.

FIG. 23 is a flow diagram of the Develop_Lumigraph procedure. This procedure uses a scattered data approximation algorithm to approximate the intensity value for each Lumigraph ray. In step 2301, the procedure invokes the Splat procedure. The Splat procedure initializes the confidence level and intensity value of each Lumigraph ray in the Lumig raph data structure. In step 2302, the procedure invokes the Pull procedure. The Pull procedure averages the intensity values and confidence levels into increasingly lower resolution Lumigraph data structures. In step 2303, the procedure calls the Push procedure. The Push procedure distributes the intensity levels accumulated in the lower resolution Lumigraph data structures into the higher resolution Lumigraph data structures.

Figure 24:
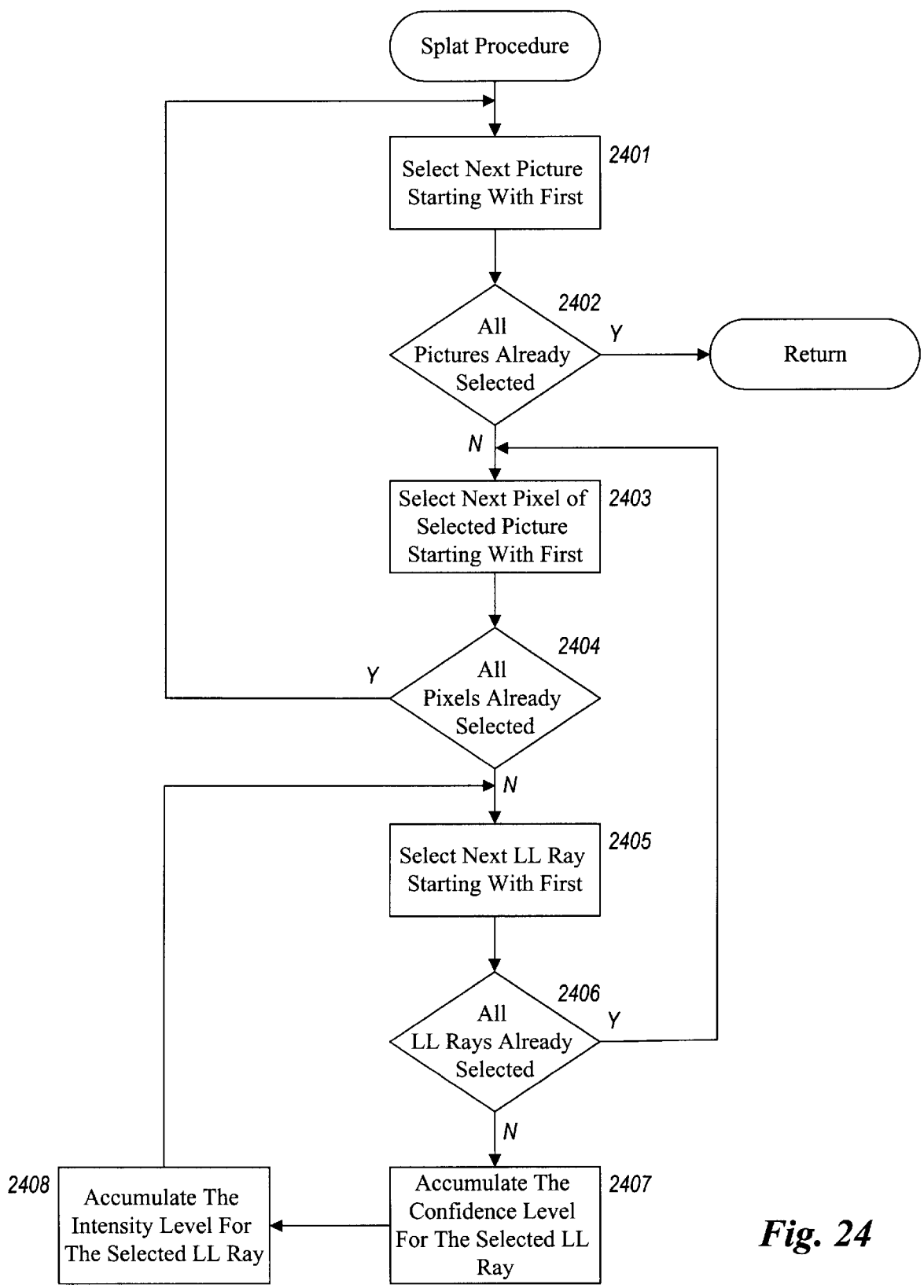
FIG. 24 is a flow diagram of the Splat procedure.

FIG. 24 is a flow diagram of the Splat procedure. The Splat procedure loops through each pixel of each picture and accumulates the confidence levels and intensity values for the Lumigraph rays. The procedure also uses either a constant or quadralinear basis function for determining how each collected light ray of a picture initially affects each Lumigraph ray. In steps 2401–2408, the procedure loops selecting and processing each picture. In step 2401, the procedure selects the next picture starting with the first. In step 2402, if all the pictures have already been selected, then the procedure returns. In step 2403, the procedure selects the next pixel of the selected picture starting with the first. Each pixel corresponds to an (s, t, u, v) coordinate which is calculated based on the vantage point of the picture and location of the pixel on the picture. In step 2404, if all the pixels for the selected picture have already been selected, then the procedure loops to step 2401 to select the next picture, else the procedure continues at step 2405. In steps 2405–2408, the procedure loops selecting a Lumigraph ray that is affected by the selected pixel and adds the selected pixels intensity value and confidence level contribution to the selected Lumigraph ray. In step 2405, the procedure selects the next Lumigraph ray that is affected by the selected pixel. In step 2406, if all the Lumigraph rays that are affected by the selected pixel have already been selected, then the procedure loops to step 2403 to select the next pixel of the selected picture, else the procedure continues at step 2407. In step 2407, the procedure accumulates the confidence level for the selected Lumigraph ray by adding the amount of the basis function to the selected Lumigraph ray. In step 2408, the procedure accumulates into the intensity value of the selected Lumigraph ray, the intensity value of the selected pixel multiplied by the basis weight, and then loops to step 2405 to select the next Lumigraph ray.

Figure 25:
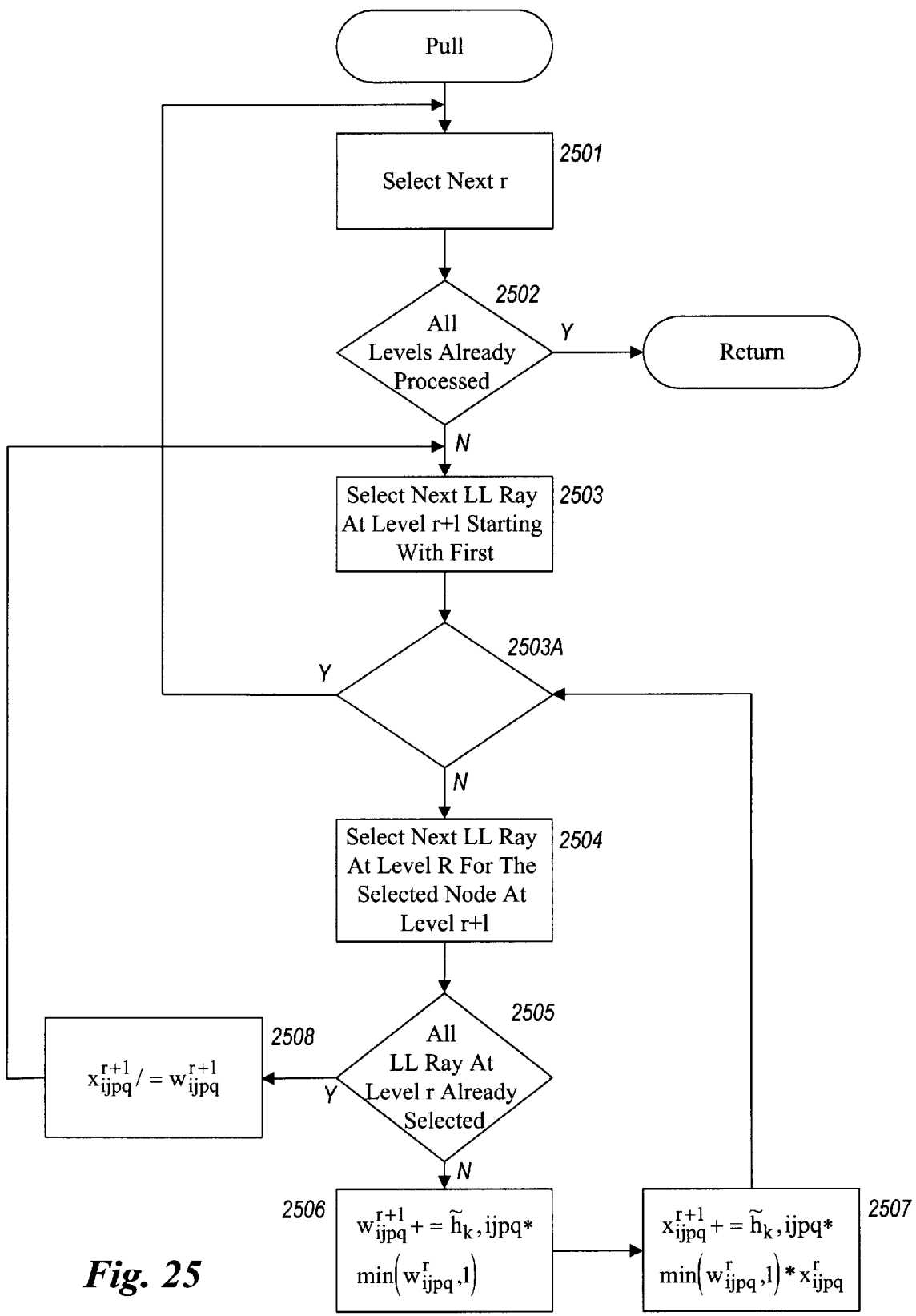
FIG. 25 is a flow diagram of the Pull procedure.

FIG. 25 is a flow diagram of the Pull procedure. In steps 2501–2508, the procedure loops selecting each lower resolution Lumigraph data structure starting with the highest resolution and accumulates intensity values and confidence levels in the next lower resolution Lumigraph data structure. Each Lumigraph data structure corresponds to a level. In step 2501, the procedure selects the next lower resolution Lumigraph data structure. Each Lumigraph data structure corresponds to a level starting with the lowest level. In step 2502, if all the Lumigraph structures have already been processed, then the procedure returns, else the procedure continues at step 2503. In step 2503, the procedure selects the next Lumigraph ray at the next highest level to the selected level, starting with the first. In step 2503A, if all the Lumigraph rays at the next highest level have already been selected, then the procedure loops through to step 2501 to select the next level, else the procedure continues at step 2504. In step 2504, the procedure selects the next Lumigraph ray at the selected level that contributes to the selected Lumigraph ray at the next higher level. In step 2505, if all such Lumigraph rays at the selected level have already been selected, then the procedure continues at step 2508, else the procedure continues at step 2506. In step 2506, the procedure accumulates into the confidence level of the selected Lumigraph ray at the next higher level the result of the basis function $\hat{h}$ for the selected Lumigraph ray at the selected level multiplied by the minimum of the confidence level of the selected Lumigraph ray at the selected level and 1. In step 2507, the procedure accumulates into the intensity value for the selected Lumigraph ray at the next higher level the result of the basis function $\hat{h}$ for the selected Lumigraph ray at the selected level multiplied by the minimum of the confidence level of the selected Lumigraph ray at the selected level and 1 and multiplies that result by the intensity value of the selected Lumigraph ray of the selected level. The procedure then loops to step 2504 to select the next Lumigraph ray at the selected level. In step 2508, the procedure divides the accumulated intensity value by the accumulated confidence level of the selected Lumigraph ray of the next higher level to give the weighted intensity value. The procedure then loops to step 2503 to select the next Lumigraph ray at the next higher level.

Figure 26:
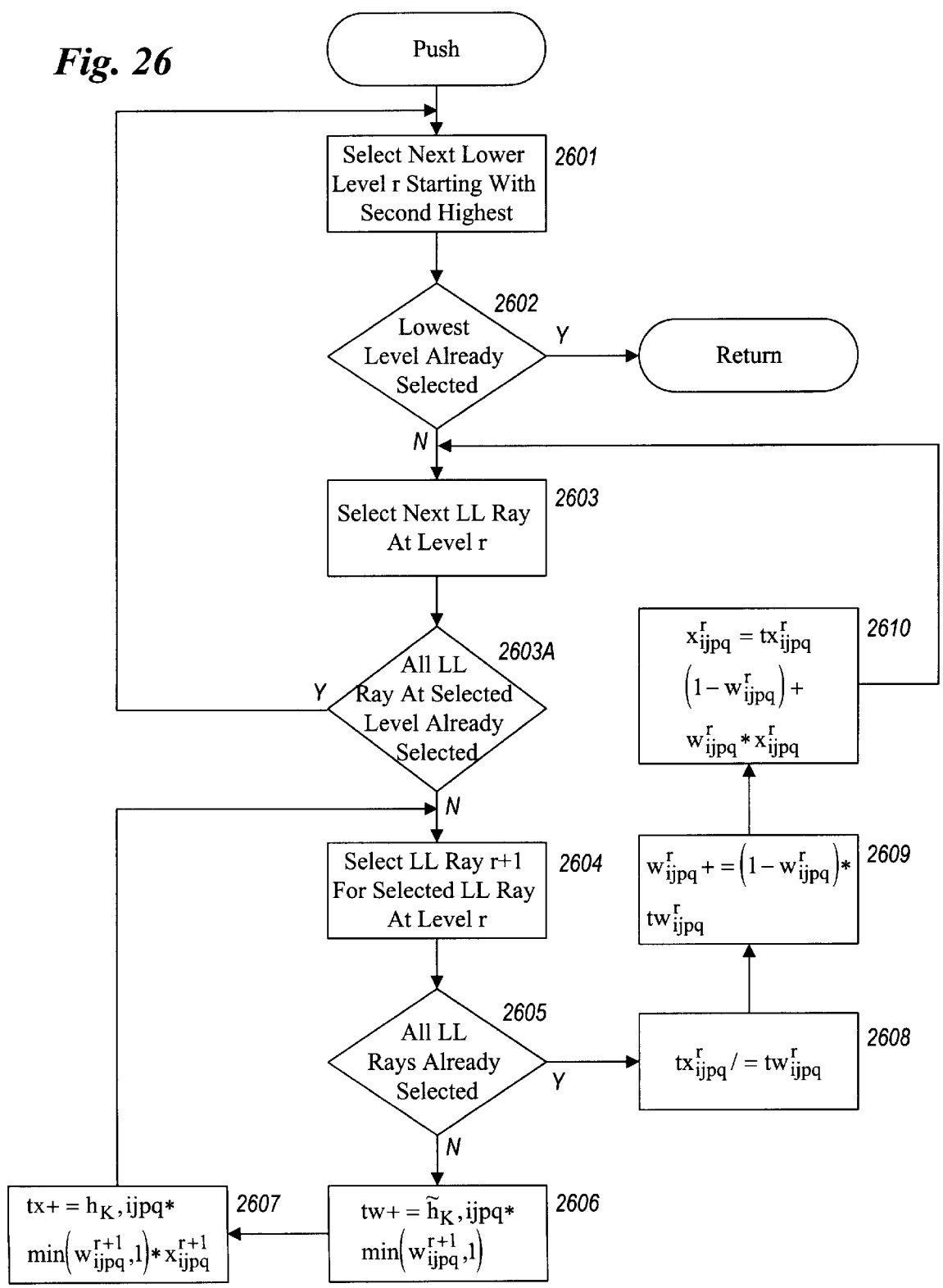
FIG. 26 is a flow diagram of the procedure Push.

FIG. 26 is a flow diagram of the procedure Push. In steps 2601–2610, the procedure loops selecting each level starting with the second highest level and distributing the intensity values based on the confidence level of the next higher level. In step 2601, the procedure selects the next lower level, starting with the second highest level. In step 2602, if the lowest level has already been selected, then the procedure returns, else the procedure continues at step 2603. In steps 2603–2612, the procedure calculates and distributes a maximum intensity value and confidence level that can be distributed to each Lumigraph ray. In step 2603, the procedure selects the next Lumigraph ray at the selected level. In step 2603A, if all the Lumigraph rays have already been selected at the selected level, the procedure loops to select the next level in step 2601, else the procedure continues at step 2604. In step 2604, the procedure selects the next Lumigraph ray at the next higher level that affects the selected Lumigraph ray at the selected level. In step 2605, if all such Lumigraph rays at the selected level have already been selected, then the procedure continues at step 2608, else the procedure continues at step 2606. In step 2606, the procedure accumulates into a temporary confidence level, the result of the basis function $\tilde{h}$ multiplied by the minimum of the confidence of the selected Lumigraph ray at the next higher level and 1. In step 2607, the procedure accumulates into a temporary intensity value the result of the basis function $\tilde{h}$ multiplied by the minimum of the confidence level of the selected Lumigraph ray at the next higher level and 1, and multiplies that result by the intensity value of the selected Lumigraph ray of the next higher level. The procedure then loops to step 2604 to select the next Lumigraph ray at the selected level. In step 2608, the procedure calculates the weighted intensity value by dividing the temporary intensity value by the temporary confidence level. In step 2609, the procedure adds the temporary confidence levels multiplied by 1 minus the confidence level of the selected Lumigraph ray at the selected level to the confidence level of the selected Lumigraph ray at the selected level. In step 2610, the procedure sets the intensity value at the selected Lumigraph ray at the selected level to the temporary intensity value multiplied by 1 minus the confidence level of the selected Lumigraph ray at the selected level plus the confidence level of the selected Lumigraph ray at the selected level multiplied by the intensity value of the selected Lumigraph ray at the selected level. The procedure then loops to step 2603 to select the next Lumigraph ray at the selected level.

Figure 27:
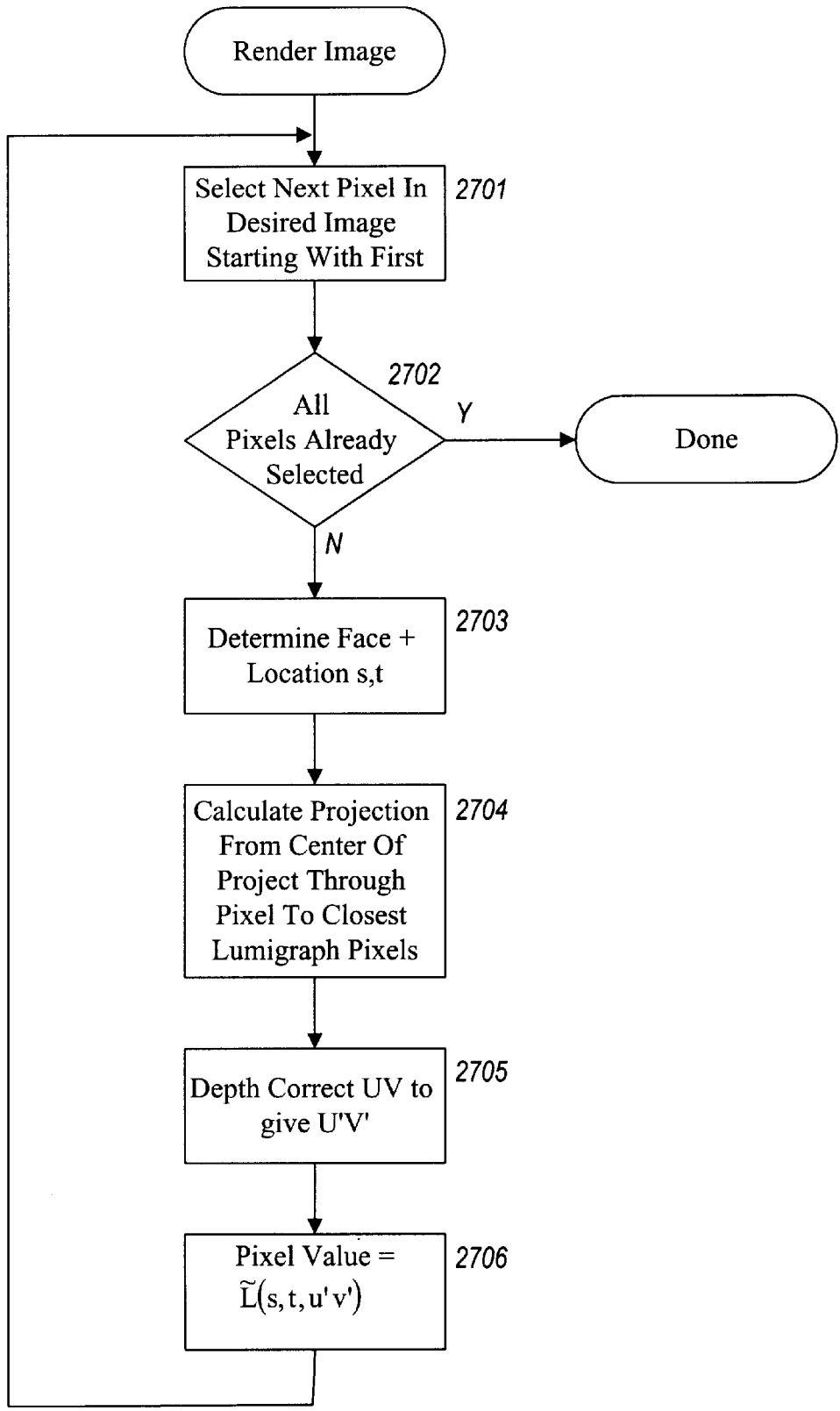
FIG. 27 is a flow diagram of the Render_Image (ray tracing) procedure.

FIG. 27 is a flow diagram of the Render_Image (ray tracing) procedure. The Render_Image procedure is passed a Lumigraph data structure and a vantage point. The procedure renders an image of the object from that vantage point. This procedure uses the ray tracing technique. In step 2701, the procedure selects the next pixel of the desired image starting with the first. In step 2702, if all the pixels in the desired image have already been selected, then the procedure is done, else the procedure continues at step 2703. In step 2703, the procedure determines the face of the cube associated with the vantage point. In step 2704, the procedure calculates the (s, t, u, v) coordinates corresponding to the light ray from the center of projection through the selected pixel. In step 2705, the procedure depth corrects to give the coordinates (s, t, u', v'). In step 2706, the procedure sets the intensity value of the selected pixel to the result of the Lumigraph function $\tilde{L}$ (s, t, u', v'). The procedure then loops to step 2701 to select the next pixel. In an alternate embodiment, the procedure calculates all light rays (s, t, u, v) that contribute to a pre-defined area corresponding to the pixel and then sets the intensity value of the pixel to a weighted average of those intensity values.

Figure 28:
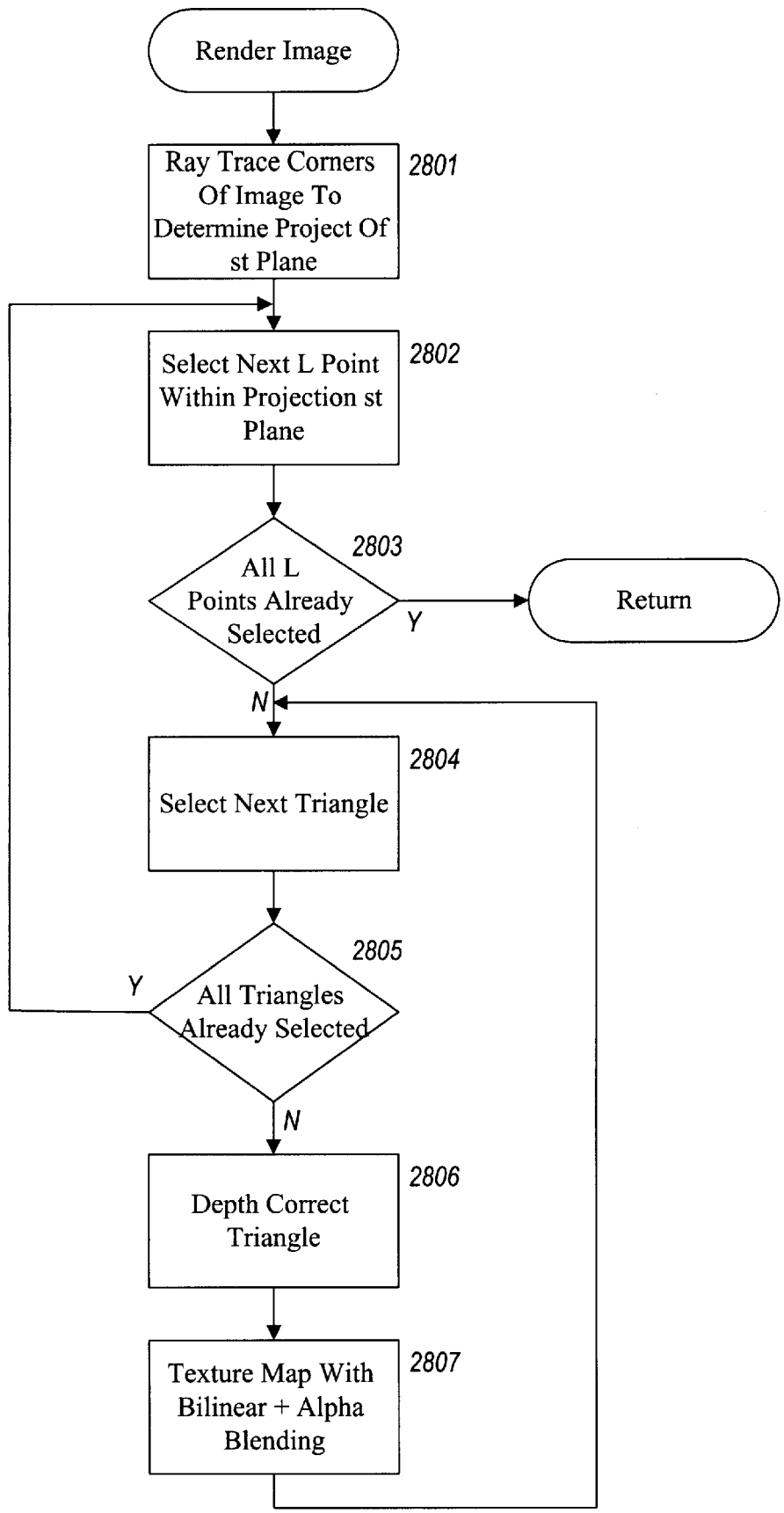
FIG. 28 is a flow diagram of the Render_Image (texture mapping) procedure.

FIG. 28 is a flow diagram of the Render_Image (texture mapping) procedure. The Render_Image procedure uses texture mapping with a bilinear-linear basis function. In step 2801, the procedure ray traces the corners of the desired image to determine which Lumigraph points contributed to the desired image. In steps 2802–2809, the procedure loops processing each Lumigraph point that contributes to the desired image. In step 2802, the procedure selects the next Lumigraph point that contributes to the desired image. In step 2803, if all the Lumigraph points have already been selected, then the procedure returns, else the procedure continues at step 2804. In step 2804, the procedure selects the next triangle for the selected Lumigraph point and ray traces its vertices to determine the coordinates (s, t, u, v). In step 2805, if all the triangles have already been selected, then the procedure loops to steps 2802 to select the next Lumigraph point, else the procedure continues at step 2806. In step 2806, the procedure depth corrects the vertices. In step 2807, the procedure texture maps the selected triangle with bilinear interpolation and alpha blending from the source triangle on the uv plane.

Calculation of Camera Vantage Point

The Stage

Figure 29A:
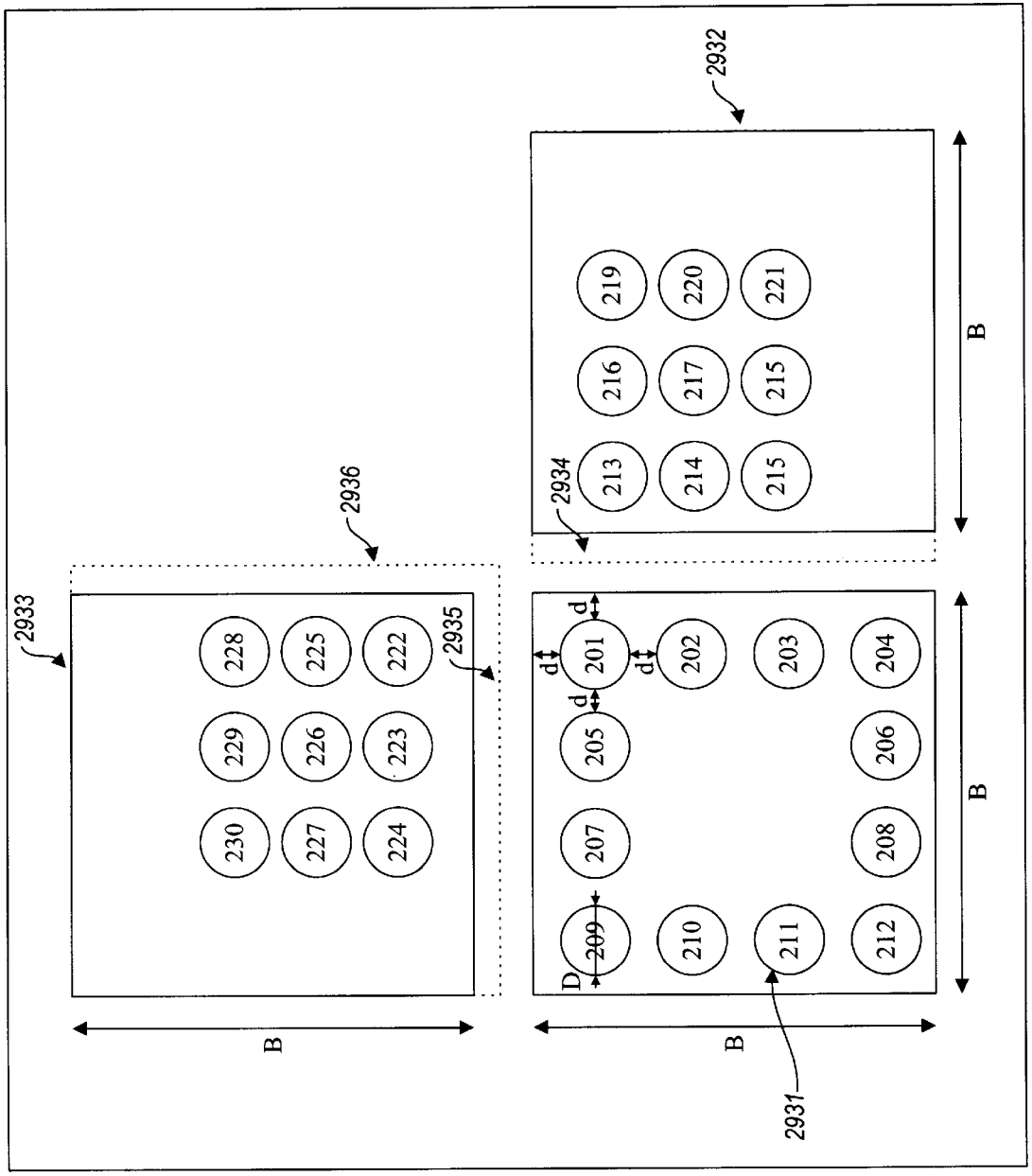
FIG. 29 shows a design for the stage.

FIG. 6 shows the stage on which an object is placed for image capture by means of the hand-held camera. Toy lion 601 is the object to be imaged. FIG. 29 shows a design for the stage. The stage comprises a horizontal base, 2931, and two vertical sides, 2932 and 2933. Vertical side 2932 joins the base along the dotted line 2934. Vertical side 2933 joins the base along dotted line 2935 and is attached to vertical side 2932 along dotted line 2936. When so joined, the base and vertical sides form 3 sides of a cube, within which the object to be imaged is placed. The base is not permanently joined to the vertical sides, and can therefore be rotated by 90°, 180°, and 270° with respect to the vertical sides in order to view the object from all directions within a hemisphere with a base coincident with the base of the object.

The background color of the stage is cyan. The base and vertical sides of the stage are marked with dark cyan bull's eye patterns that are used to determine the position and orientation of the camera from the 2-dimensional images recorded by the camera. The base is marked with 12 bull's eye patterns, 2901–2912. Vertical side 2932 is marked with 9 bull's eye patterns, 2913–2921, and vertical side 2933 is also marked with 9 bull's eye patterns, 2922–2930. Each bull's eye pattern is unique, and comprises between 2 and 5 concentric rings. The outer ring of each pattern has the same radius. One bull's eye pattern can be differentiated from all of the other bull's eye patterns by the number of concentric rings it contains, and by the ratios of the radii of the inner rings to the outermost ring. Table 2934 in FIG. 29 lists the ratios of each of the inner rings to the outer ring for the 30 bull's eye patterns.

Marker Locations

The locations of the stage markers that appear in an image captured by the hand-held camera are determined by the Find_Markers procedure. The procedure takes a single 2-dimensional image of the object on stage as input, and produces a list of markers as output, including, for each listed marker, the marker's identity and the position of the center of the marker in 2-dimensional image coordinates. Marker identities correspond to the numbers by which each different marker is listed in Table 2934 of FIG. 29.

Figure 30:
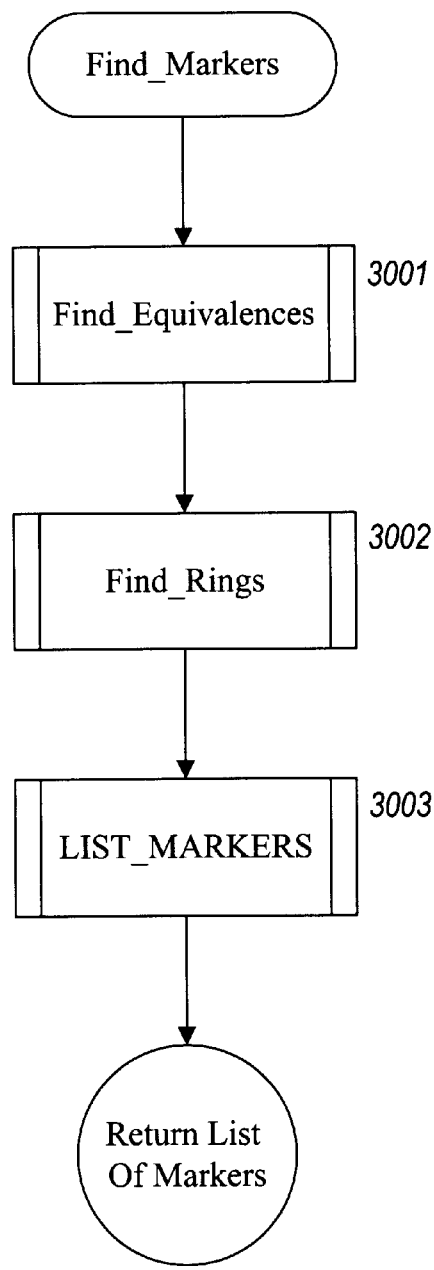
FIG. 30 is a high-level flow diagram for the procedure Find_Markers.

FIG. 30 is a high-level flow diagram for the procedure Find_Markers. The procedure Find_Markers first calls the subroutine Find_Equivalents 3001 to generate a pixel map of the image, where each pixel is numbered according to the equivalence class of pixels to which the subroutine Find_Equivalents assigns the pixel based on the intensity value recorded for the pixel. The subroutine Find_Equivalents also generates an equivalents table that lists pairs of numbers that occur in the pixel map that are equivalent to each other. For example, those pixels numbered with 2 in the pixel map, constituting the equivalence class 2, and those pixels numbered with 8 in the pixel map, constituting the equivalence class 8, may actually comprise a larger equivalence class comprising the two sub-classes 2 and 8. In this case, the equivalents table would contain the number pair 2 and 8.

The procedure Find_Markers next calls the subroutine Find_Rings 3002. The subroutine Find_Rings uses the pixel map and the equivalents table to generate a list of rings identified in the image. Each ring is described by a radius and the coordinates of its centroid. The procedure Find_Markers finally calls the subroutine List_Markers 3003. The subroutine List_Markers uses the list of rings generated by subroutine Find_Rings to identify the positions of stage markers that appear in the image. The identified markers are listed as an identifying number and a pair of coordinates describing the position of the marker in the image.

Figure 31:
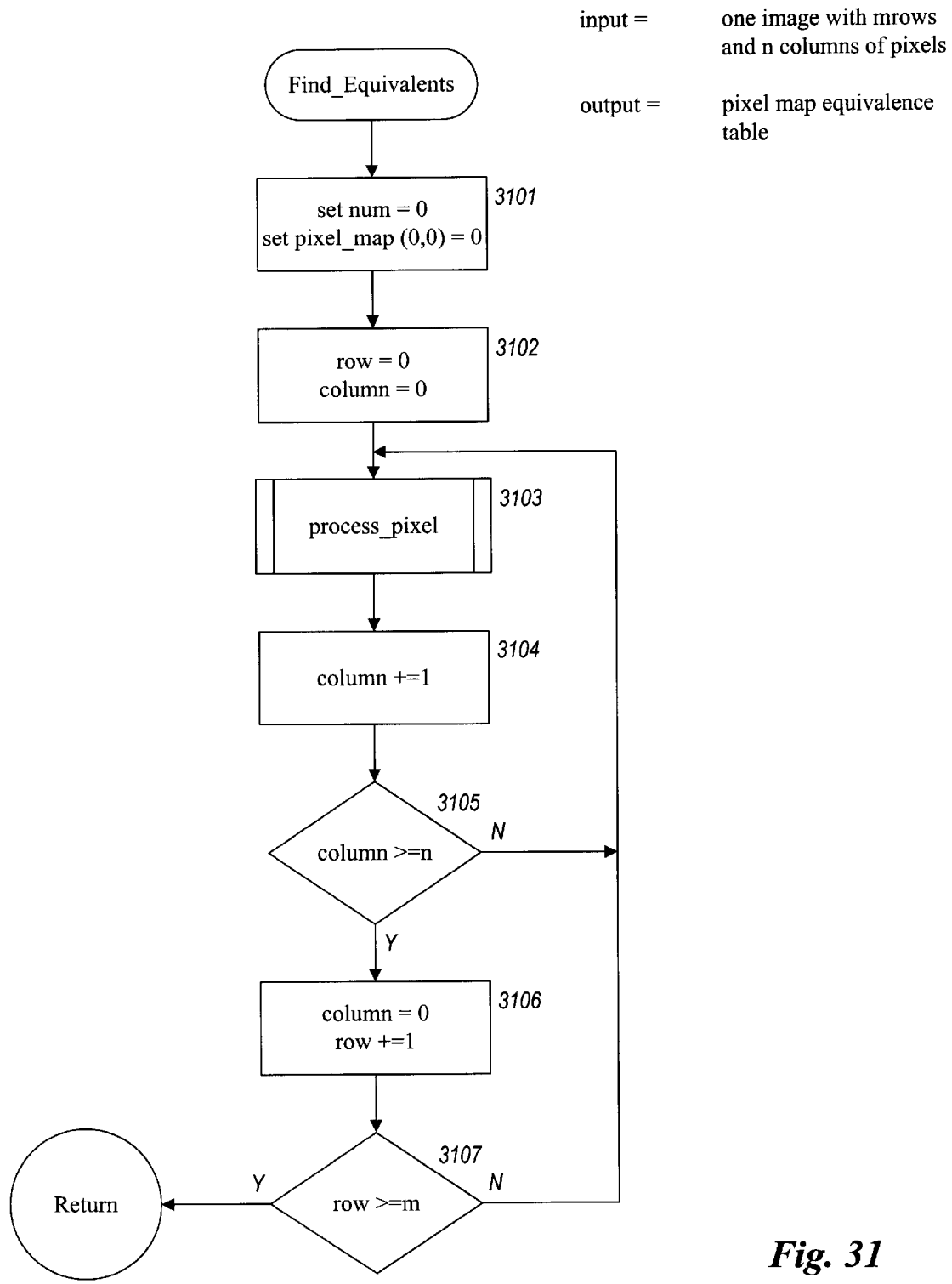
FIG. 31 is a flow diagram of the subroutine Find_Equivalents.

FIG. 31 is a flow diagram of the subroutine Find_Equivalents. In step 3101, the subroutine initializes the variable num, which contains the next equivalence class number 0, the first equivalence class. The first pixel position in the pixel map, at row 0 and at column 0, is also initialized to 0. The first pixel will always belong to the first equivalence class. In steps 3102–3108, the subroutine loops selecting each pixel of the image and invokes the subroutine process-pixel.

Figure 32A:
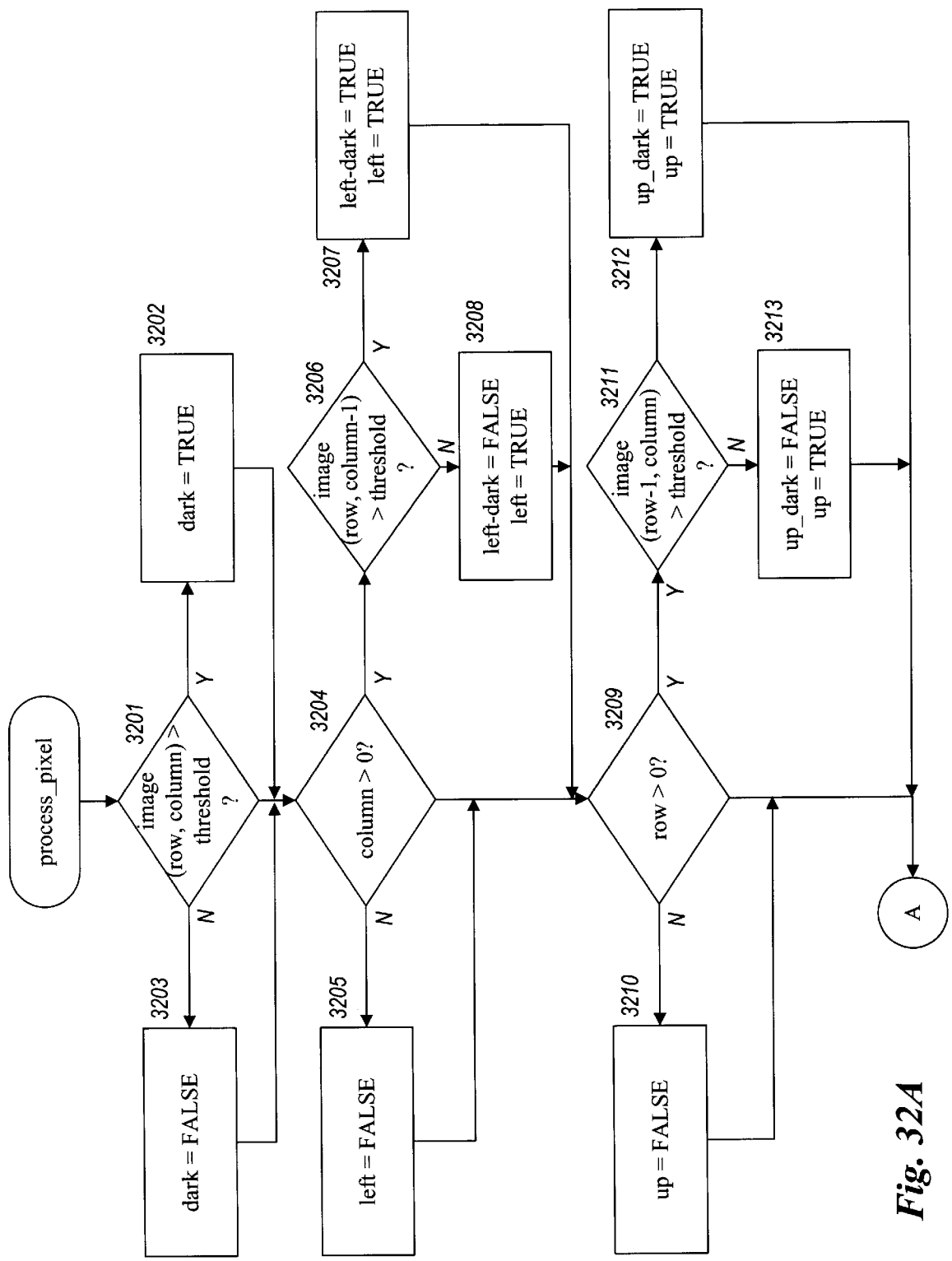
FIG. 32 is a flow diagram for the subroutine process_pixel.
Figure 32B:
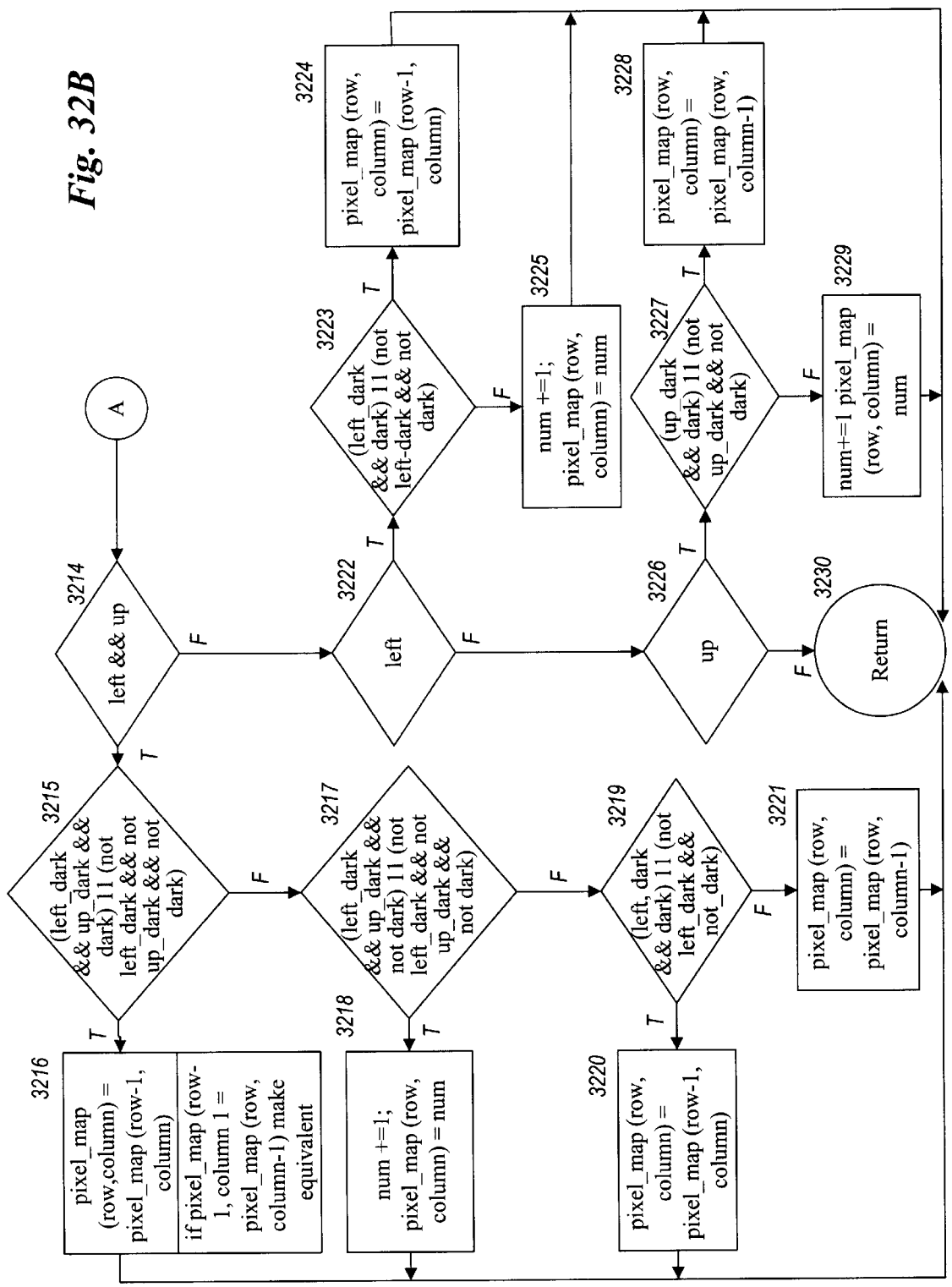

FIG. 32 is a flow diagram for the subroutine process_pixel. This subroutine assigns an equivalence class number for the pixel in the image at coordinates (row, column), and places that number into the pixel map at coordinates (row, column). The subroutine process_pixel additionally places entries in the equivalents table. Step 3201 determines whether the intensity value for pixel (row, column) of the image is greater than a threshold value, where the threshold value is set somewhat less than the intensity value for a region of dark cyan in the image. If the intensity is greater than the threshold value, the variable dark is set to TRUE in step 3202, and, if not, the variable dark is set to FALSE in step 3203.

Step 3204 determines whether the value of variable column is greater than 0. If not, the variable left is set to FALSE in step 3205. If column is greater than 0, then, step 3206 determines whether the intensity of the pixel at (row, column −1), directly to the left of the pixel at (row, column), is greater than the threshold value. If it is greater, then the variables left_dark and left are both set to TRUE in step 3207, and if not, the variable left_dark is set to FALSE and he variable left is set to TRUE in step 3208.

Steps 3209–3213 are analogous to steps 3204–3208, except that the intensity of the pixel at (row−1, column), directly above the pixel at (row, column), is used to set the values of the variable up_dark. If there is no upper pixel, then the variable up is set to FALSE in step 3210, otherwise the value of the variable up is set to TRUE. At this point in the subroutine, process_pixel has determined whether there are pixels in the image at (row, column−1), and (row−1, column). For each of these three pixels that are in the image, process_pixel has determined whether they are light or dark. This determination then leads to eight possible scenarios handled in steps 3214–3229. If both an upper pixel and a pixel to the left of the pixel at (row, column) exist as determined in step 3214, there are four cases handled in steps 3215–3221. If all three pixels are dark or all three pixels are light, as determined in step 3215, then the equivalence number already assigned to the pixel at (row, column−1) is assigned to the pixel at (row, column), and that number is entered into the pixel map at (row, column) in step 3216. Additionally, if the pixels at (row, column−1) and (row−1, column) have different equivalence class numbers, then an entry is placed in the equivalents table indicating that the two numbers are equivalent. If the pixels at (row, column−1) and (row−1, column) are both light or both dark, and the pixel at (row, column) is different, as determined in step 3217, then, in step 3218, a new equivalence class is created, by incrementing the variable num, and the pixel at (row, column) is assigned to the new equivalence class by entering num into the pixel map at (row, column). If both the pixel at (row, column) and the pixel to the left of it have the same dark/light value, as determined in step 3219, the pixel at (row, column) is assigned to the equivalence class of the pixel at (row, column−1) in step 3220. Finally, if step 3221 is reached, the pixel at (row, column) must have the same light/dark value as the pixel directly above it, and so it is assigned to the equivalence class of the pixel directly above it.

Steps 3222–3229 represent determinations of the equivalence class to which to assign to the pixel at (row, column) in the degenerate cases where there is either no pixel to the left, or no pixel above the pixel at (row, column). In either case, if the pixel at (row, column) has the same light/dark value as the single neighbor that it does have, it is assigned to that neighbor's equivalence class. Otherwise, a new equivalence class is created, and the pixel at (row, column) is assigned to the new equivalence class.

The essence of the equivalence class determination made by the subroutine Find_Equivalents is that regions of dark and light pixels in the image are placed in separate equivalence classes.

Figure 33:
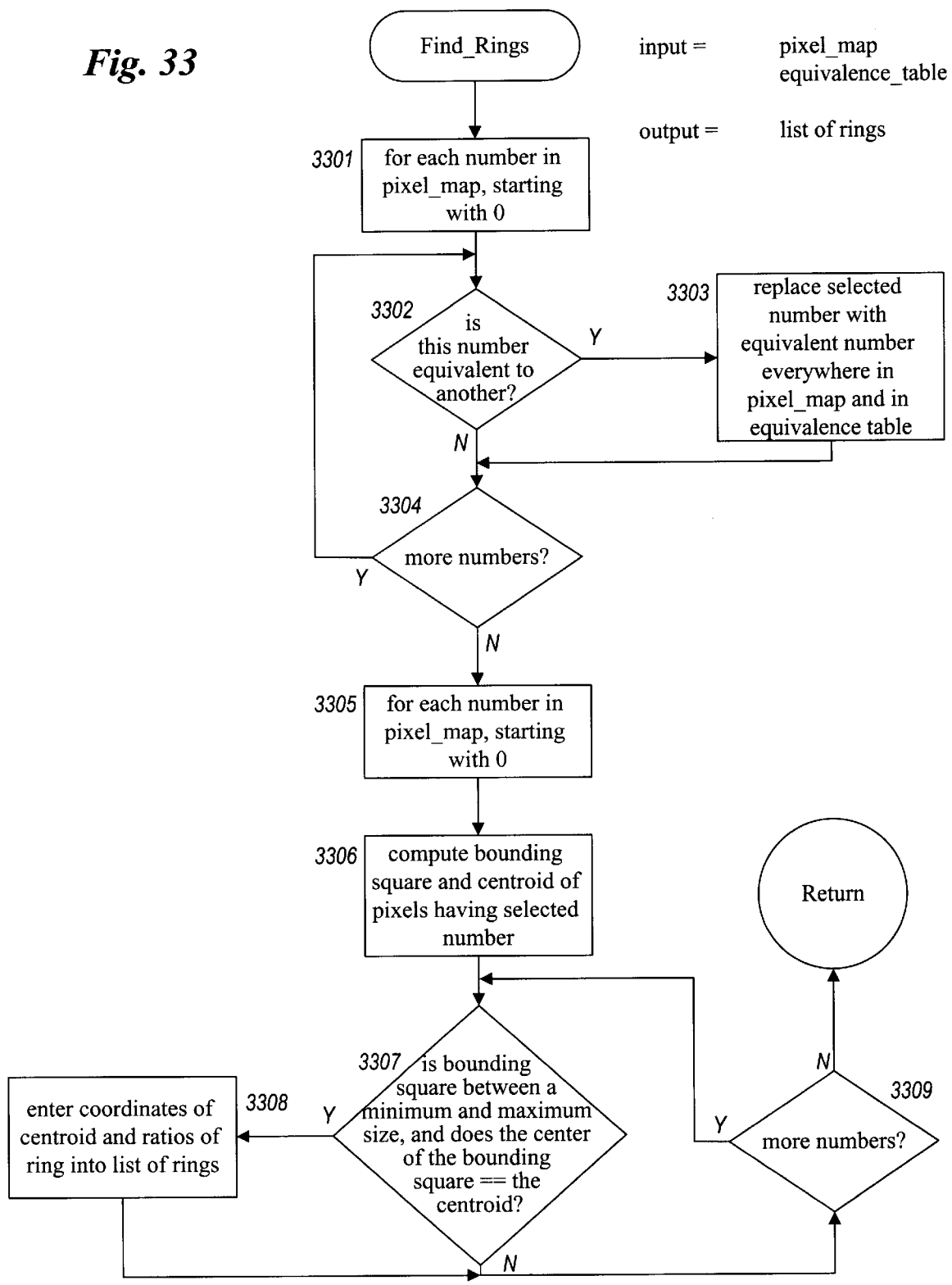
FIG. 33 is a flow diagram of the subroutine Find_Rigs.

FIG. 33 is a flow diagram of the subroutine Find_Rings. Steps 3301–3304 represent a loop over all the equivalence classes found by the subroutine Find_Equivalents, or, in other words, over the values between 0 and num−1. For each selected equivalence class, in step 3302, Find_Rings looks for the first entry in the equivalents table output by the subroutine Find_Equivalents that includes the selected equivalence class and another equivalence class. If such an entry exists, it indicates that both equivalence classes are sub-classes within a larger equivalence class. Therefore, each occurrence of the selected equivalence class in the pixel map and in the equivalents table is replaced by the is number of the other equivalence class, thereby merging the two equivalence classes into one larger equivalence class.

Steps 3305–3309 represent a loop that iterates over the combined, or fully merged, equivalence classes resulting from the loop represented by steps 3301–3304. For each equivalence class, Find_Rings determines, in step 3306, both a bounding square within the image that fully encloses the pixels that belong to the selected equivalence class and the centroid for the pixels of the selected equivalence class. The centroid is essentially the computed coordinates of the center of mass of the pixels, where each pixel of the equivalence class has equal weight. With these two computed values, Find_Rings determines, in step 3307, whether the selected equivalence class potentially represents a ring corresponding to one of the rings within a stage marker. The equivalence class may potentially represent a ring if the boundary square is between a minimum and maximum value and the centroid for the pixels of the equivalence class coincides with the center of the bounding square within some reasonable tolerance. If the equivalence class may represent a stage marker ring, it is entered into the list of rings in step 3308.

Figure 34:
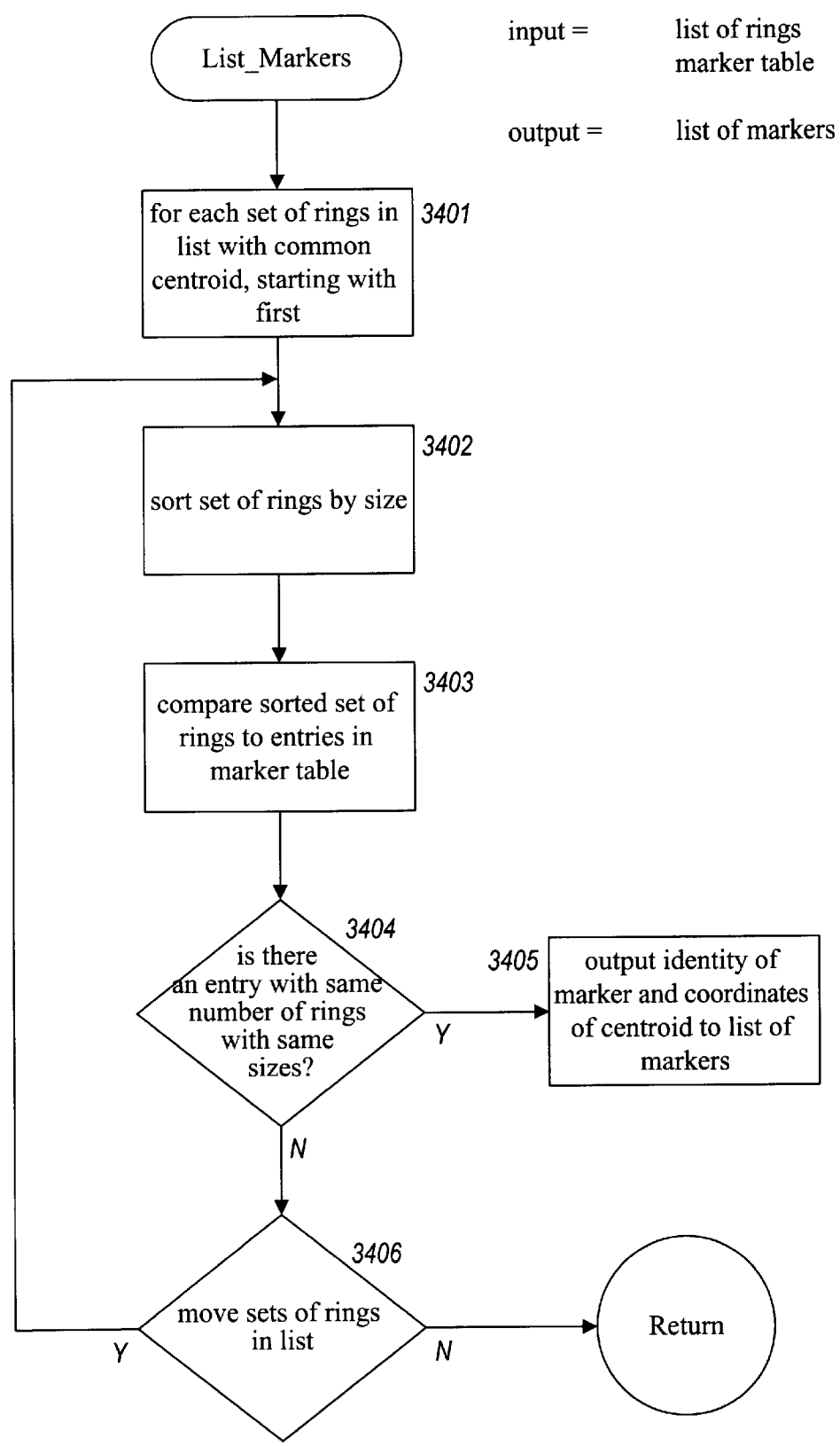
FIG. 34 is a flow diagram of the subroutine List_Markers.

FIG. 34 is a flow diagram of the subroutine List_Markers. Steps 3401–3406 represent a loop that iterates over each set of rings with a common centroid in the list of rings created by the subroutine Find_Rings. These sets of rings with common centroids are easily selected one-by-one from the list of rings by finding and removing the next set from the list of rings during each iteration of the loop represented by the steps 3401–3406. The selected set of rings is sorted by the size of their bounding squares in step 3402. In step 3403, the number of rings in the selected set, and the ratios of the sizes of the inner rings to the outer ring of the set is compared with the entries in the marker table shown as Table 2934 in FIG. 29. If an entry matches the selected set, as determined in step 3404, then the identity and the image coordinates of the centroid of the marker are placed in the list of markers in step 3405. When the subroutine List_Markers finishes, the list of markers contains a complete list of the markers detected by the program Find_Markers in the input image.

Computing Camera Pose

The camera pose is determined for each image by the program pose. The camera pose comprises 6 extrinsic parameters and 5 intrinsic parameters, described below. The locations of the stage markers in the input image furnish a set of known values, and the location of the markers in real 3-dimensional space are fixed by the dimensions of the stage. The intrinsic and extrinsic camera parameters are constants used in a set of mathematical operations that transform the 2-dimensional image coordinates of the markers in the input image to a set of 3-dimensional coordinates for the location of the markers; in real space. These operations and the set of image coordinates determined for the markers detected in the image and the known real-space coordinates for the markers comprise, in general, a set of simultaneous, non-linear, and over-determined equations that can be solved to yield values for the intrinsic and extrinsic camera parameters. This method is described in "A Versatile Camera Calibration Technique for High-Accuracy 3D Machine Vision Metrology Using Off-the-Shelf TV Cameras and Lenses," Roger Tsai, IEEE Journal of Robotics and Automation, Vol. RA-3, No. 4, 323–344 (1987), hereby incorporated by reference.

Figure 35:
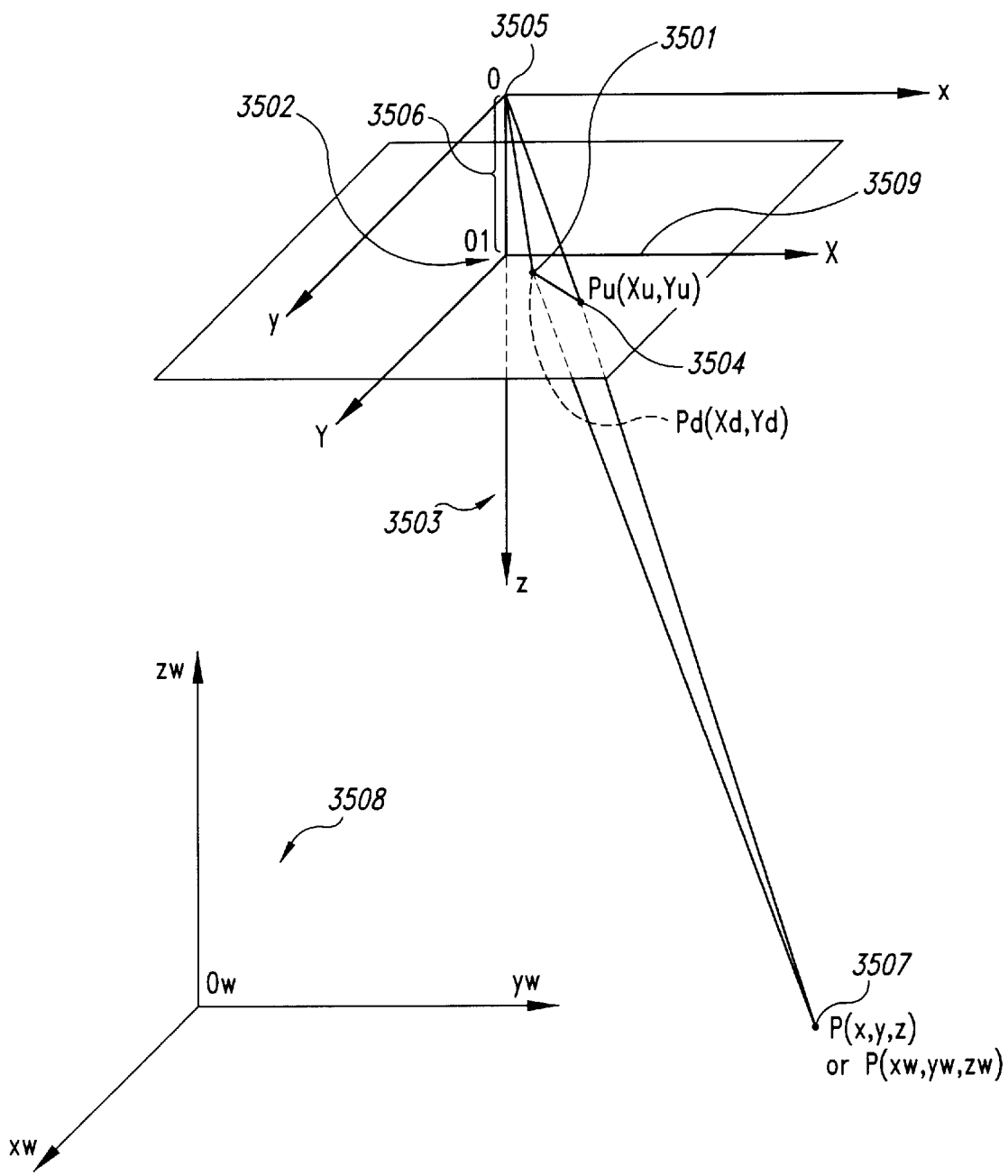
FIG. 35 illustrates a geometric construction that describes the mathematical operations that transform the 3-dimensional real world coordinates of the marker to image coordinates for the marker.

A geometric construction that describes the mathematical operations that transform the 3-dimensional real world coordinates of a marker to image coordinates for the marker is displayed in FIG. 35. The point 3501, with coordinates ($X_d$, $Y_d$) represents a point in an image captured by a camera. This point is also represented as a point with coordinates ($X_f$, $Y_f$), where the coordinates are expressed in terms of pixels, rather than distances, along the x and y film plane axes. The plane xy, 3509, which passes through the point 3502 on the downward directed z axis, 3503, is the image plane of the camera. It is assumed that the camera lens distorts the image in certain predictable ways. The point 3504 with coordinates ($X_u$, $Y_u$) represents the position that point 3501 would have on the image if a perfect pinhole camera, without lens distortion, had been used to capture the image. The distance between the optical center point 3505 and point 3502 is the focal length of the camera f, 3506. The actual point in 3-dimensional space that is imaged by the camera and that corresponds to the image point ($X_d$, $Y_d$) is shown as point 3507 with real world coordinates ($x_w$, $y_w$, $z_w$) with respect to the real world coordinate axes 3508.

A series of mathematical operations transform the real world coordinates of the imaged point 3507 at ($x_w$, $y_w$, $z_w$) to the image coordinates for point 3501 at ($X_f$, $Y_f$). These steps are listed below.

(1) Rigid body transformation from the object world coordinate system ($x_w$, $y_w$, $z_w$) to the camera 3D coordinate system (x, y, z):

$$\begin{bmatrix} x \\ y \\ z \end{bmatrix} = R \begin{bmatrix} x_w \\ y_w \\ z_w \end{bmatrix} + T$$

In the above equation, T is the translation vector:

$$T \equiv \begin{bmatrix} T_x \\ T_y \\ T_z \end{bmatrix}$$

where T relates the camera coordinate system to the real world coordinate system, or, in other words, ($T_x$, $T_y$, $T_z$) is the location of the origin of the real world coordinate origin in the camera 3D coordinate system.

R is the rotation matrix:

$$\begin{bmatrix} \cos\psi\cos\theta & \sin\psi\cos\theta & -\sin\theta \\ -\sin\psi\cos\phi + \cos\psi\sin\theta\cos\phi & \cos\psi\cos\phi + \sin\psi\sin\theta\sin\phi & \cos\theta\sin\phi \\ \sin\psi\sin\phi + \cos\psi\sin\theta\cos\phi & -\cos\psi\sin\phi + \sin\psi\sin\theta\cos\phi & \cos\theta\cos\phi \end{bmatrix}$$

where $\theta$, $\phi$, and $\psi$ are the angles corresponding to camera yaw, pitch, and tilt, respectively.

(2) Transformation from 3D camera coordinates (x, y, z) to ideal image coordinates ($X_u$, $Y_u$):

$$X_u = f\frac{x}{z}$$

$$Y_u = f\frac{y}{z}$$

where f is the camera focal length, and z is the distance along the x axis from the optical center at (0, 0, 0) to the plane in which the point at 3D camera coordinates (x, y, z).

(3) Transformation from ideal image coordinates ($X_u$, $Y_u$) to actual image coordinates ($X_d$, $Y_d$):

$$X_d + D_x = X_u$$

$$Y_d + D_y = Y_u$$

$$D_x = X_d(k_1 r^2)$$

$$D_y = Y_d(k_1 r^2)$$

$$r = \sqrt{X_d^2 + Y_d^2}$$

where $k_1$ is the first order distortion coefficient.

(4) Transformation from actual image coordinates ($X_d$, $Y_d$) to the pixel coordinates ($X_f$, $Y_f$):

$$X_f = s_x d'^{-1}_x X_d + C_x$$

$$Y_f = d_y^{-1} Y_d + C_y$$

where ($X_f$, $Y_f$) are the row and column numbers of the image pixel in computer frame memory, ($C_x$, $C_y$) are the row and column numbers of the center of computer frame memory, $$d'_x = d_x \frac{N_{cx}}{N_{fx}}$$

$d_x$ is the center to center distance between adjacent sensor elements in X (scan line) direction, $d_y$ is the center to center distance between adjacent CCD sensor in the Y direction, $N_{cx}$ the number of sensor elements in the X direction, $N_{fx}$ is the number of pixels in a line as sampled by the computer, $S_x$ is the uncertainty image scale factor.

The extrinsic parameters to be determined for the camera include the three angles θ, ϕ, and ψ, which represent the yaw, pitch, and tilt angles for the camera, and the three components of the vector T, which represent the translation of the camera from the origin of the real world coordinate system. These six parameters are used in the rigid body transformation of step 1. These six parameters fully define the camera pose, and allow pixels in the image captured by the camera with this pose to be correlated with light rays emanating from the object on the stage that was imaged by the camera. These six parameters vary from one image to the next, and are determined for each image by the Tsai method from the known coordinates of stage markers and their positions within the image.

The intrinsic parameters for the camera include f, $k_1$, $S_x$ and ($C_x$, $C_y$), which represent the focal length of the camera, the lens distortion coefficient, an uncertainty scale factor, and the image coordinates for the optical center. These intrinsic parameters are inherent in the hand-held camera with a fixed focal length. They are determined from the first few images processed by the program procedure, and are used subsequently as known constants in the simultaneous equations solved to yield the extrinsic parameters. Additional details for the exact method for solving the over-determined set of simultaneous, non-linear equations are given in the Tsai reference.

Blue Screening

The subroutine Blue Screen identifies the group of pixels in an input image that represent the image of the object and the group of pixels in the object that represent background. This is not as simple as identifying cyan pixels as representing the stage background, because of the effects of electronic noise in the image, shadows, and capture of pixels that represent neither the stage nor the object. Instead, the technique described in Walter Beyer, "Traveling Matte Photograph and the Blue Screen System," American Cinematographer, May 1964, p. 266, is used. A 3-dimensional matrix representing the RGB color space with axes corresponding to red, green, and blue is used to count the pixels in the image with specific RGB values. For example, a pixel representing a red intensity of 200, a green intensity of 35, and a blue intensity of 78, where the intensities for each color range from 0 to 255, is placed as a point in RGB space with coordinates (200, 35, 78) by entering a value of one into the 3-dimensional matrix at [200, 35, 78]. If two or more pixels with identical RGB values r, g, b are present in the image, then the value for the element with indices [r, g, b] would be the number of pixels with RGB values r, g, b.

When all the image pixels have been represented in the 3-dimensional matrix, a set of 10 seeds is placed into the matrix at random positions. Each pixel is associated with the seed closest to it in RGB space, so that the pixels are distributed among 10 neighborhoods of the 10 seeds. The positions of the 10 seeds are then iteratively adjusted so that sum of the squares of the distances in RGB space between each seed and the image pixels in the seed's neighborhood are minimized. Thus, the 10 seeds end up associated in RGB space with 10 pixel neighborhoods, likely to represent the two colors of the stage and 8 colors in the object or in the non-stage background. The seeds are then compared with the expected locations of the light and dark cyan colors of the stage, and assigned to either represent stage color or non-stage color. All pixels in the neighborhood of a given seed are assigned to be stage color or non-stage color, in accordance with the assignment made for the seed. Finally, only those pixels assigned to be non-stage color, but which are surrounded by other neighborhoods of stage color, are classified as representing the object. The same 10 initial random positions are used for the 10 seeds of each image, which allows the minimization of the squares of the distances between the seeds and their neighboring pixels to be carried out in a single step.

The Lumigraph Function

Theoretical Analysis

The Lumigraph function is a 4-dimensional projection of a 7-dimensional plenoptic function. A 7-dimensional plenoptic function provides a complete description of all light that passes through all points in an environment. The 7-dimensional plenoptic function is a function of the position of a point of observation within the environment, the direction of a light ray impinging on that point of observation, the wavelength of the light, and the time of observation. Three variables are needed to specify the position of the observation point within the environment, commonly named x, y, and z in the familiar rectangular coordinate system. The direction of a light ray is described using two variables. A familiar two-variable coordinate system that specifies direction is the azimuth-altitude system used in astronomy. The 7-dimensional plenoptic function provides the magnitude of light intensity at a particular observation point, in a particular direction, at a particular wavelength, and at a particular instant in time. The plenoptic function thus provides a way to calculate the view that an observer, looking in any direction, would have from any point within the environment at any time.

Figure 36:
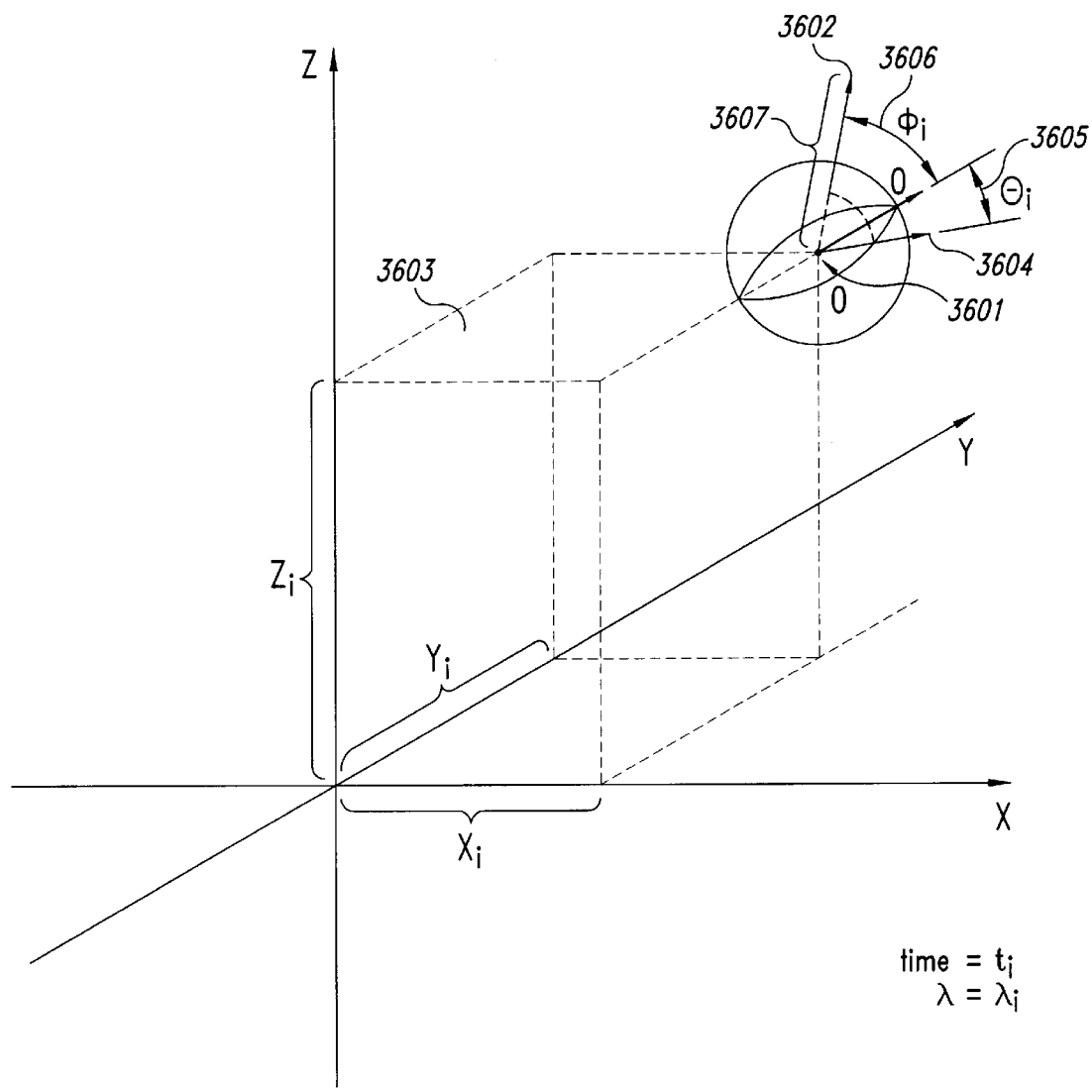
FIG. 36 displays a representation of a light intensity magnitude calculated by application of the 7-dimensional plenoptic function.

FIG. 36 displays a representation of a light intensity magnitude calculated by application of the 7-dimensional plenoptic function. The observation point 3601 is located at position $x_i$, $y_i$, $z_i$. A light ray 3602 intersects the observation point. A reference plane 3603 contains the observation point and is parallel to the xy plane. The direction of the light ray is defined by two angles. The first defining angle 3605 is $\Theta_i$, the angle between a reference vector and the projection of the of the light ray onto the reference plane 3604. The second defining angle 3606 is $\Phi_i$, the angle between the light ray and the reference plane. The intensity of light of wavelength $\Lambda_i$ at time $t_i$ is represented by the length or magnitude of the light ray vector 3602. That intensity is the value of the 7-dimensional plenoptic function $P(x_i, y_i, z_i, \Theta_i, \Phi_i, \Lambda_i, t_i)$.

In order to compactly and efficiently generate, store, and retrieve 3-dimensional images of an object, the preferred embodiment generates, stores, and retrieves a 4-dimensional projection of the 7-dimensional plenoptic function. The 4-dimensional projection, called the Lumigraph function, provides sufficient information to generate 2-dimensional color images of an object from any observation point exterior to the object.

The 4-dimensional projection is possible because of three simplifying assumptions about the environment within which the object resides. First, the desired 3-dimensional image of the object is a snapshot, very much like a still photograph. Therefore, information about the variation in the image with respect to time is not needed. Second, information about the intensities of light over a continuous spectrum of wavelengths is not needed to generate images for display on cathode ray tubes. Instead, it is sufficient to know only the intensities of red, green, and blue light. In the following description, calculation of the intensities for monochromatic light will be discussed, with the understanding that, for color images, three separate calculations for red, green, and blue light are needed. Finally, because only views external to an object are desired, it is sufficient to calculate the light intensities in directions radiating away from the object at each point on a surface enclosing the object. It is assumed that the intensity of light will remain constant from the enclosing surface outward. A view at any distance from the enclosing surface is therefore simply a scaled projection of a region of the enclosing surface onto a 2-dimensional plane.

Figure 37:
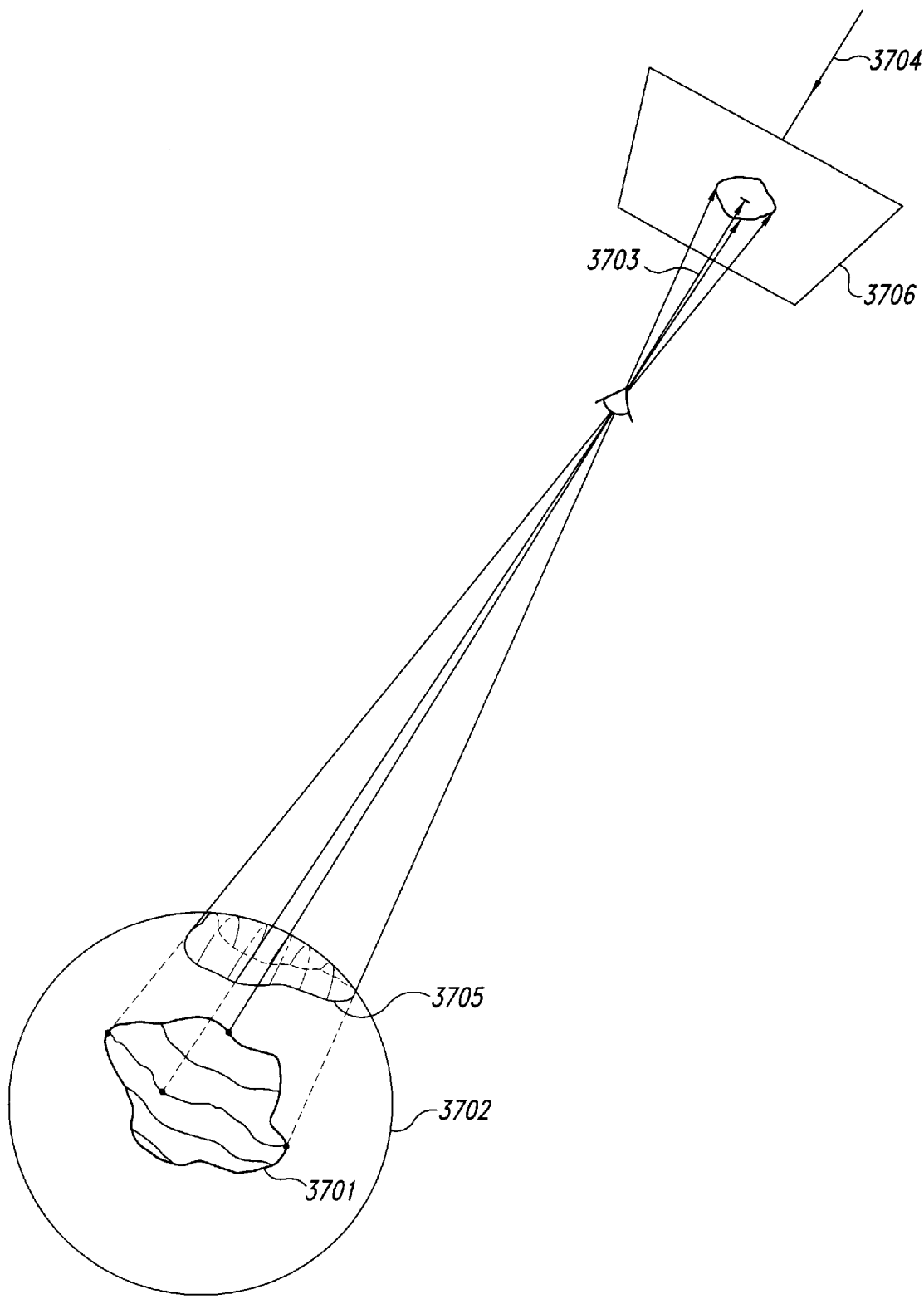
FIG. 37 displays an object surrounded by an enclosing spherical surface.

In FIG. 37, the object 3701 is surrounded by an enclosing spherical surface 3702. The object is viewed from a distance 3703 in a direction defined by the vantage point 3706. The Lumigraph function specifies the intensities of light rays emanating from the object at the point where they intersect the enclosing spherical surface 3705. The projection of the intensities onto the 2-dimensional plane 3706 normal to the view direction vantage point 1sis defines a 2-dimensional image of the object.

Because of the three simplifying assumptions, the time and wavelength variables can be eliminated from the 7-dimensional plenoptic function. Also, because only two position coordinates are needed to specify a position on a surface, such as the enclosing sphere, only two, rather than the three x,y,x coordinates, are needed. The 7-dimensional plenoptic function is by this means projected into a function in four dimensions. The Lumigraph function is one of many possible 4-dimensional projections of the 7-dimensional plenoptic function. The particular 4-dimensional projection that corresponds to the Lumigraph function is selected by the choice of the four variables that comprise the domain of the function. That choice is, in turn, influenced by the choice of the enclosing surface for which light ray intensities are calculated. In a preferred embodiment, the enclosing surface surrounding an object to be imaged is chosen to be a cube as described earlier.

Although a preferred embodiment uses a 4-dimensional function as the Lumigraph function, functions of other dimensions are possible. For example, a 5-dimensional function can be used with the $5^{th}$ dimension representing a distance from the cube. Such a $5^{th}$ dimension may be useful if the environment causes degradation of intensity values or otherwise affects the light rays outside the cube.

The choice of resolution for the Lumigraph data structure constitutes a balance between the quality of the images generated from the Lumigraph function and the time and memory requirements for computing the images. Higher resolutions provide better images, but incur greater computational costs. The resolution of the discrete Lumigraph data structure is characterized by the distance between the Lumigraph point and the distance between Lumigraph direction. In one embodiment, a single face of a cube has 32×32 Lumigraph point and each Lumigraph point has 256×256 Lumigraph directions.

One skilled in the art would appreciate that there are many uses of the Lumigraph system. For example, the Lumigraph system could be used to generate Lumigraph data structures for sculptures in a museum that can then be used to generate pictures of the sculpture. Also, a company could generate a Lumigraph data structure of its product (e.g., an automobile) and make that Lumigraph data structure available to its customers to view the product. Also, a video game developer could represent the appearance of an object with a Lumigraph data structure and generate images of that object to combine with a video scene. The Lumigraph data structure could also be stored on CD-ROM or transmitted on computer networks, such as the Internet.

Although the present invention has been described in terms of a preferred embodiment, it is not intended that the invention be limited to this embodiment. Modifications within the spirit of the invention will be apparent to those skilled in the art. The scope of the present invention is defined by the claims that follow.

We claim:

1. A method for determining a vantage point from which a picture of an object was taken, the method comprising:

providing a plurality of visible markers, each marker comprising a plurality of concentric geometric shapes each having a radius, each marker uniquely identifiable be the number of geometric shapes and the ratio of the radii of the innermost geometric shape to the outermost geometric shape;

placing the object in a position with a background that includes the plurality of markers, the background being in a base color and the markers being in a different shade of the base color;

taking a picture of the object from a vantage point having a position and orientation in which multiple markers are visible within the picture;

identifying the markers that are visible within the picture based on the number of geometric shapes and the ratio of the radii of the innermost geometric shape to the outermost geometric shape, and determining the position of the identified markers within the picture; and calculating both the position and orientation of the vantage point from which the picture was taken based on the identified markers and the determined positions of the identified markers within the picture.

2. The method of claim 1 wherein the base color is cyan.

3. The method of claim 1 wherein each marker comprises concentric rings of the different shade.

4. The method of claim 3 wherein each marker contains between 2 and 5 concentric rings.

5. The method of claim 3 wherein each marker is uniquely identifiable by the number of concentric rings of the marker and the ratio of the radii of the inner concentric rings to the outermost concentric ring of the marker.

6. A method for determining a vantage point from which a picture of an object was taken, the method comprising:

placing the object on a stage with a base and two sides, the stage having a background that includes a plurality of visible markers, each marker comprising a plurality of concentric geometric shapes each having a radius, each marker uniquely identifiable by the number of geometric shapes and the ratio of the radii of the innermost geometric shape to the outermost geometric shape;

taking a picture of the object from a vantage point having a position and orientation in which multiple markers are visible within the picture;

identifying the markers that are visible within the picture based on the number of geometric shapes and the ratio of the radii of the innermost geometric shape to the outermost geometric shape, and determining the position of the identified markers within the picture; and calculating the position and orientation of the vantage point from which the picture was taken based on the identified markers and the determined positions of the identified markers within the picture.

7. The method of claim 6 wherein 12 markers are placed on the base and 9 markers are placed on each side.

8. The method of claim 6 wherein the base is rotatable so that pictures of the object can be take from various vantage points around the object.

9. The method of claim 6 wherein the pictures are taken with a hand-held camera.

10. The method of claim 6 wherein the background and the markers upon the background are in different colors.

11. The method of claim 6 wherein the background is in a base color and the markers comprise a different shade of the base color.

12. The method of claim 11 wherein the base color is cyan.

13. The method of claim 11 wherein each marker comprises concentric rings of the different shade.

14. The method of claim 13 wherein each marker contains between 2 and 5 concentric rings.

15. The method of claim 13 wherein each marker is uniquely identifiable by the number of concentric rings of the marker and the ratio of the radii of the inner concentric rings to the outermost concentric ring of the marker.

16. A method for determining a vantage point from which a picture of an object was taken, the method comprising:

placing the object in a position with a background that includes a plurality of visible markers, each marker comprising a plurality of concentric geometric patterns each having a radius, each marker uniquely identifiable by the number of geometric patterns and the ratio of the radii of the innermost geometric pattern to the outermost geometric pattern;

taking a picture of the object from an arbitrary vantage point having a position and orientation in which multiple markers are visible within the picture, the picture being taken using a hand-held camera;

identifying the markers that are visible within the picture based on the number of geometric patterns and the ratio Of the radii of the innermost geometric pattern to the outermost geometric pattern, and determining the position of the identified markers within the picture; and calculating the position and orientation of the vantage point from which the picture was taken based on the identified markers and the determined positions of the identified markers within the picture.

17. The method of claim 16 wherein the background and the marker are in different colors.

18. The method of claim 16 wherein the background is in a base color and the markers comprise a different shade of the base color.

19. The method of claim 18 wherein the base color is cyan.

20. The method of claim 18 wherein each marker comprises concentric rings of the different shade.

21. The method of claim 20 wherein each marker contains between 2 and 5 concentric rings.

22. The method of claim 20 wherein each marker is uniquely identifiable by the number of concentric rings of the marker and the ratio of the radii of the inner concentric rings to the outermost concentric ring of the marker.

23. The method of claim 16 wherein the background includes a base and two sides of a stage upon which the object is placed.

24. The method of claim 23 wherein markers are positioned on the base and on the two sides of the stage.

25. The method of claim 24 wherein 12 markers are placed on the base and 9 markers are placed on each side.

26. The method of claim 23 wherein the base is rotatable so that pictures of the object can be take from various vantage points around the object.

27. A method for determining a vantage point including a position and orientation from which a picture of an object was taken and determining an outline of the object, the method comprising:

placing the object in a position with a background that includes a plurality of visible markers, the background and the markers being of different color than the object, each marker comprising a plurality of concentric geometric shapes each having a radius, each marker uniquely identifiable by the number of geometric shapes and the ratio of the radii of the innermost geometric shape to the outermost geometric shape;

taking a picture of the object from a vantage point having a position and orientation in which multiple markers are visible within the picture;

calculating the position and orientation of the vantage point from which the picture was taken based on the markers that arc visible within the picture; and determining the outline of the object based on the difference in color between the object and the background and markers.

28. The method of claim 27 wherein the background is in a base color and the markers comprise a different shade of the base color.

29. The method of claim 28 wherein the base color is cyan.

30. The method of claim 27 wherein each marker comprises concentric rings of a different shade from the base color from the background.

31. The method of claim 30 wherein each marker contains between 2 and 5 concentric rings.

32. The method of claim 30 wherein each marker is uniquely identifiable by the number of concentric rings of the marker and the ratio of the radii of the inner concentric rings to the outermost concentric ring of the marker.

33. The method of claim 27 wherein the background includes a base and two sides of a stage upon which the object is placed.

34. The method of claim 33 wherein markers are positioned on the base and on the two sides of the stage.

35. The method of claim 34 wherein 12 markers are placed on the base and 9 markers are placed on each side.

36. The method of claim 34 wherein the base is rotatable so that pictures of the object can be take from arbitrary vantage points around the object.

37. The method of claim 27 wherein the pictures are taken with a hand-held camera.

38. The method of claim 37 wherein the background and the markers upon the background are in different colors.

39. A computer-readable medium containing instructions for causing a computer system to determine a vantage point from which a picture of an object was taken, by:

receiving a picture of the object taken while the object is positioned on a stage with a base and two sides and with a background that includes a plurality of visible markers, each marker comprising a plurality of concentric geometric shapes each having a radius, each marker uniquely identifiable by the number of geometric shapes and the ratio of the radii of the innermost geometric shape to the outermost geometric shape, the picture being taken from a vantage point having a position and orientation in which multiple markers are visible within the picture;

identifying the markers that are visible within the picture based on the number of geometric shapes and the ratio of the radii of the innermost geometric shape to the outermost geometric shape, and determining the position of the identified markers within the picture; and calculating the position and orientation of the vantage point from which the picture was taken based on the identified markers and the determined positions of the identified markers within the picture.

40. The computer-readable medium of claim 39 wherein 12 markers are positioned on the base and 9 markers are positioned on each side.

41. The computer-readable medium of claim 39 wherein the base is rotatable so that pictures of the object can be take from various vantage points around the object.

42. The computer-readable medium of claim 39 wherein the pictures are taken with a hand-held camera.

43. The computer-readable medium of claim 39 wherein the background and the markers upon the background are in different colors.

44. The computer-readable medium of claim 39 wherein the background is in a base color and the markers comprise a different shade of the base color.

45. The computer-readable medium of claim 44 wherein the base color is cyan.

46. The computer-readable medium of claim 44 wherein each marker comprises concentric rings of the different shade.

47. The computer-readable medium of claim 46 wherein each marker contains between 2 and 5 concentric rings.

48. The computer-readable medium of claim 46 wherein each marker is uniquely identifiable by the number of concentric rings of the marker and the ratio of the radii of the inner concentric rings to the outermost concentric ring of the marker.

49. A computer-readable medium containing instructions for causing a computer system to determine a vantage point from which a picture of an object was taken and to determine an outline of the object, by:

receiving a picture of the object taken while the object is positioned with a background that includes a plurality of visible markers, the background and the markers being of different color than the object, each marker comprising a plurality of concentric geometric shapes each having a radius, each marker uniquely identifiable by the number of geometric shapes and the ratio of the radii of the innermost geometric shape to the outermost geometric shape, the picture being taken from a vantage point having a position and orientation in which multiple markers are visible within the picture;

calculating the position and orientation of the vantage point from which the picture was taken based on the markers that are visible within the picture; and determining the outline of the object based on the difference in color between the object and the background and markers.

50. The computer-readable medium of claim 49 wherein the background is in a base color and the markers comprise a different shade of the base color.

51. The computer-readable medium of claim 50 wherein the base color is cyan.

52. The computer-readable medium of claim 49 wherein each marker comprises concentric rings of a different shade from the base color from the background.

53. The computer-readable medium of claim 52 wherein each marker contains between 2 and 5 concentric rings.

54. The computer-readable medium of claim 52 wherein each marker is uniquely identifiable by the number of concentric rings of the marker and the ratio of the radii of the inner concentric rings to the outermost concentric ring of the marker.

55. The computer-readable medium of claim 49 wherein the background includes a base and two sides of a stage upon which the object is positioned.

56. The computer-readable medium of claim 55 wherein markers are positioned on the base and on the two sides of the stage.

57. The computer-readable medium of claim 56 wherein 12 markers are placed on the base and 9 markers are placed on each side.

58. The computer-readable medium of claim 56 wherein the base is rotatable so that pictures of the object can be take from arbitrary vantage points around the object.

59. The computer-readable medium of claim 49 wherein the pictures are taken with a hand-held camera.

60. The computer-readable medium of claim 49 wherein the background and the markers upon the background are in different colors.

61. A computer-readable medium containing instructions for causing a computer system to determine a vantage point from which a picture of an object was taken, by:

receiving a picture of the object taken while the object is positioned on a stage with a base and two sides and with a background that includes a plurality of visible markers, each marker comprising a plurality of concentric geometric patterns each having a radius, each marker uniquely identifiable by the number of geometric patterns and the ratio of the radii of the innermost geometric pattern to the outermost geometric pattern, the picture being taken from a vantage point having a position and orientation in which multiple markers are visible within the picture;

identifying the markers that are visible within the picture based on the number of geometric patterns and the ratio of the radii of the innermost geometric pattern to the outermost geometric pattern, and determining the position of the identified markers within the picture; and calculating the position and orientation of the vantage point from which the picture was taken based on the identified markers and the determined positions of the identified markers within the picture.

62. The computer-readable medium of claim 61 wherein 12 markers are placed on the base and 9 markers are placed on each side.

63. The computer-readable medium of claim 61 wherein the base is rotatable so that pictures of the object can be take from various vantage points around the object.

64. The computer-readable medium of claim 61 wherein the pictures are taken with a hand-held camera.

65. The computer-readable medium of claim 61 wherein the background and the markers upon the background are in different colors.

66. The computer-readable medium of claim 61 wherein the background is in a base color and the markers comprise a different shade of the base color.

67. The computer-readable medium of claim 66 wherein the base color is cyan.

68. The computer-readable medium of claim 66 wherein each marker comprises concentric rings of the different shade.

69. The computer-readable medium of claim 68 wherein each marker contains between 2 and 5 concentric rings.

* * * * *

UNITED STATES PATENT AND TRADEMARK OFFICE
CERTIFICATE OF CORRECTION

PATENT NO. : 6,028,955

DATED : February 22, 2000

INVENTOR(S) : Michael F. Cohen et al.

It is certified that error appears in the above-identified patent and that said Letters Patent is hereby corrected as shown below:

Col. 3, line 55, --Find_Rigs-- should read --Find_Rings--

Col. 4, line 65, "re(," should read --red--

Col. 6, line 58, "ann" should read --arm--

Col. 10, line 33, $x_{10,10,10}^{0}$ should read -- $x_{10,10,10,10}^{0}$ --

Col. 10, line 34, $x_{5,5,5,5}^{1}$ should read -- $x_{5,5,5,5,}^{1}$ --

Col. 10, line 35, $x_{10,10,10,10}^{0}$ should read -- $x_{10,10,10,10}^{0}$ --

Col. 10, line 36, $x_{5,5,5,5}^{1}$ should read -- $x_{5,5,5,5,}^{1}$ --

Col. 10, line 37, $x_{9,11,9,11}^{0}$ should read -- $x_{9,11,9,11,}^{0}$ --

UNITED STATES PATENT AND TRADEMARK OFFICE
CERTIFICATE OF CORRECTION

PATENT NO. : 6,028,955
DATED : February 22, 2000
INVENTOR(S) : Michael F. Cohen et al.

It is certified that error appears in the above-identified patent and that said Letters Patent is hereby corrected as shown below:

Col. 10, line 39, $x_{10,10,10,10}{}^1$ should read -- $x^1_{10,10,10,10}$ --

Col. 10, line 54 (both instances), $tw_{i,j,p,q}{}^r$ should read -- $tw^r_{i,j,p,q}$ --

Col. 10, line 56, $w_{i,j,p,q}{}^{r+1}$ should read -- $w^{r+1}_{i,j,p,q}$ --

Col. 10, line 56, $x_{i,j,p,q}{}^{r+1}$ should read -- $x^{r+1}_{i,j,p,q}$ --

Col. 10, line 59, $w_{i,j,p,q}{}^r$ should read -- $w^r_{i,j,p,q}$ --

Col. 10, line 59, $x_{i,j,p,q}{}^r$ should read -- $x^r_{i,j,p,q}$ --

Col. 10, line 64, $w_{i,j,p,q}{}^r$ should read -- $w^r_{i,j,p,q}$ --

Col. 10, line 64, $x_{i,j,p,q}{}^r$ should read -- $x^r_{i,j,p,q}$ --

UNITED STATES PATENT AND TRADEMARK OFFICE
CERTIFICATE OF CORRECTION

PATENT NO. : 6,028,955            Page 3 of 4

DATED : February 22, 2000

INVENTOR(S) : Michael F. Cohen et al.

It is certified that error appears in the above-identified patent and that said Letters Patent is hereby corrected as shown below:

Col. 11, in the equations in lines 5-10, $\sum_k$ should read $-\sum_k-$

Col. 11, the equation in lines 15-20 should read as follows:

$$x^r_{i,j,p,q} = tx^r_{i,j,p,q}(1 - w^r_{i,j,p,q}) + w^r_{i,j,p,q}\, x^r_{i,j,p,q}$$

$$w^r_{i,j,p,q} = tw^r_{i,j,p,q}(1 - w^r_{i,j,p,q}) + w^r_{i,j,p,q}$$

Col. 12, line 45, "s, t,U,v" should read --s, t, u, v--

Col. 13, line 13, "s, t,U,v" should read --s, t, u, v--

Col. 13, line 54, "the light rays" should read --the four light rays--

Col. 19, line 38, "Lumig raph" should read --Lumigraph--

Col. 29, line 27, delete "1sis"

Col. 32, claim 27, line 24, "arc" should read --are--

UNITED STATES PATENT AND TRADEMARK OFFICE
CERTIFICATE OF CORRECTION

PATENT NO. : 6,028,955

DATED : February 22, 2000

INVENTOR(S) : Michael F. Cohen et al.

It is certified that error appears in the above-identified patent and that said Letters Patent is hereby corrected as shown below:

Col. 31 (claim 8), line 8, "take" should read --taken--

Col. 32 (claim 26), line 4, "take" should read --taken--

Col. 32 (claim 36), line 50, "take" should read --taken--

Col. 33, (claim 41), line 16, "take" should read --taken--

Col. 34 (claim 58), line 16, "take" should read --taken--

Col. 34 (claim 63), line 50, "take" should read --taken--

Signed and Sealed this

Twenty-seventh Day of March, 2001

Attest:

NICHOLAS P. GODICI

Attesting Officer

Acting Director of the United States Patent and Trademark Office